United States Patent [19]
Pallmann

[11] Patent Number: 6,094,684
[45] Date of Patent: *Jul. 25, 2000

[54] METHOD AND APPARATUS FOR DATA COMMUNICATION

[75] Inventor: David Frank Pallmann, Fullerton, Calif.

[73] Assignee: Alpha Microsystems, Inc., Santa Ana, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/832,027

[22] Filed: Apr. 2, 1997

Related U.S. Application Data

[60] Provisional application No. 60/016,744, May 2, 1996, provisional application No. 60/029,974, Nov. 5, 1996, and provisional application No. 60/030,992, Nov. 14, 1996.

[51] Int. Cl.$^7$ .............................. G06F 13/38; G06F 15/17
[52] U.S. Cl. ............................ 709/227; 709/246
[58] Field of Search .................... 709/227, 228, 709/236, 202, 246

[56] References Cited

U.S. PATENT DOCUMENTS

| | | | |
|---|---|---|---|
| 5,572,724 | 11/1996 | Watanabe et al. | 709/228 |
| 5,721,818 | 2/1998 | Hanif et al. | 709/228 |
| 5,781,743 | 7/1998 | Matsuno et al. | 709/246 |
| 5,784,570 | 7/1998 | Funkhouser | 709/246 |
| 5,838,906 | 11/1998 | Doyle et al. | 709/202 |

OTHER PUBLICATIONS

Fischer; "Netscapes' Strategy for Network–Based Computing"; Object Magazine, Jan. 1998; pp. 44–49.

Heylighen, F.; "World–Wide Web: a distributed paradigm for global networking"; Proceeding. SHARE Europe Spring Conference, pp. 355–368; Apr. 18, 1994.

*Primary Examiner*—Mark H. Rinehart
*Attorney, Agent, or Firm*—Wilson, Sonsini, Goodrich & Rosati

[57] ABSTRACT

A data acquisition and delivery system for performing data delivery tasks is disclosed. This system uses a computer running software to acquire source data from a selected data source, to process (e.g. filter, format convert) the data, if desired, and to deliver the resulting delivered data to a data target. The system is designed to access remote and/or local data sources and to deliver data to remote and/or local data targets. The data target might be an application program that delivers the data to a file or the data target may simply be a file, for example. To obtain the delivered data, the software performs processing of the source data as appropriate for the particular type of data being retrieved, for the particular data target and as specified by a user, for example. The system can communicate directly with a target application program, telling the target application to place the delivered data in a particular location in a particular file. The system provides an external interface to an external context. If the external context is a human, the external interface may be a graphical user interface, for example. If the external context is another software application, the external interface may be an OLE interface, for example. Using the external interface, the external context is able to vary a variety of parameters to define data delivery tasks as desired. The system uses a unique notation that includes a plurality of predefined parameters to define the data delivery tasks and to communicate them to the software.

37 Claims, 34 Drawing Sheets

XI

... External Interface [implementation specific]
procedure XI (Link:LinkDef) — 402
{
   ... implementation of user interface and/or program interface — 404
   ... accept data delivery tasks as appropriate to the interface — 406
   ... convert data delivery tasks to Link Notation
   ... call Logic Control Module (LC) to begin execution of a link — 408
}

[Link] Section Parameters

- 502 — Version=*version*
- 504 — Description=*description*
- 506 — Document=LocalFileName
- 508 — DataSource=RemoteFileName
- 510 — DestDir=DirectoryName
- 512 — HostAddress=HostSystemName
- 514 — Mapping=FieldMappingArray
- 516 — HostDir=DirectoryName
- 518 — Pages=*n*|*
- 520 — Rows=*n*|*
- 524 — StartPage=n
- 526 — ReportFormat=StructureCode
- 528 — StartRow=n
- 530 — StartLine=n
- 532 — ImportMethod=*MethodCode*
- 534 — Sheet=location
- 536 — IgnoreBlanks=*boolean*
- 538 — IgnoreText=*boolean*
- 540 — Overwrite=*boolean*
- 542 — PadSpaces=*boolean*
- 544 — LineBatching=*n*
- 546 — Xfer=0
- 548 — UserName=identification
- 550 — Password=*password*
- 552 — Obtain=*0|1|2|3*
- 554 — LocalFile=FileSpecification
- 556 — Created=mm-dd-yyyy hh:mm:ss
- 558 — Revised=mm-dd-yyyy hh:mm:ss
- 560 — Target=*n*
- 562 — SourceProtocol=*0|1|2*
- 564 — SourceConversion=*0|1|2*
- 566 — LastRun=*mm-dd-yyyy hh:mm:ss*
- 568 — LastRuntime=*h:mm:ss*
- 570 — Results=successful|*ErrorMessage*
- 572 — FormatConversionPlugin=*ProgramFileName*
- 574 — DeliveryPlugin=*ProgramFileName*
- 576 — DeliverFTP=-1|0
- 578 — DeliverFTPsystem=*FtpSystemName*
- 580 — DeliverFTPuser=*UserName*
- 582 — DeliverFTPpassword=*Password*
- 584 — DeliverFTPdir=*DirectoryName*
- 586 — DeliverFTPfile=*FileSpecification*
- 588 — DeliverEmail=-1|0
- 590 — DeliverEmailRecipient=*UserName1*[. *UserName2*[... *UserNameN*]]]
- 592 — SaveExit=*boolean*
- 594 — Append=*boolean*
- 561 — TargetApp=*ApplicationCode*
- 563 — RequireText=*boolean*
- 565 — FieldDelimiter=[*CharacterCode*] [...[*CharacterCode*]]
- 567 — RecordDelimiter=[*CharacterCode*] [...[*CharacterCode*]]
- 569 — PageDelimiter=[*CharacterCode*] [...[*CharacterCode*]]
- 571 — DataType
- 573 — DataFormat
- 575 — DataFilter=ProgramFileName

FIG. 5A

[html] Section Parameters

- 501 — HTMLmethod=*n*
- 503 — HTMLrules=*boolean*
- 505 — HTMLbackGraphic=*boolean*
- 507 — HTMLbackGraphicSpec=*FileSpecification*
- 509 — HTMLtitleGraphic=*boolean*
- 511 — HTMLtitleGraphicSpec=*FileSpecification*
- 513 — HTMLforeColor=*boolean*
- 515 — HTMLforeColorCode=#*nnnnnn*
- 517 — HTMLbackColor=*boolean*
- 519 — HTMLbackColorCode=#*nnnnnn*
- 521 — HTMLlinkColor=*boolean*
- 523 — HTMLlinkColorCode=#*nnnnnn*
- 525 — HTMLvisitColor=*boolean*
- 527 — HTMLvisitColorCode=#*nnnnnn*
- 529 — HTMLheaderFont=*boolean*
- 531 — HTMLheaderFontSize=*n*
- 533 — HTMLheaderFontBold=*boolean*
- 535 — HTMLheaderFontItalic=*boolean*
- 537 — HTMLheaderFontUnder=*boolean*
- 539 — HTMLbodyFont=*boolean*
- 541 — HTMLbodyFontSize=*n*
- 543 — HTMLbodyFontBold=*boolean*
- 545 — HTMLbodyFontItalic=*boolean*
- 547 — HTMLbodyFontUnder=*boolean*
- 549 — HTMLformat=*n*
- 551 — HTMLmono=*boolean*
- 553 — HTMLtemplate=*FileSpecification*
- 555 — GatewayDelivery=*boolean*
- 557 — HTML30=*boolean*
- 559 — Netscape=*boolean*

FIG. 5B

[ODBC] Section Parameters

- 502C — DataSource=ODBC-DriverName
- 504C — User=UserName
- 506C — Password=Password
- 508C — Query=SQLquery

DR
--- Data Retrieval Module ---
--- Note: calls procedure AcquireData --- procedure DR (Link:LinkDef) returns Success:Integer
{
   if Link.Obtain = 0,
      if Link.LocalFile exists on local computer,
         Copy file Link.LocalFile to RegulatedName;      — 602
      else
         Success := false;
   else
      switch Link.Xfer
         case 0              --- always ---
         {
           if Exists(RegulatedName),
              DeleteFile RegulatedName;
         }
         case 1              --- daily ---
         {
           if Exists(RegulatedName),      — 604
              if CreationDate(RegulatedName) = Today,
                 DeleteFile RegulatedName;
         }
         case 2              --- once ---
         {
         }
      if not Exists(RegulatedName),
      {
         if Link.SourceProtocol = Plug-in,
         {
           if Exists(PluginName),
           {
              call Plugin
              if Exists(RegulatedName),
                 Success := true;      — 610
              else
                 Success := false;
           }
         }
         else
         {
           if Protocol supported in implementation,      — 606
           {
              if AcquireData(Link),
                if not Exists(RegulatedName),
                   Success := false;
              else
                 Success := false;
           }
           else
              Success:= false;
         }
      else
         Success := false
      endif (608, 614, 612 are labeled brackets)

FIG. 6B-1

```
}
... AcquireData procedure, called by DR ...
... Note: calls procedures AcquireFTP, AcquireHTTP ...

procedure AcquireData (Link:LinkDef) returns Success: Integer
{
    switch Link.SourceProtocol
        case 0, "ftp://"
            AcquireFTP (Link)            ─617          ... FTP native protocol ...
        case 1, "http://"
            AcquireHTTP (Link)           ─618          ... HTTP native protocol ...
        case 2, "plugin://"              ─619          ... plug-in (external handler) ...
            ... handled earlier in algorithm ...
        case n, "extension://"           ─621          ... implementation specific extension(s) ...
            AcquireProtocol (Link)
        if ODBC data is to be accquired  ─623          ... ODBC protocol ...
            Acquire ODBC data
}                                                                                                      ─616

... AcquireFTP procedure [implementation specific] ...

procedure AcquireFTP(Link:LinkDef, RegulatedName:String) returns Success:Integer
{
    ... connect to FTP site following RFC-959 standards ...
    ... implement as appropriate for operating system platform ...
    Link.HostAddress contains TCP/IP n1.n2.n3.n4 address or DNS name (e.g. ftp.census.gov) ...
    Link.UserName contains FTP login user name ...
    Link.Password contains FTP login password ...
    Link.HostDir contains [optional] directory to change to on source computer ...
    Link.DataSource contains file name of data source on host source computer ...
    Link.Xfer contains the preferred file transfer method:0(ASCII) or 1 (binary) ...
    ... result must be RegulatedName file ...
    ... report error by setting Success to false ...
}                                                                                                      ─620
```

...AcquireHTTP procedure [implementation specific]...

procedure AcquireHTTP (Link:LinkDef, RegulatedName:String) returns Success:Integer
{
...obtain URL from HTTP server following RFC-xxxx... standards...
...implement as appropriate for operating system platform...
...Link.HostAddress contains URL (uniform resource locator)...
...result must be RegulatedName file...
...report error by setting Success to false...
}

FIG. 6B-2

FC
procedure DC (Link:LinkDef) returns Success:Integer
{
   Success :=true;
   if Link.SourceConversion field specifies a built-in conversion,
   {
      rename local copy of data from regulated name to temporary name;
      call appropriate conversion handler (input=temporary name, output=regulated name);
   }
   if Link.FormatConversion field specifies a format conversion plug-in,
   {
      rename local copy of data from regulated name to temporary name;
      if format conversion plug-in exists,
         call format conversion program (input=temporary name, output=regulated name);
      else
         Success := false;
   }
   else
   {
      if format conversion ;plug-in for file type (original data source name) exists,
      {
         rename local copy of data from regulated name to temporary name;
         call format conversion program (input=temporary name, output=regulated name);
      }
   }
}

FIG. 7

DF
···Data Filtering Module···

```
procedure DF (Link:LinkDef. DataSource:FileSpecification)                — 802
        returns Success:Integer
{
    Success := true;                                                       — 804
    TempName := file specification constructed for temporary use:          — 806
    rename DataSource to TempName;
    if Link.FilterPlugIn specified,
808 —  {
        Execute program Link.FilterPlugIn(TempName. DataSource);
       }
    else
    {
        open file TempName for input;
        open file DataSource for output;
        do while not EndOfFile(DataSource)
        {
            IgnoreLine := false;
            read Record from file TempName;
            if Link.IgnoreBlanks option is enabled,
                if Trim(Record) :="",
                    IgnoreLine := true;
            if Link.IgnoreText option is enabled,
            {
                if Record contains Link.IgnoreText1,
                    IgnoreLine := true;
                if Record contains Link.IgnoreText2,
                    IgnoreLine := true;
                if Record contains Link.IgnoreText3,
810 —               IgnoreLine := true;
                if Record contains Link.IgnoreText4,
                    IgnoreLine := true;
                if Record contains Link.IgnoreText5,
                    IgnoreLine := true;
                if Record contains Link.IgnoreText6,
                    IgnoreLine := true;
                if Record contains Link.IgnoreText7,
                    IgnoreLine := true;
                if Record contains Link.IgnoreText8,
                    IgnoreLine := true;
            }
            if not IgnoreLine,
                write Record to file DataSource;                           — 812
            if Require Text option is enabled,
                filter based on Require Textn clauses                      — 814
        }
        close file TempName;
        close file DataSource;
        delete file TempName;
    }
    Success := true;
}
```

··· Data Mapping Module ··· procedure DM (Link:LinkDef. DataSource : FileSpecification)
       returns Success:Integer
```
{
Success := true;
open file DataSource for output:          ⎤
CurrPage := 1;                            ⎬— 902
CurrLine := 0;                            ⎦
if link target is an application program,
    {
    launch application using AI module
    if not successful;
        Success := false;                 ⎤— 904
        exit function;
    }
else,
    open target output file;
for (CurrPage := StartPage to StartPage + Pages - 1)
    {
    for (CurrLine := StartLine to StartLine + Lines  1)
        {
        Record := LocateRecord (CurrPage, CurrLine);
        switch Record;
            case % EOF
                Success := true;
                exit function;
            case % PST                                    ⎤— 906
                Success := false;
                exit function;
            case % EOP
                exit for;
            case else
                call ParseRecord( );
        }
    }
}
```

FIG. 9A

```
Procedure ParseRecord( ):
{
    for (CurrField :- 1 to FieldCount)
    {
        Buffer := empty;
        if FieldPage(CurrField) = CurrPage or
                                FieldPage(CurrField) = ,
        {
            if FieldLine(CurrField) = CurrLine or
                                FieldLine(CurrField) = ,
            {
                Field := MidSection (Record, FieldCol(CurrField),
                        FieldSize(CurrField);
                if Link.PadSpaces enabled,
                    Field := Field space padded to length of
                                FieldSize(CurrField);
                if Link.ImportMethod = ImportFields.
                    {
                    Buffer := Field;
                    call TransmitData (Buffer.FieldName(CurrField);
                    }
                else,
                    {
                    Buffer := Buffer concatenate Field;
                    }
            }
        }
    }
    if Link. ImportMethod = ImportLines,
        call TransmitData (Buffer. FeildName(1));
    if Link.SaveAndExit option enabled,
        shut down target application;
}
```

AI ALGORITHM

Application Interface [implementation specific]

procedure AI (Link:LinkDef)
{
    locate or launch a target application
    pass a data field to the current target application
    save work in the current target application
    shut down the current target application
}

Data Delivery Module procedure DD (Link:LinkDef) returns Success:Integer
{
    Success := true;
1102 —  if Link.DeliverEmail <> 0,
       Send e-mail to Link.DeliverEmailRecipient with TargetFile as an attachment;
1104 —  if Link.GatewayDeliver <> 0,
       call Transmit FTP (Options.GatewayHostAddress, Options.GatewayUserName,
          Options.GatewayPassword, Options.GatewayDirectory, TargetFile.TargetFile);
1106 —  if Link.DeliverFTP <> 0,
       call TransmitFTP (Link.DeliverFTPsystem, Link.DeliverFTPusername,
          Link.DeliverFTPpassword, Link.DeliverFTPdir. TargetFile, Link.DeliverFTPfile);
1108 —  if Link.DeliveryPlugin <> "",
       execute program Link.DeliveryPlugin (TargetFile);
}

FIG. 11

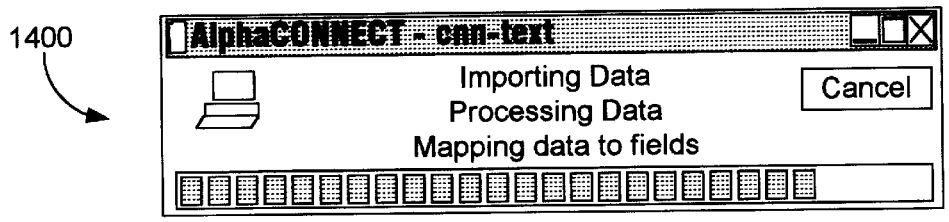

FIG. 14

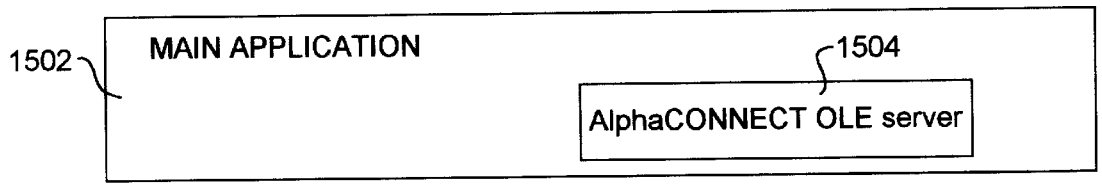

FIG. 15A

Dim Connect as object

Set Connect = CreateObject ("connect.application")
Connect.CommandLine = "stock.lk"
Connect.Execute
Set Connect = Nothing

FIG. 15B

Dim Connect as object

Set Connect = CreateObject ("connect.application")
Connect.LinkName = "newlink"
Connect.LinkTemplate = "standard"
Connect.Descripton = "U.S. Census info"
Connect.SourceProtocol = "ftp"
Connect.SourceURL = "ftp.census.gov"
Connect.SourceUser = "anonymous"
Connect.SourcePassword = "myname@myorg.com"
Connect.SourceDir = "/pub/states"
Connect.SourceFile = "summary.txt"
Connect.DestDir = "d:\results"
Connect.DestFile = "newlink.htm"
ConnectCreateLInk
Set Connect = Nothing

FIG. 15C

[Link]
Version=1.1
Description=NEWS: CNN Headlines
Document=cnn
DataSource=
DestDir=SrootSSsubS
HostAddress=http://www.cnn.com
Mapping={ p }, { 1 }, 1, 2048, A { r };
HostDir=
Pages=*
Rows=*
StartPage=1
ReportFormat=1
StartRow=1
StartLine=1
ImportMethod=1
Sheet=
IgnoreBlanks=1
IgnoreFields=0
IgnoreText=0
Overwrite= -1
PadSpaces=0
LineBatching=1
Xfer=0
Obtain=1
LocalFile=
Created=03-28-1996  15 : 19 :  44
Revised=05-01-1996  09 : 09 : 41
Target=0
SourceProtocol=2
SourceConversion=0
FormatConversionPlugin=
AutoLearnStartCol=1
AutoLearnEndCol=2048
AutoLearnStartLin=10
AutoLearnEndLin=20
DeliverFTP=0
DeliverFTPsystem=
DeliverFTPuser=
DeliverFTPpassword=
DleiverFTPdir=
DeliverFTPfile=
DeliverEmail=0
DeliverEmailRecipient=
DeliveryPlugin=
SaveExit=0
Append=0
LastRun=05-02-1996  09 : 06 : 22
LastRuntime=0 : 00 : 13
Results=successful

FIG. 19

FICTIONAL OFFICE SUPPLIES, INC.   INVENTORY REPORT    PAGE 1

REORDER INFORMATION

CASCO

PURCHASING CONTACT BILL GLEASON
PHONE 703-555-1515

EXETER

PURCHASING CONTACT KATHY WALSH
PHONE 615-555-6000

HARTFORD

PURCHASING CONTACT *ANY*
PHONE 615-555-4080

LEARY

PURCHASING CONTACT DAVID KRANE
PHONE 212-555-6324

SUNBURST

PURCHASING CONTACT MICHAEL BRENNAN
PHONE 708-555-7465

FICTIONAL OFFICE SUPPLIES, INC.    INVENTORY REPORT                                PAGE 2

| ITEM CODE | DESCRIPTION | EXPECTED | ON-HAND | DISC |
|---|---|---|---|---|
| BRF-001 | BRIEFCASE HARTFORD SOFT BWN LEATH | 4 | 4 | |
| BRF-002 | BRIEFCASE HARTFORD SOFT BLK LEATH | 3 | 3 | |
| BRF-003 | BRIEFCASE HARTFORD SOFT BRG LEATH | 7 | 7 | |
| BRF-004 | BRIEFCASE HARTFORD HARD BWN PLSTC | 0 | 0 | |
| BRF-005 | BRIEFCASE HARTFORD HARD BLK PLSTC | 3 | 2 | ***1 |
| BRF-006 | BRIEFCASE HARTFORD HARD GRY PLSTC | 0 | 0 | |
| BRF-011 | BRIEFCASE EXETER SOFT BWN CANVAS | 2 | 2 | |
| BRF-012 | BRIEFCASE EXETER SOFT BRG CANVAS | 4 | 4 | |
| BRF-013 | BRIEFCASE EXETER SOFT BLK CANVAS | 1 | 1 | |
| BRF-014 | BRIEFCASE EXETER SOFT TAN CANVAS | 3 | 3 | |
| CAL-001 | CALCULATOR CASCO 1000 SOLAR | 8 | 8 | |
| CAL-002 | CALCULATOR CASCO 1500 SOLAR | 13 | 12 | ***1 |
| CAL-011 | CALCULATOR FLITTER CREDIT CD SZ | 26 | 26 | |
| CAL-012 | CALCULATOR FLITTER STD SOLAR | 4 | 4 | |
| CAL-013 | CALCULATOR FLITTER STD BATTERY TH | 5 | 5 | |
| CAL-014 | CALCULATOR FLITTER ACCOUNTANT SOLAR | 3 | 3 | |
| COM-001 | COMPUTER BELL 486 DX4 100MHZ WINDOWS | 4 | 4 | |
| COM-002 | COMPUTER BELL PENT 130MHZ WINDOW 95 | 4 | 4 | |
| COM-003 | COMPUTER BELL 486 LAPTOP 100MHZ WINDOWS | 0 | 0 | |
| COM-011 | COMPUTER ATS 486 DX2 66MHZ DOS | 3 | 3 | |
| COM-012 | COMPUTER ATS PENT 100MHZ DOS | 1 | 1 | |
| COM-013 | COMPUTER ATS PPRO 190MHZ WINDOWS 95 | 0 | 0 | |
| COM-021 | COMPUTER APP POWERPC 630 MAC | 4 | 4 | |
| COM-022 | COMPUTER APP POWERPC 650 MAC | 1 | 1 | |
| DSK-001 | DESK O'SULL 5FT MAHOGANY | 2 | 2 | |
| DSK-002 | DESK O'SULL 6FT CHERRY | 2 | 2 | |
| DSK-003 | DESK O'SULL 6FT MAHOGANY | 1 | 1 | |
| DSK-004 | DESK O'SULL 6FT OAK | 4 | 4 | |
| DSK-005 | DESK O'SULL 6FT OAK L | 1 | 1 | |
| DSK-006 | DESK O'SULL 6FT PINE | 1 | 1 | |

*page break*

FIG.21B

FICTIONAL OFFICE SUPPLIES, INC.   INVENTORY REPORT                              PAGE 3

| ITEM CODE | DESCRIPTION | EXPECTED | ON-HAND | DISC |
|---|---|---|---|---|
| FIL-001 | FILE CAB LEARY 2-DR MTL GRY | 3 | 3 | |
| FIL-002 | FILE CAB LEARY 2-DR MTL BLK | 1 | 1 | |
| FIL-003 | FILE CAB LEARY 2-DR MTL WHT | 0 | 0 | |
| FIL-004 | FILE CAB LEARY 2-DR MTL TAN | 1 | 1 | |
| FIL-005 | FILE CAB LEARY 2-DR MTL GRY LOCK | 2 | 2 | |
| FIL-006 | FILE CAB LEARY 2-DR MTL BLK LOCK | 0 | 0 | |
| FIL-007 | FILE CAB LEARY 2-DR MTL WHT LOCK | 1 | 1 | |
| FIL-008 | FILE CAB LEARY 2-DR MTL TAN LOCK | 3 | 3 | |
| FIL-009 | FILE CAB LEARY 2-DR MTL GRY FIREPROOF | 1 | 1 | |
| FIL-010 | FILE CAB LEARY 4-DR MTL GRY | 0 | 0 | |
| FIL-011 | FILE CAB LEARY 4-DR MTL BLK | 1 | 1 | |
| FIL-012 | FILE CAB LEARY 4-DR MTL WHT | 2 | 2 | |
| FIL-013 | FILE CAB LEARY 4-DR MTL TAN | 0 | 0 | |
| FIL-014 | FILE CAB LEARY 4-DR MTL GRY LOCK | 1 | 1 | |
| FIL-015 | FILE CAB LEARY 4-DR MTL BLK LOCK | 2 | 2 | |
| FIL-016 | FILE CAB LEARY 4-DR MTL WHT LOCK | 0 | 0 | |
| FIL-017 | FILE CAB LEARY 4-DR MTL TAN LOCK | 3 | 3 | |
| FIL-018 | FILE CAB LEARY 4-DR MTL GRY FIREPROOF | 1 | 1 | |
| FIL-019 | FILE CAB LEARY 2-DR WOOD | 2 | 2 | |
| FIL-020 | FILE CAB LEARY 4-DR WOOD | 0 | 0 | |
| LMP-001 | LAMP SUNBURST DESKTOP MODEL 100 | 3 | 3 | |
| LMP-002 | LAMP SUNBURST DESKTOP MODEL 101 | 1 | 1 | |
| LMP-003 | LAMP SUNBURST DESKTOP MODEL 102 | 2 | 2 | |
| LMP-004 | LAMP SUNBURST PEDESTAL MODEL 350 | 0 | 0 | |
| LMP-005 | LAMP SUNBUSRST PEDESTAL MODEL 351 | 1 | 1 | |
| LMP-006 | LAMP SUNBURST DESKTOP MODEL 100 50HZ | 3 | 3 | |
| LMP-007 | LAMP SUNBURST DESKTOP MODEL 101 50HZ | 1 | 1 | |
| LMP-008 | LAMP SUNBURST DESKTOP MODEL 102 50HZ | 2 | 2 | |
| LMP-009 | LAMP SUNBURST PEDESTAL MODEL 350 50HZ | 0 | 0 | |
| LMP-010 | LAMP SUNBURST PEDESTAL MODEL 351 50HZ | 1 | 1 | |

*page break*

FIG.21C

```
FICTIONAL OFFICE SUPPLIES, INC.    INVENTORY REPORT                PAGE 4

CATEGORY TOTALS

CATEGORY        QTY ON HAND         REORDER LEVEL        ADVICE

BRF               27                   15
      CAL               59                   40
      COM               17                   20            ** REORDER **
      DSK               11                   12
      FIL               22                   10
      LMP               14                   12            ** REORDER **
end of file
```

AlphaCONNECT for Microsoft Excel Link Editor

Link Description

Latest from the New York Stock Exchange

Link Name
nyse.exc

[Save]  [Save As]  [Cancel]  [Print]  [Help]  [Learn]  [Cue Cards]

| Source | Destination | Fields | Filter |

Selective Processing

☐ Ignore blank lines in data source   ☐ Ignore blank fields in data source

☒ Ignore lines containing the following text:

1. SUBTOTAL
2. 
3. 
4. 
5. 
6. 
7. 
8.

Enter phrase identifying line to be ignored: (1) text or (2) text@column

FIG.25

METHOD AND APPARATUS FOR DATA COMMUNICATION

This application claims priority to each of U.S. Provisional Application No. 60/016,744, filed on May 2, 1996, entitled Method and Apparatus for Data Communication having inventor David F. Pallmann, U.S. Provisional Application No. 60/029,974, filed Nov. 5, 1996, entitled Method and Apparatus for Data Communication having inventor David F. Pallmann and U.S. Provisional Application No. 60/030,992, filed Nov. 14, 1996, entitled Method and Apparatus for Data Communcations. U.S. Provisional Application No. 60/016,744, filed on May 2, 1996, entitled Method and Apparatus for Data Communication having inventor David F. Pallmann and all appendices thereto are hereby incorporated herein by this reference. U.S. Provisional Application No. 60/029,974, filed Nov. 5, 1996, entitled Method and Apparatus for Data Communication having inventor David F. Pallmann appendices thereto are hereby incorporated herein by this reference. The microfiche appendices to the Application No. 60/029,974, filed Nov. 5, 1996, entitled Method and Apparatus for Data Communication having inventor David F. Pallmann are hereby expressly incorporated herein by this reference. U.S. Provisional Application No. 60/030,992, filed Nov. 14, 1996, entitled Method and Apparatus for Data Communcations is hereby expressly incorporated herein by this reference.

BACKGROUND OF THE INVENTION

1. Copyright Authorization

A portion of the disclosure of this patent document contains material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

2. Field of the Invention

The invention relates generally to data communication and conversion, and more particularly to methods and apparatus for enabling a user to retrieve data from a data source and to communicate it to a data target in a specified manner.

3. Description of the Related Art

Historically, the functions of communicating data and converting data have often been isolated from each other. An early means of data communications involving computers, for example, was manual data entry by a human being. In particular, a person using some input device, such as a keyboard, typically conveyed data to a program running on a computer, which stored the information.

Data communication has also been facilitated using a variety of media. For example, the output from one computer could be stored in a portable form, which could be input into another computer. Punched cards could be created by a computer, or a keypunch, and read by another computer, for example. Magnetic tape, magnetic disks, and drums were likewise useful for transporting data between machines. As disks became more and more popular, more portable and inexpensive disks came into use (floppy diskettes, for example).

Beyond data communiation using the movement of media from one computer to another, it became desirable to interconnect computers directly for such communication. Cables connecting computers ("hard-wired connections") permitted communication using digital or analog signals. The desirability of networking computers relates to the development of local area network technology, such as Ethernet.

For long distance data communication, the telephone network could be utilized through the use of modulators-demodulators (modems). As modem technology has increased, these devices typically became faster and less expensive. Software programs were typically required to facilitate these forms of data movement. Input and output involving portable media were usually accomplished by an operating system under the direction of programs, for example. Networking layers of operating systems or add-on products typically facilitate computer-to-computer communication over local connections. Modem connections are frequently handled by software programs for telecommunications.

Transportable media often require formatting conventions and file structures. Direct connections between computers, networking, and dial-up communications typically require protocols that may be agreed upon by connected computers in order to negotiate the orderly transfer of data.

Data communications today can encompass many different forms of communication. Even on one particular medium, there can be many possible communication protocols that might be used. For example, a dial-up modem connection could use any of the following protocols to transfer a file: XMODEM, YMODEM, ZMODEM, KERMIT, and many others.

An early means of data conversion involving computers was entering programs and data into computers, often through the user of front panels. Over time, attention moved to better human-machine interfaces, so that, today, we have the display and entry of text, graphics, and other media.

The need for data conversion of user information proper can come about whenever a user needs to switch from one format to another, for example. This is often mandated by switching from one application program to another, or from one computer platform to another. It can also be required when sharing data between two applications.

A brute force method of data conversion can be to use a human being. Output from one computer can be printed on some medium such as paper (a report), then re-keyed into another computer by a person. This conversion method may be used when a straightforward conversion method is not available to a user.

A higher level of sophistication may be to write a program dedicated to converting from one format to another. For example, a program could be written for use on a particular operating system that could read one data storage format and write another. As computers become more and more embedded in society, the need for data conversion may steadily grow.

The need for data communication has led to specialized software products for telecommunications. There often are, for example, many different communications methods and many different protocols that may have to be supported. Unfortunately, telecommunications products may be good at moving data from one location to another, but may neglect or even ignore data conversion. That is, data communications products may leave it to the user, a programming group, or another product to effect data conversion. A typical data communications product may move files but not change their format.

Similarly, the need for data conversion has led to specialized software products for conversion. There may be, for example, many different formats and a market for conversion between them. Unfortunately, data conversion products may be good at transforming data from one format to another, but may neglect or even ignore data communications. That is, data conversion products may leave it to the user, an MIS group, or another product to effect data communications. A conventional data conversion product may transform data but not acquire it from a remote location, nor deliver the converted results to a remote location.

As computers penetrate society at more and more levels, however, there may be an increasing need to have people who are not computer specialists perform more sophisticated computer operations. Users who need to perform data communications where the data to be received or transmitted is already in a useful form, may be able to easily operate today's telecommunications products. Users who need to convert data where the data to be converted is locally accessible may be able to easily operate today's data conversion products. Users who need to both acquire/deliver data from/to a remote computer and convert the data from one form to another may find a paucity of products to conveniently assist them with such tasks.

Using a conventional data communications product in conjunction with a conventional data conversion product, for example, may enable the user to accomplish the job, but the user (or an informed associate) may have to manually manage the interaction between the two products. This management may often require the user to have knowledge of (1) the internals of the communications product and the conversion products; and (2) the file/directory structure of the local computer/network. Such information can be technical and beyond some users. Even if not beyond the user, it can be time-consuming to understand. When compared to the self-contained environment of just using a communications product or just using a data conversion product, the two-product combination approach can cost the user (1) time, (2) automation, (3) integration, and (4) require a greater knowledge of computers.

Accordingly, there has been a need for a data communication method or apparatus to facilitate data communication between data sources and data targets even when the data communication involves data conversion and to provide flexibility in doing so. The present invention meets these needs.

SUMMARY OF THE INVENTION

An aspect of the invention is to provide an integrated data communication method and apparatus that is extensible and/or has an open architecture. Another aspect of the invention is to provide a data communication method and apparatus that is flexible for and/or configurable by users of the method or apparatus. A third aspect of the invention is to provide a data communication method and apparatus that may be configured by a user to retrieve data from a selected data source and transfer it to a selected data target in a specified manner.

BRIEF DESCRIPTION OF THE DRAWINGS

FIG. 4 is an outline of the process of an external interface module of the model 300;

FIG. 5A is a list of link section link notation parameters;

FIG. 5B is a list of HTML section link notation parameters;

FIG. 5C is a list of DDBC section link notation parameters;

FIGS. 6A and 6B are an outline of the process of a data retrieval module of the model 300;

FIG. 7 is an outline of the process of a format conversion module of the model 300;

FIG. 8 is an outline of the process of a data filter module of the model 300;

FIG. 9 is an outline of the process of a data mapping module of the model 300;

FIG. 10 is an outline of the process of an application interface module of the model 300;

FIG. 11 is an outline of the process of a data delivery module of the model 300;

FIG. 14 illustrates a screen that may be displayed while a link is executing;

FIGS. 15A–C illustrate an embodiment of the invention being used as an OLE server;

FIG. 19 is a sample link;

FIG. 20 is a example of a link history screen;

FIGS. 21A–D illustrate a sample of raw data that might be retrieved by an embodiment of the invention;

FIG. 22 illustrates an example of a screen that might be used to specify and display format conversion parameters;

FIG. 25 is an example of a screen that might be used to specify and display data filter parameters;

DETAILED DESCRIPTION OF AN EMBODIMENT

Embodiments of the invention provide a novel apparatus and method for communicating data from a data source to a data target. The following description is presented to enable a person skilled in the art to make and use the invention.

Descriptions of specific embodiments are provided only as examples. Various modifications to the described embodiments may be apparent to those skilled in the art, and the generic principles defined herein may be applied to other embodiments and applications without departing from the spirit and scope of the invention. Thus, the present invention is not intended to be limited to the described or illustrated embodiments, but is to be accorded the widest scope consistent with the principles and features disclosed herein.

Figure 1:
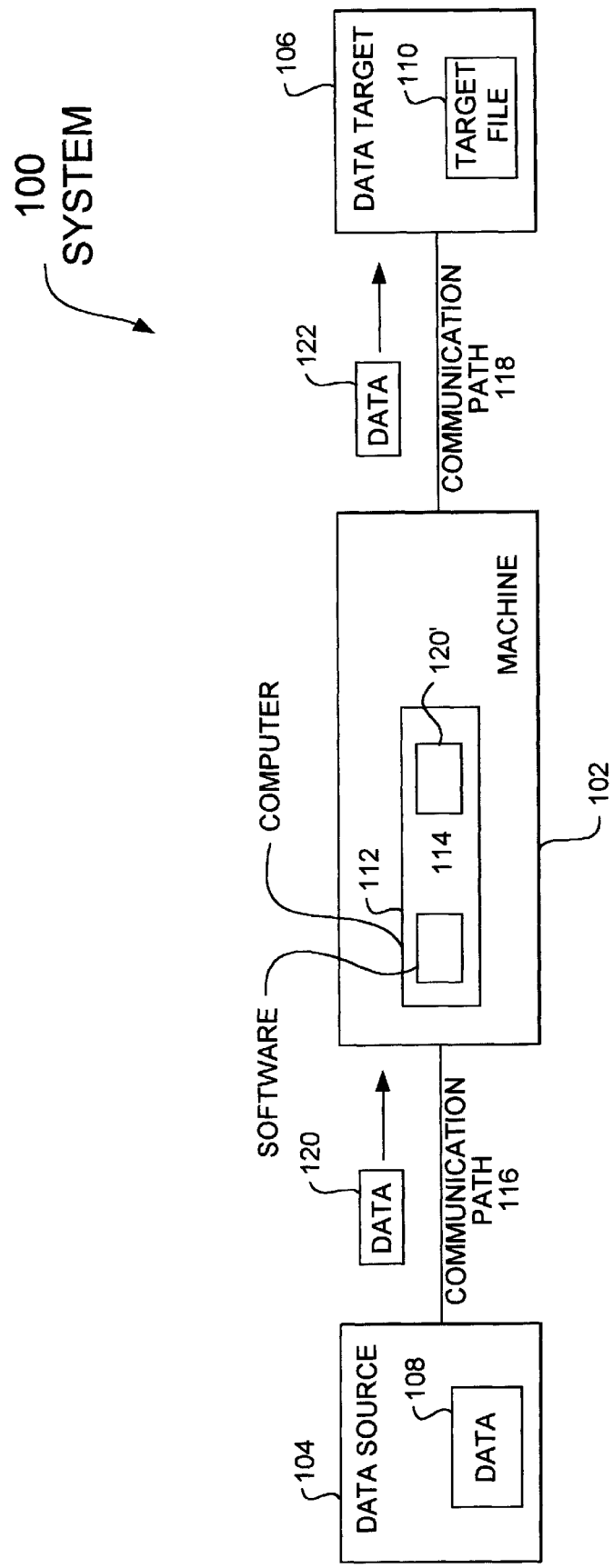
FIG. 1 is a diagram of a system 100 that includes an embodiment 102 of the present invention for retrieving data from a data source and delievering data to a data target.

FIG. 1 is a generalized diagram of a system 100 that contains an embodiment 102 of the present invention. This system 100 includes a data source 104 and a data target 106. We shall refer to the embodiment 102 as the AlphaCONNECT machine 102. The AlphaCONNECT machine 102 executes data delivery tasks. A data delivery task obtains data 120 from the data source 104. It may or may not transform (e.g. convert and/or filter) the data 120. It then delivers the transformed data 122 to a data target 106.

The AlphaCONNECT machine 102 shown in FIG. 1 includes software 114 running on a computer system 112. In the present embodiment, computer system 112 includes an IBM compatible personal computer running a Windows™ operating system such as, Windows NT™ version 4.0, for example. Embodiments might use Windows for Workgroups™ version 3.11 or Windows 95™ version 4.0, for example. Alternate embodiments of the invention might run on Windows 3.1 or 3.11, for example. Embodiments of the present invention are not limited to a particular operating system or a particular computer platform, however. The machine 102 is an engine that can perform a wide variety of data delivery tasks. It is usable in a wide variety of applications because it does not pre-suppose communication methods, source/destination platforms or operating systems, implementation platforms, source or target data formats, data layouts or data targets.

To provide the machine 102, the computer in system 112 should be able to comfortably run the data target 106(e.g. Excel, Word, WordPerfect or Netscape application). The software 114 of machine 102 adds about a megabyte of additional memory overhead, so systems that are performing poorly when running the data target 106, for example, will degrade further when running software 114. It is recommended that machine 102 be implemented on a computer that includes a 486 CPU or better, 16 MB RAM or better and an Ethernet connection or dial-up Internet connection (high speed connection recommended).

The data source 104 in system 100 can be as remote as on another continent, or can be on the computer on which the AlphaCONNECT machine 102 is implemented. If the data source 104 is a computer, the computer shall be called the source computer. The data source 104 contains data 108. Some or all of data 108 is retrieved by machine 102 as data 120. The process of obtaining the data 120 from a data source 104 is called data acquisition. The data 120 retrieved from the data source 104 shall be called source data 120.

Embodiments of the present invention can be platform-independent with regard to the data source. Embodiments of the present invention can be implemented to accept data from any data source 104 platform, provided the source platform and the implementation platform share a common method of communication. A source computer can run any operating system.

The data 108 of the data source 104 is in some format such as text or some form of multimedia data (e.g. audio, video or image data), for example. Machine 102 can retrieve and process data 120 from data 108 where the data 108 is in a text format, a report format (i.e. a text file with a repeating pattern of information) or a Hypertext Markup Language (HTML) format, for example. Machine 102 can also retrieve image files, audio files and video files. Machine 102 does not process image, audio and video files, but machine 102 is adapted to accept a plug-ins that might process such files. For example, the machine 102 might accept a plug-in that converts a gif file to a jpeg file. Alternate embodiments of the invention might process image, audio and video files in a desired manner. Machine 102 can also access data from database servers that are set up for database querying using the protocol ODBC (Open Data Base Connection). Embodiments of the invention are not limited to retrieving and/or processing data in these formats, however. Also, machine 102 can blindly acquire and deliver (without processing) other types of data.

The ability to retrieve data from a text file enhances the machine 102's flexibility. In particular, a text format typically provides a universal, platform-independent representation of data, and because most applications typically print, it is usually possible to get data into a text format regardless of the platform.

To filter textual data, the machine 102 can be instructed to ignore lines of the source data 120 that are blank, or that contain certain text values. Machine 102 can be instructed to filter out all lines of the data 120 except for those that contain specified text. The machine 102 does not filter multimedia data, but alternate embodiments could filter multimedia data in a desired manner or plug-ins could enable machine 102 to filter multimedia data.

The machine 102 can divide lines of textual source data 120 into data fields, instructing the data target 106 to pass these fields to specific places in a target file 110. The machine 102 can accept from a user, for example, rules for mapping the data 120 into fields. The machine 102 can apply such rules to multiple lines on a page of textual data 120 and to multiple pages of textual data 120. A user can also specify the starting and ending pages and lines that the machine 102 will process from textual data 120. This feature enables the user to instruct machine 102 to skip headers, footers, and non-data lines and pages. When source data 120 is multimedia data, the machine 102 can be instructed where in the target file 110 the multimedia data 120 will be placed.

If the data source 104 is located on a host computer remote from the machine 102, the communication path 116 might be some form of network connection. Alternatively, the data source 104 could be local to the computer system 112. If the data source is local to the computer 112, the communication path 116 might be an internal bus of computer system 112, a virtual path or some combination of an internal bus and virtual path, for example. Thus, the data source 104 might be a data file located on computer system 112 or a data file located on a computer connected to the same local or wide area network as the computer system 112, for example. Alternatively, the data source 104 might be a web page accessible by computer system 112 via the Internet. Embodiments of the present invention are not limited to any particular data sources nor to any particular communication paths.

Embodiments of the present invention also need not be limited to a particular type of data target. The data target 106 might be an application program, a file, an object or any other entity allowed by the enviroment in which the machine 102 exists. The data target 106 might be a target application program, such as Microsoft Excel™, running on computer system 112 and having a target file 110 on computer system 112, for example. In the present embodiment, target applications are Windows programs that accept data obtained by the machine 102. In the present embodiment, target applications fall into five basic categories: word processors, spreadsheets, databases, editors that come with Windows and web browsers. In the present embodiment, the word processor data targets 106 include Microsoft Word™, Corel WordPerfect™ and Lotus Word Pro™. The spreadsheet data targets 106 include Microsoft Excel™, Corel Quattro Pro™ and Lotus 1-2-3™. The database data targets 106 include Microsoft Access™, Borland Paradox™ and Lotus Approach™. The Windows editor data targets 106 include Wordpad™, Notepad™, Windows Write™, Paintbrush™ and Media Player™, for example. The data target 106 might simply be the file 110. For example, the data target 106 might be an HTML file 110 created by machine 102. Such an HTML file might be read by a web browser such as Netscape Navigator™, Internet Explorer™ and Mosaic™. The machine 102 can provide an HTML data target 106 that is a target file 110 in HTML 2.0 and 3.0 formats. Machine 102 can also provide a data target 106 that is a target file 110 in a text format, for example. Embodiments of the present invention need not include and are not limited to these particular data targets nor to targets having these particular formats. The data target 106 might be located on a remote computer. Machine 102 shields the details of the data target from the user.

Figure 2:
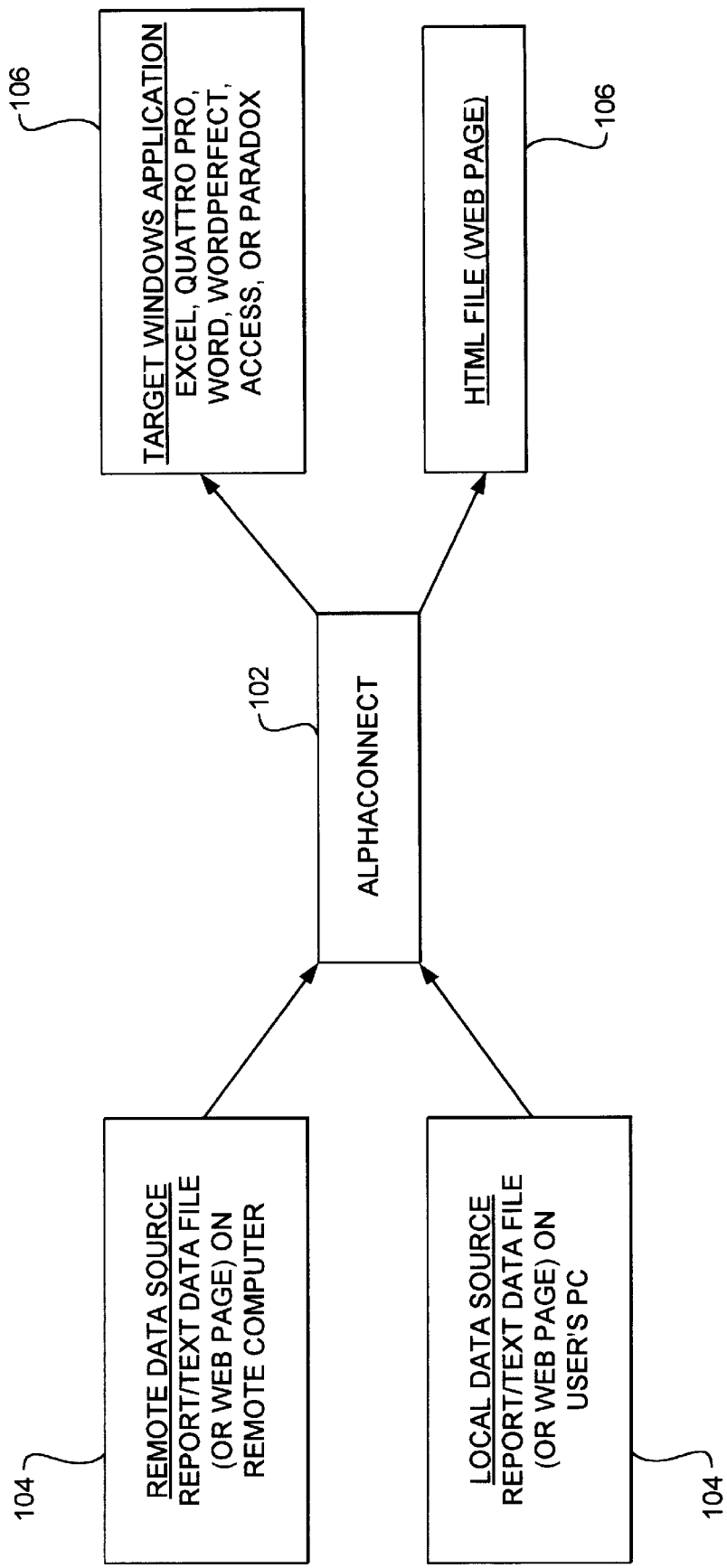
FIG. 2 illustrates possible data paths from a data source to a data target.

The data 122 delivered to a data target shall be called the delivered data 122. When machine 102 delivers the delivered data 122 to a data target 106 that is an application program (i.e. a target application), machine 102 can instruct the target application program to handle the data 122 in a specified manner. Machine 102 may deliver the delivered data 122 to a target application in a manner that instructs the target application to create a new target file 110 to save the data 122, for example. The data may be delivered in a manner that instructs the target application to import the data 122 to the end of a preexisting target file 110, for example. Or the data may be delivered in a manner that instructs the target application to import the data 122 to a specified location in target file 110. The particular manner of delivery depends on the communication techniques supported by the data target 106. The present embodiment is designed to work with the target applications identified above. If a data target 106 is a remote computer, the delivered data 122 may be a file 110 that was created by a different data target 106 that is running on the computer 112 (e.g. a target application). For example, the machine 102 might deliver delivered data 122 to a first data target 106 that is a target application running on the computer 112. This data target 106 might create the file 110. The machine 102 might then be used to deliver the file 110 to a second data target, e.g. a remote data target 106. FIG. 2 illustrates a few possible data paths from data source 104 through machine 102 to data target 106. The delivered data 122 can be multimedia data.

Embodiments of the present invention can be implemented with any method of communication. The machine 102 shields the details of communication from the user. Communication methods shall be called protocols. Protocols such as FTP or ZModem may be used. In the machine 102, data acquisition and data delivery are isolated from the rest of the machine 102.

As shown in FIG. 1, communication path 116 enables communcation between the machine 102 and data source 104, and communication path 118 enables communcation between machine 102 and data target 106. Using the computer system 112 and software 114, machine 102 is adapted to acquire source data 120 from the data source 104, transform (e.g. format convert and/or filter) the source data 120 if desired or if necessary and deliver the delivered data 122 to the data target 106. In particular, machine 102 integrates data communication and data conversion. Depending on the particular data 120 and data target 106, a transformation may or may not be required or desired. The machine 102 is not adapted to transform (e.g. format convert and/or filter) multimedia data without using plug-ins.

To acquire data 120, machine 102 creates a local file 120' on computer system 112. The source data 120 that has been retrieved from the data source 104 is stored in this file 120'. In the present embodiment, this local file 120' is given a "regulated name." The data 120 in this source file 120' can then be processed to produce the data 122. The data 122 is delivered to the data target 106 in a manner requested by a user, for example.

The AlphaCONNECT machine 102 can read data from local files or from just about any kind of computer located just about anywhere in the world. A local file is a file that is on a disk drive of the computer 112, or that is on the local area network of computer 112 that has been mapped to look like a disk drive to the operating system of computer 112(e.g. Windows). Local files in Windows, for example, are complete Window file specifications, and may take advantage of the long-filename features of Windows 95 and Windows NT 4.0. An example of a local file specification is f:\Documents\Legal\Brief065.txt.

Machine 102 can communicate with a remote data source 104 and a remote data target 106 over communication paths 116 and 118 using the FTP (file transfer protocol) protocol of TCP/IP, and it can communicate with the remote data source 104 over communication path 116 using the HTTP (hyper text transmission protocol) protocol of TCP/IP. In the machine 102, plug-ins might be used to support other protocols if desired. In alternate embodiments, other protocols might be supported without plug-ins. Accordingly, to be used with the present embodiment (assuming no plug-ins are used), a remote data source 104 might support FTP or HTTP of TCP/IP. A remote data target 106 might support FTP. To be used with the present embodiment, an FTP data source or data target might comply with the Internet standards document RFC-959. Embodiments of the present invention are not limited to these communication protocols, however. The system 112 uses a TCP/IP stack that is Winsock 1.1 compliant. Embodiments of the invention can use any TCP/IP for Windows, including Microsoft's TCP/IP-32. Using the FTP and HTTP protocols provides a number of benefits.

For example, TCP/IP and FTP have been implemented on virtually every kind of computer. As a result, the Alpha-CONNECT machine 102 will typically be able to access anything from PCs to IBM Mainframes as a data source 104. Typically any combination of disparate computers in an organization will be able to be linked through the use of AlphaCONNECT machine 102.

Additionally, if a machine 102 is connected to the Internet, machine 102 will typically be able to access the large number of FTP servers on the Internet. An FTP server is a computer that has been set up to allow public or private access using the TCP/IP protocol named ftp. Such access will likely give the machine 102 access to millions of publicly available FTP servers on the Internet, providing a wide variety of source data. Using the HTTP protocol, machine 102 will also typically have access to the increasing number of World Wide Web pages on the Internet, as well as any private web servers that may exist on a local network, for example. The present embodiment cannot access secured web pages that use a protocol named https. The present embodiment cannot fill-in or submit web page forms for the user. Alternate embodiments might be designed to do so, however. Machine 102 enables the Internet to be used as a transport mechanism between computers. The AlphaCONNECT machine 102 enables users to obtain data from and deliver data to computers in locations across the Earth through the Internet.

Two FTP mechanisms are supported in order to give the user options for working around problems, addressing compatibility issues, and/or opting to use a more full-featured FTP client than the one provided with the AlphaCONNECT machine 102. In particular, users may select from machine 102's Internal FTP implementation or an External FTP plug-in. The Internal implementation is AlphaCONNECT 102's own implementation of FTP. This Internal FTP is more tightly coupled with the machine 102. For example, the machine 102 is able to display to the user the logon process of the internal FTP implementation. The machine 102 may not be able to do this with an external FTP implementation. Similarly, the external FTP implementation may not be configured to communicate to the machine 102 as many different types of error conditions. The machine 102 might more readily control file transfers when Internal FTP is used. The internal FTP implementation of embodiments of the invention may comply with the Internet standards document RFC-959.

When using the Internal FTP and the machine 102 prompts for a computer name, it is asking for an Internet system identification. Two forms of computer names may be supplied. In particular, an Internet address such as 192.245.218.138 (i.e. four numbers separated by dots where each numbers is in the range 0–255) may be supplied. Alternatively, an Internet name, such as ftp.alphamicro.com, may be provided. An internet name is a registered name that may be used as an alias for an Internet address. If the method of access is FTP, all that is required is the prefix ftp://and the computer name, as described above. For example, ftp://192.245.218.45 and ftp://jsmith@acme.com are acceptable. If the method of access is HTTP, the computer identication could be followed by path and file name information. For example, http://www.alphamicro.com, http://www. alphamicro. com/ac, and http://www.myschool.edu/student/main.html are acceptable. Embodiments of the present invention may determine the type of communication protocol being used by the prefix provided (e.g. ftp://or http://).

The internal FTP is a fully functional FTP client program, but also serves as a browser. The AlphaFTP program may be run directly from the Windows desktop or within the machine 102's user interface. alphaftp.exe is a stand-alone executable file that may be run independently from the rest of machine 102.

External FTP runs the user's specified FTP program instead of AlphaCONNECT 102's internal implementation. The External FTP mechanism may have less robust integration and error reporting. In the present embodiment, to use an external FTP program, the machine 102 can be used with FTP clients that support the -s:scriptfile syntax on the command line such as Microsoft FTP™. For machine 102, the external FTP program should adhere to the Internet standards document RFC-959. An external FTP client to the machine 102 should also honor the open, user, password, cwd, get and bye commands.

The AlphaCONNECT machine 102 can also retrieve data using the HTTP protocol of TCP/IP (the World Wide Web). The AlphaCONNECT machine 102 uses a built-in HTTP reader to obtain HTML text file data from a network. As will be explained, parameters in AlphaCONNECT 102's link notation enable a user to decide, for example, how the HTML is to interpreted. In particular, the machine 102 can convert the HTML to text (intelligently remove all HTML tags), make an exact copy of the HTML file (include all HTML tags with the text) or process just the body of the HTML file (include all HTML tags and text from <BODY> to </BODY>).

The machine 102 is also able to query database servers connected to a network to which machine 102 has access. Database servers are computers on a network that have been set up for database querying using the protocol ODBC (Open Data Base Connection). ODBC servers accept queries—criteria indicating which information should be returned. Querying a database server allows records that match the query to be selected from a larger database. For example, a query might specify customers in a customer database who owe more than $1000.00 over the last 90 days. ODBC sources are addressed by specifying an ODBC driver name, a user id and password, a database and a query that applies to that database table. An example of a database query is ODBC driver—Microsoft SQL Server
user id—jsmith
password—none
database—Sales
query SELECT*FROM Orders WHERE Ship ToState='CA' OR BillToState='CA';

This example indicates that a query should be sent to the SQL Server database server for the database named "Sales." The query requests records from the database table named "Orders" that have a ship-to state and/or a bill-to state of "CA" (California).

Figure 3:
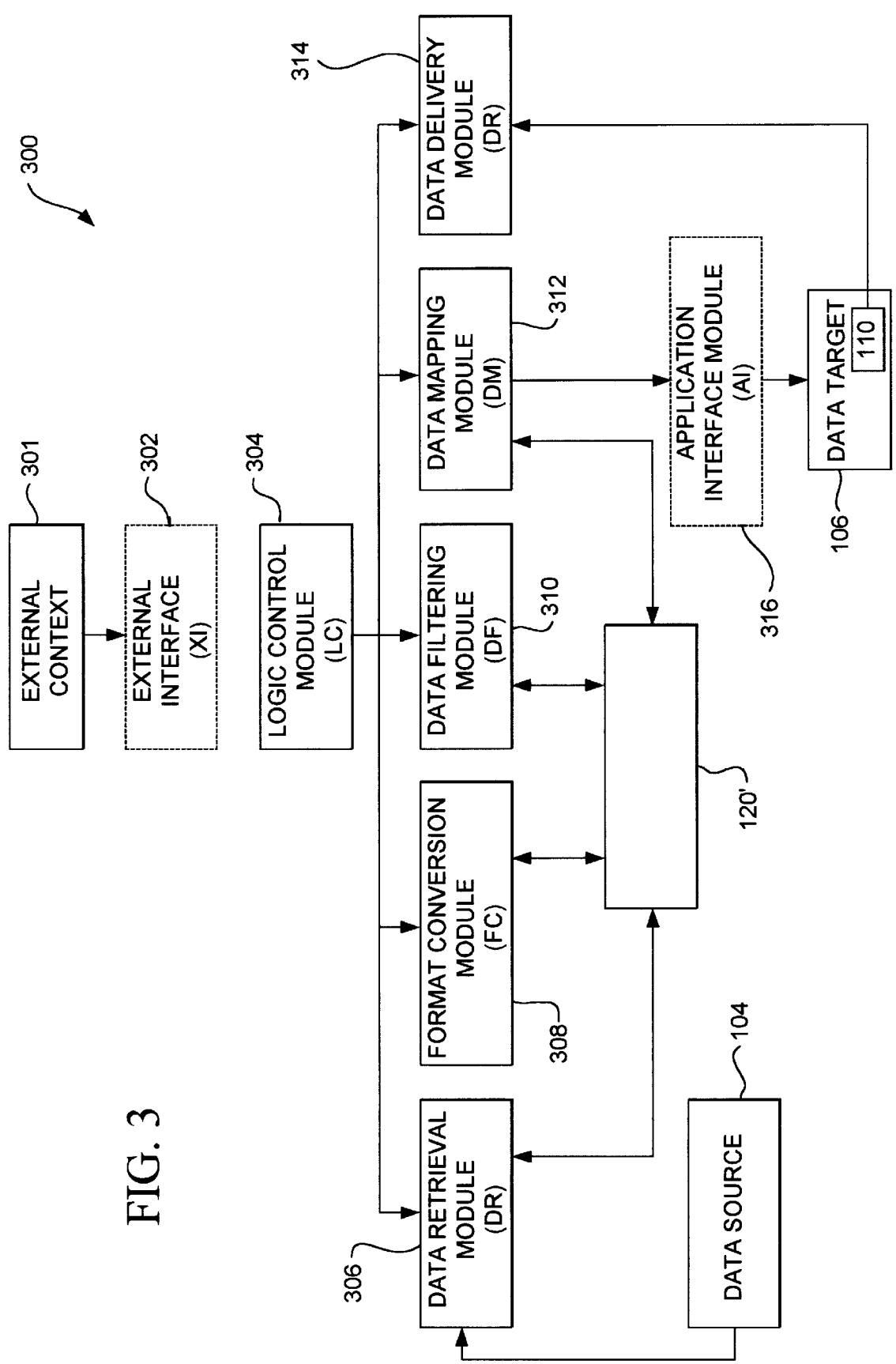
FIG. 3 illustrates a machine model 300 of software used to implement the embodiment 102.

FIG. 3 illustrates a machine model 300 used by the software 114 to implement the AlphaCONNECT machine 102. FIG. 3 shows the machine model 300 as related to the data source 104, the data target 106 having target file 110, an external context 301 and the local file 120'. As illustrated, the model 300 includes an external interface (XI) module 302, a logic control (LC) module 304, a data retrieval (DR) module 306, a format conversion (FC) module 308, a data filtering (DF) module 310, a data mapping (DM) module 312, a data delivery (DD) module 314 and an application interface (AI) module 316. In general, control of machine 102 is accomplished by the external context 301 through the external interface module 302. The external interface module 302 controls logic control module 304 which, in turn, controls the operation of the remaining modules 306, 308, 310, 312, 314 and 316, as needed.

The modular architecture of software 114 enhances the flexibility of machine 102. In particular, the operation of these modules is segregated by software 114 in a manner that makes replacement of the modules with compatible modules (e.g. plug-ins) relatively easy. This segregation is accomplished at least in part using "links" written in "link notation."

The link notation used by machine 102 is a platform-independent, communication method-independent, target independent, location independent means of expressing a data delivery task. Link notation shall refer to any notation that is used to specify the value of a parameter associated with a data delivery task. The described link notation used by the machine 102 is only an example of a link notation. Other embodiments can use other link notations The machine 102 uses link notation to store parameters commonly associated with varying data delivery tasks. As used by the model 300, link notation can be used to accomplish a variety of tasks which may include but are not limited to data acquisition, format conversion, data filtering, data mapping, data transfer to a target application and data delivery. In the present embodiment, link notation contains a plurality of predetermined parameters where each parameter is assigned a value. Different data delivery tasks may use the same predefined parameters. Data delivery tasks may be different in that the values of the predefined parameters are different. For example, two different data delivery tasks may both specify the parameters: name of a data source, format of the source data and communication protocol. The value of these parameters may be different (e.g. the first task may specify source data in a text format and the second task may specify source data in an HTML format). But both tasks may use these same parameters having some value. A link notation formed by identifying parameters that a variety of data delivery tasks have in common enables flexibility of data retrieval and data delivery without sacrificing a relatively consistent and/or simple interface to the software the accomplishes the delivery tasks and a relatively consistent and/or simple external interface to the external context 301 (e.g. a easy to understand user interface).

For example, in the present embodiment, link notation enables the machine 102 to provide a consistent interface to the modules 306, 308, 310, 312, 314 and 316 and plug-in modules that are or might be used to accomplish the various processing tasks. Thus, the data retrieval module 306 may use the link notation parameters to acquire data. Alternatively, a plug-in data retrieval module that acquires data in a different manner than the module 306 and that is used to acquire data 120 instead of the module 306 might use the same link notation parameters to acquire the data 120. For example, the data retrieval module 306 may need to access data having a certain file name, in a particular directory on a particular host computer. The link notation in the present embodiment uses a first link notation parameter to provide to the data retrieval module 306 the file name, it uses a second link notation parameter to provide to the data retrieval module 306 the source directory and it uses a third link notation parameter to provide to the DR module 306 the source computer name. When the data retrieval module 306 is replaced by a plug-in, the plug-in will also look to the first link notation parameter to determine the file name that it is supposed to access. The plug-in will look to the second link notation parameter to identify the source directory and to the third link notation parameter to identify the source computer name. Accordingly, link notation enables plug-ins to have the flexibility to implement whatever type of communication protocols, conversion, data filtering, data mapping, data delivery or application interfaces are desired while maintaining a relatively consistent interface to the rest of the software and to the external context. The present embodiment does not provide for data mapping plug-ins, but alternate embodiments could do so. In the present embodiment, other necessary or desired link notation parameters could be defined and used by plug-ins and alternate embodiments.

Link notation also enables the machine 102 to provide a relatively consistent external interface to a user or an external program, for example, even as data delivery tasks change. In particular, because link notation includes parameters that a variety of data delivery tasks have in common, it enables a user interface, for example, to be designed that does not radically change whenever a different type of data delivery task is desired. In particular, the data delivery tasks can change while the parameters remain constant. Only the values of the parameters need to change. Thus, link notation enables a relatively easy to understand and relatively constant human interface where a human operator can simply specify the value of predetermined parameters to vary data delivery tasks. A user interface may have a predefined set of prompts and inputs that can be set by a user to accomplish varying data delivery tasks, for example. The predefined prompts and inputs may correspond to the predefined link parameters. The input provided by the external context (e.g. user) provides the values of the predefined parameters. Similarly, link notation enables a relatively consistent program interface to be designed when the machine 102 is to be controlled by another program rather than a human. The link notation can be easily extended by a developer to add additional features or services to the user. Even if a developer extends the link notation, however, the notation can still enable the developer to provide flexible additions using a similar relatively constant external interface.

A set of link notation parameters defining a data delivery task shall be called a link. A link can be stored as a file, communicated in memory, mapped to the properties of an object or instituted as variables, for example. FIG. 19 shows an example of a link. Once a link is stored, it can be re-run as desired. It can be run interactively, or scheduled to run unattended at a specific date and time. A link can be scheduled to run at regular intervals, such as once a day. In the present embodiment, the AlphaCONNECT machine 102 accepts only link notation for data delivery tasks. Other embodiments of the invention need not be so limited. With the machine 102, links are stored on a disk in a \Links subdirectory, having the file type .lk.

FIGS 5A, 5B and 5C illustrate the link notation parameters defined for machine 102. A link is composed of one or more sections. A section is identified by a line containing a section name, enclosed in square brackets. In the machine 102, fifteen section names have been defined: Link, Word, WordPerfect, WordPro, Excel, Quattro, 1-2-3, Access, Paradox, Approach, Notes, html, email, IE and Netscape. Other section names could be defined in other embodiments or by plug-ins. A link may contain additional sections for target application-specific parameters, network type parameters, or other areas in which extensibility is desired. In the machine 102, the defined section names are reserved and should not be used by a plug-in, for example. In the present embodiment, the section names not illustrated in FIGS. 5A, 5B and 5C do not have link parameters associated with them.

FIG. 5A illustrates parameters for the Link section. FIG. 5B illustrates parameters for the HTML section. FIG. 5C illustrates parameters for the ODBC section. With respect to each parameter illustrated in FIGS. 5A–C, the word on the left of each equal sign is the name of the link parameter. The word on the right of the equal sign represents the value that is assigned to the associated link parameter. The following provides a general model for a link and a specific example of a link in an adjacent column:

| Model | Example |
| --- | --- |
| [SectionName-1] | [Link] |
| Statement-1 | HostAddress=http://www.alphamicro.com |
| Statement-2 | DestDir=e:\xfer |
| . . . | |

-continued

| Model | Example |
|---|---|
| Statement-n | SourceProtocol=0 |
| [SectionName-2] | [html] |
| Statement-1 | HTMLtemplate=e:\html\main.htm |
| Statement-2 | HTMLformat=1 |
| ... | |
| Statement-n | HTMLbackground=#FFFFFF |
| [SectionName-3] | [ODBC] |
| Statement-1 | DataSource=Microsoft SQL Server |
| Statement-2 | User=jsmith |
| ... | |
| Statement-n | Query=SELECT*FROM Customers WHERE STATE='CA' |

The following are brief descriptions of link parameters used by machine 102. Plug-ins and the modules of the model 300 are described after the description of the links.

In FIG. 5A, the Version parameter 502 indicates the version of link notation used by a particular link. In the present embodiment, the only valid version parameter values are 1.0, 1.1 and 2.0. Thus, a link might have a link parameter Version=2.0.

The Description parameter 504 indicates a descriptive name of the link. The value of the description parameter may also be passed to a target application as a title, header, or description. The argument value is a text phrase 1 to 140 characters in length which in the machine 102 can be specified by the external context through the external interface. Certain symbols may be embedded in the value of the description parameter. These symbols are resolved when a link is executed and replaced by their values-at-runtime. In the present embodiment, these symbols are:

{d} day of the month in natural format for the computer 112
{m} month of the year in natural format for the computer 112
{y} year in natural format for the computer 112
{d2} day of the month in 2-digit notation (e.g. 03 or 31)
{m2} month of the year in 2-digit notation (e.g. 05 or 12)
{y2} year in 2-digit notation (e.g. 97)
{y4} year in 4-digit notation (e.g. 1997)

An example of the use of the description parameter is Description=Census Bureau California Population Data.

The TargetApp parameter 561 is a text string that indicates the nature of the data target 106. The following codes have been defined, but other embodiments or plug-ins may use other values.

| 1-2-3 | for Lotus 1-2-3 ™ |
| access | for Microsoft Access ™ |
| approach | for Lotus Approach ™ |
| quattro | for Corel Quattro Pro ™ |
| excel | for Microsoft Excel ™ |
| iexplore | for Microsoft Internet Explorer ™ |
| media-player | for Windows Media Player ™ |
| netscape | for Netscape Navigator ™ |
| notepad | for Windows Notepad ™ |
| paintbrush | for Windows Paintbrush ™ |
| paradox | for Borland Paradox ™ |
| word | for Microsoft Word ™ |
| wordperfect | for Corel WordPerfect ™ |
| wordpro | for Lotus Word Pro ™ |
| write | for Windows Write ™ |

The Document parameter 506 indicates the name (without drive, directory, or other account information) that the target file 110 (see FIGS. 1 and 3) containing the data in its target format will be named. This file might be a new file or a pre-existing file. Machine 102 may provide data directly to the file 110 or indirectly through a target application. The value of the Document parameter 506 is a file name that is legal to the computer 112. On most computers, this value is a filename.type designation. On machine 102, the Document parameter 506 is required and must appear exactly once in a link. An example of the use of the document parameter 506 is Document=stocks.htm The DataSource parameter 508 is used in the [Link] section to specify the name of the file on the data source 104 (without drive, directory, or other account information) from which the data is being retrieved. This parameter specifies the location of the data 108 on the data source 104. The value of the DataSource parameter 508 is a file name that is legal and exists on the data source 104. For example, it might be a legal and existing filename on a remote computer. On most computers, this file name uses a filename.type designation. In the present embodiment, this parameter is required and must appear exactly once in a link. An example of the use of the DataSource parameter 508 is DataSource=stocks.txt.

The DestDir parameter 510 identifies the path/directory/account on the computer 112 where the file 110 is to be created or updated. The value of the DestDir parameter 510 is a path/directory/account specification that is legal on the computer 112. The following symbols may be embedded in the parameter value for portability of links. The symbol $root$ is replaced by the root directory of the software 114 from the computer 112. The symbol $sub$ is replaced by the default subdirectory of the data target 106 on computer 112. This DestDir parameter 510 is optional and may appear up to one time in a link. If the DestDir parameter 510 is omitted, the root directory of the software 114 and the logical subdirectory for the data target 106 are used by the machine 102 to derive the value for the DestDir parameter. In other words, the default value for DestDir, if not specified, is $root$$sub$, which might evaluate to c:\connect\excel on a particular system, for example. An example of the use of the DestDir parameter 510 is DestDir=c:\documents The HostAddress parameter 512 identifies the data source 104. In the present embodiment, the value of the HostAddress parameter 512 is a value such as a TCP/IP address which includes four integers, 0<=n<=255, separated by periods (such as 192.245.218.138) or TCP/IP resolvable name (such as ftp.alphamicro.com). The HostAddress parameter 512 may accept other types of values (e.g. an identification legal for the particular network technology being used) if a different type of network technology is being used, for example. In the present embodiment, the HostAddress parameter 512 is required and must appear exactly once in a link. If a data acquisition plug-in is specified, the HostAddress parameter will contain the name of the data acquisition plug-in. An example of the use of the HostAddress parameter 512 is HostAddress=192.245.218.138.

The Mapping parameter 514 describes the mapping of data from the normalized/filtered version of the source data 120 (discussed below) into the target file 110. This parameter is used by the data mapping module which retrieves the normalized/filtered data, for example, from the file 120'. The parameter value of the Mapping parameter 514 is a string of 1 or more field definitions, separated by semicolons. Each field definition consists of a number of field-definition parameters. The value of each field-definition parameter is enclosed in curly brace characters.

In the present embodiment, the Mapping parameter 514 is used for textual data. In embodiments of the invention, the mapping parameter may also be used for multimedia data. In each link that deals with textual data, the Mapping parameter 514 is assigned at least one field definition. Any number of field definitions is permitted, but a particular implementation of software 114 may impose an upper limit. The present embodiment supports at least 35 field definitions. An implementation should ignore field definitions beyond such an upper limit without complaint and without losing synchronization with the remainder of the link.

The data model of the machine 102 enables a wide variety of text data formats to be processed intelligently. The data model can be used with data as free-form as paragraph text, or data as rigidly structured as an accounting report. The normalized data form is represented by an array of field-definition parameters and a repetition array. The two combine to permit modeling of may different text data formats. Table oriented data relatively easily falls into the normalized data model. Columns of data from a report, for example, may directly correspond to machine 102's normalized data form. Paragraph formatted text is treated as a single wide non-space padded field per record (line). Data exported from database products, often in comma-, tab-, or custom-delimited form, is also accepted by the normalized data model.

The field mapping data model for a link consists of a number of fields: <field mapping arrayl>:=[<field>[<field>...]]. Each field indicates a segment of the data in the file 120' to be captured. This segment may be as broad as all data in the file 120', or as narrow as a single character of one particular line on a page of the data 120'. Each field includes a number of field-definition parameters. In the machine 102, eight field-definition parameters are used. In particular, page, line, column, width, cell, fieldname, alignment and font field-definition parameters are used. I.e. <field>:= <line><column><width><cell><fieldname> <alignment><font>.

The page field-definition parameter is either a specific page number or an asterisk, indicating all pages in the range. The page field-definition parameter identifies the page number of the data in the file 120' where the data to be acquired is found. The value of the page field-definition parameter may be an integer in the range 1 through p, where p is the maximum number of pages a particular implementation of machine 102 supports. To specify that a field mapping is to be repeated for every page of the data in the file 120', the page field-definition parameter is given a value of p rather than a positive integer. :=integer|p.

The line field-definition parameter is either a specific line number or an asterisk, indicating all lines on the page. The line field-definition parameter identifies the line number of the page of the data in the file 120' where the data to be acquired is found. The value of this parameter may be an integer in the range 1 through |, where | is the maximum number of lines an implementation supports. To specify that field mapping is to be repeated for every line of the page, the line field-definition parameter is given a value of l rather than a positive integer.
<line>:=integer |l.

The column field-definition parameter is either a specific column number (for fixed-width data) or an ordinal field number (for delimited data). The column field-definition parameter identifies the column of the line of the page of the data in the file 120' where the data to be acquired is found. For fixed width data, the value of the column field-definition parameter may be an integer in the range 1 through u, where u is the maximum line length an implementation supports. <column>:=integer |u|null.

The width field-definition parameter specifies the width of the field of the data to be acquired from data in the file 120'. For fixed-width data, this is the number of characters to capture from the source line. For delimited data, this field is not required. The value of this parameter may be an integer in the range 1 through u−c+1, where u is the maximum line length an implementation supports and c is the column field-definition parameter. <width>:=integer|null.

The cell field-definition parameter indicates the cell or field (if applicable) of the target file 110 where the data from the file 120' will be sent. The cell field-definition parameter is data target specific. The value of this parameter is always specified in the form field "name number." If the target field is a repeating field (used in multiple lines and/or pages), an asterisk (*) should be specified in place of a positive integer for the "number" portion of the cell field-definition parameter value. The name and number should follow the rules for legal field names in the target application. Thus, for example, Al or B* are valid parameter values for a cell field-definition parameter for Excel worksheets. Name*, Address*, and Phone* are acceptable values for cell field-definition parameters for Access databases. A cell of A3 when sending data to Excel indicates the cell named "A3". Cell references may use the asterisk symbol in order to auto-increment a row number, as in "A*". <cell>:=letter integer |letter * |{application-specific location}.

The fieldname field-definition parameter is used if the data source 104 is an ODBC database. This field associates a data item from the database with the data mapping field. <fieldname>:=databasefieldname |null.

The alignment parameter allows left-, right-, or centered-alignment to be specified for target applications that honor field/cell alignment. <alignment>:=L |R |C |null.

The font field-definition parameter allows a font, font size, bold, italic, and/or underscoring attribute to be specified for target applications that honor field/cell font control. <font>:=fontname [fontsize][B][I][U]| null An example of the use of the Mapping parameter 514 is Mapping={p}, {|}, 1,4,A{r};{p}, {1},8,7,B{r};{p},{1},16, 7,C{r};
{p},{1},27,7,D{r};{p},{1},37,7,E{r};{p},{1},48,9,F{r};
{p},{1},58,8,G{r};{p},{1},68,6,H{r};

The HostDir parameter 516 identifies the directory/path/account where the data 108 resides on the data source 104. The value of this parameter may be blank or a legal account name of the data source 104, for example. The HostDir parameter 516 is optional, and may not appear more than once in a link. If omitted, the default value is blank (an empty string). An example of the use of the HostDir parameter 516 is HostDir=/pub/stocks.

The Pages parameter 518 identifies the number of pages of the data in the file 120' that the machine 102 will process. The value of this parameter may be a positive integer up to the upper limit allowed by the particular implementation or an asterisk (*), which indicates all pages of the data are to be processed. The Pages parameter 518 is required and must appear exactly once in each link. An example of the use of the Pages parameter 518 is Pages=*.

The Rows parameter 520 identifies the number of lines on each page of the data in the file 120' that the machine 102 will process. The value of this parameter 520 may be a positive integer up to the upper limit allowed by the particular embodiment of the invention or an asterisk (*), which indicates all lines of a page are to be processed. The Rows parameter 520 is required and must appear exactly once in each link. An example of the use of the Rows parameter 520 is Rows=*.

The StartPage parameter 524 indicates the starting page of the data in the file 120' that machine 102 will process. A value of 1 starts on the first page of the data in file 120', while a higher value causes the specified number of initial pages to be skipped over. This parameter will have a value that is a positive integer, in range 1 through the upper limit allowed by the particular embodiment of the invention. An example of the use of the StartPage parameter is StartPage=1.

The ReportFormat parameter 526 provides the machine 102 with information about the structure of the data in the file 120' when it is the normalized text format. The currently defined and reserved structure codes are listed below. The values of this parameter is an integer greater than or equal to zero. Additional codes may be added in alternate embodiments or by plug-ins in the present embodiment.

| | |
|---|---|
| 0 | typical report (repeating lines and/or pages of data fields) |
| 1 | pure text (paragraph-formatted text) |
| 2 | complex (combination of discrete fields and/or repeating fields and/or paragraph text) |
| 3 through 99 | reserved |
| 100 and higher | available for users and third parties |

An example of the use of this parameter is ReportFormat=0

The StartRow parameter 528 identifies the starting "row" (or the equivalent for the particular data target) on each page in the target file 110 where the delivered data 122 is to be inserted. This parameter 528 is used when the cell field-definition parameter of the Mapping parameter 514 contains an asterisk. In particular, it provides an "offset" as to where the delivered data is to be placed. The StartRow parameter 528 enables links to deliver the data 122 to the data target 106 where the data target 106 contains pre-existing formatting, macros, formulas, headings, or prior data, for example and it is desired that this pre-existing formatting, macros, formulas, headings, or prior data be left untouched.

Thus, suppose Excel is the data target 106 and an Excel spreadsheet is the target file 110. If StartRow is set to 5, then fields mapped with names A*, B*, and C* would transmit data to the following Excel cells as the link runs:

First record of data→cells A5, B5, C5

Second record of data→cells A6, B6, C6

Third record of data→cells A7, B7, C7

And so forth

The StartLine parameter 530 indicates the starting line of each page from the data in the file 120' that is to be processed by machine 102. The minimal value is 1, which starts processing a page of data at the first line. Higher values cause lines to be skipped at the top of pages. The StartLine parameter 530 can be desirable to bypass title or header data in the data.

The ImportMethod parameter 532 identifies the import methodology to be used when transferring data fields to a data target 106. The currently defined and reserved codes are listed below. Additional codes may be added by software implementation.

1 field-oriented: all mapped fields in a record are passed as defined to the data target as mapped.

2 line-oriented: all mapped fields in a record are concatenated into a single field and passed to the field name and number specified in the first cell field-definition parameter associated with that record.

3 through 99 reserved

The Sheet parameter 534 indicates a location in the target file 110 where the delivered data 122 is to be inserted. This parameter is optional. Its values are specific to the particular data target 106 to which the data is being delivered. In particular, the value of parameter 534 may be a sheet, a layer, a bookmark or a table, for example, as appropriate to the target application. A blank value or an omitted Sheet parameter implies that the default location for the target application be used. This default location typically will be specified by the data target 106.

The following data target 106 specific Sheet parameter 534 values are used in the machine 102. For new data targets 106, vendors may select their own values for Sheet parameters appropriate to the specific data target 106.

| Data Target | Meaning of Sheet parameter value | Default Value used by data target if the parameter value is blank or omitted |
|---|---|---|
| Microsoft Excel | Sheet name | Sheet1 |
| Quattro Pro | Tab name | A |
| Lotus 1-2-3 | Sheet name | first sheet |
| Microsoft Word | Bookmark name | /EndOfDoc |
| WordPerfect | Bookmark name | (end of document) |
| Lotus Word Pro | Bookmark name | (end of document) |
| Microsoft Access | Table name | Table1 |
| Borland Paradox | unused | unused |
| Lotus Approach | unused | unused |
| Netscape Navigator | n/a | n/a |
| Internet Explorer | n/a | n/a |
| Notepad | n/a | n/a |
| Write | n/a | n/a |
| Paintbrush | n/a | n/a |
| Media Player | n/a | n/a |

The IgnoreBlanks parameter 536 indicates whether blank lines in the data in the file 120' are to be filtered out (−1) by the data filter module 310 or are to be left in as data (0). The possible values for this parameter 536 are 0 (false) or −1 (true).

The IgnoreText parameter 538 indicates whether or not non-blank lines of the data in the file 120' that contain specified text are to be filtered out (−1) or processed as data (0). If set to −1, machine 102 uses IgnoreTextn clauses that are appended to the parameter 538 following the −1 to identify text lines in the data that are to be bypassed. The IgnoreTextn clauses contain a text string input by a user, for example, where the user wants lines containing the specified text string to be omitted from the data.

The RequireText parameter 563 indicates whether or not lines that do not contain the required text are to be filtered out (parameter value=−1) or processed (parameter value=0). If set to −1, the RequireTextn clauses appended to the parameter 563 following the −1 are used to identify text lines to be included. Only text lines containing the required value will be retained. An example of the use of this parameter is RequireText=0.

The Overwrite parameter 540 indicates whether an existing target file 110 should be overwritten (replaced) or updated (amended) when a particular link is executed. A value of 0 (false) of the Overwrite parameter in a link causes the link to update the target file 110 if it already exists. If the target file 110 does not exist, the link will create a new target file 110. A value of −1 (true) causes the machine 102 to create a new target file 110 even if a target file having the name specified by the link parameters already existed.

The PadSpaces parameter 542 indicates whether or not data fields in the mapped data should be space padded so that the data fields have a fixed width. Some combinations of data and specific target applications lend themselves to fixed width data spacing, while others do not. A value of 0 (false) trims all leading and trailing spaces from data fields and passes the data to the target application in varying widths. A value of −1 (true) space pads data to the right until the data field is the maximum width permitted by the width field-definition parameter of the Mapping parameter.

The LineBatching parameter 544 defines the number of lines of the data in file 120' that will be concatenated and treated as a single line by the DM module 312. A value of 1 processes each line of the data in file 120' in a direct 1:1 correlation. A higher value of the LineBatching parameter such as a value n will group lines of the data in file 120' together by concatenation in an n:1 ratio. Thus, every n lines will be treated as a single line. This parameter 544 is useful for handling data 108 where the values of data 108 on successive lines differ, but where the pattern of data in every n groups of lines, for example is repeating. For example, none of lines one to five may have the same data pattern as each other. But line six might have the same data pattern as line one, line seven the same data pattern as line two, line eight the same pattern as line three, line nine the same pattern as line four and line ten the same pattern as line five. If this pattern recurs every five lines, it might be desirable for processing to have the data mapping module treat lines one to five as a single line, lines six to ten as a single line, lines 11 to 15 as a single line, and so on. Each of these contcatenated single lines will then have the same data pattern and may be easier to map to a target file 110.

The Xfer parameter 546 indicates the frequency at which the data 108 changes on the data source 104. This parameter enables data to be retrieved more or less frequently depending on the frequency at which the data 108 of the data source 104 changes. The possible values of the parameter 546 are:

0—data changes frequently (obtain fresh copy of data 120 every time link runs)

1—data changes daily (obtain fresh copy of data 120 if the data in file 120' is older than today)

2—data never changes (obtain fresh copy of data 120 only if there is no file 120' already storing data for the link)

3–99 reserved Other values could be used by other embodiments or by plug-ins.

The UserName parameter 548 identifies the login user name, if applicable, for connecting to the data source 104. Some communications protocols, such as FTP, require a user name and password. If the communications protocol in use does not require a user login, the AlphaCONNECT machine 102 will ignore this value. If omitted, the value of theUserName parameter 548 defaults to anonymous, which is a common Internet default for public-access FTP sites. In the present embodiment, this parameter can have a value that is a text string of 0–100 characters in length.

The Password parameter 550 identifies the password to supply along with the UserName parameter 548, if applicable, for connecting to the data source 104. Some communications protocols, such as FTP, require a user name and password. If the communications protocol in use does not require a user login, the AlphaCONNECT machine will ignore this value. If omitted, the value of the Password parameter 550 defaults to an empty string (""). In the present embodiment, this parameter can have a value that is a text string of 0–100 characters in length.

The Obtain parameter 552 sets the data acquisition method and frequency, as follows.

| Value | Meaning |
| --- | --- |
| 0 | Obtain the data from a local file when executing a link |
| 1 | Always obtain the data from the data source 104 when executing a link |
| 2 | Obtain the data from a remote computer "daily"-use local cached data in a local cache file if present and same-day |
| 3 | Obtain the data from a remote computer "once"-use local cached data if present |
| 4–999 | Reserved |

The values 2 and 3 specify that a cached copy of the data 120 (before processing) is to be used. This cached data can be saved in a local cache file from which the machine 102 knows to aquire it.

The LocalFile parameter 554 specifies the name of the file local to the computer 112 that is to be used as the data source 102 when the Obtain parameter 552 is set to 0 (local file data source). The value must be a valid file specification for the computer 112. An example of the use of this parameter is LocalFile=c:\newdata\latest.dat.

The Created parameter 556 records the creation time of a link. In the present embodiment, the external interface 302 of the AlphaCONNECT machine 102 permits the creation of links. Accordingly, the creation date and time of a link is written to the Created parameter when the link is saved. In the present embodiment, the values of this parameter use a string representation of date/time, formatted as mm-dd-yyyy hh:mm: ss An example is Created=02-02-1996 22:58:50.

The Revised parameter 558 records the last revision time of a link. The external interface 302 of the AlphaCONNECT machine 102 permits the editing of links. Accordingly, the revision date and time of a link is written to the Revised parameter 558 when the link is saved. In the present embodiment, the values of this parameter use a string representation of date/time, formatted as mm-dd-yyyy hh:mm:ss. An example is Revised=02-28-1996 09:36:37.

The Target parameter 560 selects a destination naming method. A value of 0 uses the DestDir and Document parameters to determine the directory and file name of the file 110. A value of 1 automatically deduces the output directory and name based on defaults in the implementation of the AlphaCONNECT machine 102 (which may draw upon user-accessible defaults).

Values: 1) 0: specific directory and filename for target defined in link parameters DestDir and Document 2) 1: location and name of target should be derived/assigned automatically by the software from user accessible defaults Example: Target=0.

The SourceProtocol parameter 562 indicates the method of data acquisition. A value of 0 causes an FTP transfer to be used to acquire the source data. A value of 1 causes an HTTP transfer to be used to acquire the source data. A value of 2 executes a third-party 'plugin' program to acquire the data. Values 3 through 999 are reserved for future extensions to link notation. A plug-in may support additional protocols, which should be mapped to values 1000 and higher.

| Values: Value | Meaning |
| --- | --- |
| 0 | FTP protocol data acquisition |
| 1 | HTTP protocol data acquisition |
| 2 | Execute plug-in program to acquire data |
| 3–999 | Reserved |
| Example: | SourceProtocol=1. |

The SourceConversion parameter 564 identifies the format conversion method to be applied to the data 120 from the data source 104. This parameter is used by the Format conversion module. The AlphaCONNECT machine 102 can inherently handle direct text or HTML, with the ability to convert one form into the other.

Values:
| Value | Meaning |
| --- | --- |
| 0 | leave data 120 unchanged (text or HTML, to remain in same format in target) |
| 1 | convert data 120 which is in an HTML format to text (remove HTML tags and provide a text facsimile) |
| 2 | convert data 120 which is in an HTML format to "portable" HTML (i.e. include just the BODY portion of the HTML document) |
| Example: | SourceConversion=1. |

The LastRun parameter 566 records the last time a link was executed.

The AlphaCONNECT machine 102 updates this parameter when running a link. This link is assigned a value of the date and time formatted as mm-dd-yyyy hh:mm:ss. An example is LastRun=04-30-1996 08:36:07.

The LastRuntime parameter 568 records the elapsed (chronological) time of the last execution of this link. The AlphaCONNECT machine 102 updates this parameter after running a link. This link is assigned a value of the elapsed time since the link was last run, formatted as h:mm:ss. An example is LastRuntime=0:00:07.

The Results parameter 570 indicates the completion status of the link. The value is a text phrase, set to 'successful' or an error message. This parameter may be used to inform the external context 301 about the nature of an error. The error message may be specific to the machine 102 or may be an operating system error message, for example.
Values: 1) successful
  2) error message
Example: Results=successful.

The FormatConversionPlugin parameter 572 specifies the name of an external program to be called as a format conversion replacement for the work normally done by the FC module 308. This parameter is optional; if specified, the user is overriding AlphaCONNECT's inherent format conversion features with an external plugin program.
Values: 1) Blank (indicates no plug-in)
  2) File specification, valid for the implementation platform
Example: FormatConversionPlugin= c:\connect\plugins\cvtdoc.exe.

The DataFilter parameter 575 specifies the name of an external program to be called as a data filter replacement for work normally done by the DF module 310. This parameter is optional; if specified, the indicated program by the value of this parameter will be executed.

The DeliveryPlugin parameter 574 specifies the name of an external program to be called as a delivery extension for the delivery features provided by the Data Delivery module 314. This parameter is optional; if specified, the indicated program will be executed, in addition to any other delivery options that have been enabled in the link.
Values: 1) Blank (indicates no plug-in)
  2) File specification, valid for the implementation platform
Example: DeliveryPlugin=ProgramFileName.

The DeliverFTP parameter 576 enables or disables FTP delivery of the link's target file 110 to another computer, via the FTP protocol. A value of −1 enables FTP delivery; a value of 0 disables it. This parameter is used by the data delivery module 314 to determine if it will deliver the file 110.

Values: 1) 0 disables FTP delivery
  2) −1 enables FTP delivery
Example: DeliverFTP=−1.

The DeliverFTPsystem parameter 578 specifies the name of the remote computer to which the file 110 is to be FTP delivered. This parameter is not required unless DeliverFTP is set to −1 (enables).
Values: 1) Internet name of an FTP server
  2) Internet address of an FTP server
  3) Blank
Example: DeliverFTPsystem=smith.alphamicro.com.

The DeliverFTPuser parameter 580 specifies the user name for FTP delivery sign-on to the remote computer. This parameter is not required unless DeliverFTP is set to −1 (enabled).
Values: 1) User name for FTP sign-on to the remote computer
  2) Blank
Example: DeliverFTPuser=jsmith.

The DeliverFTPpassword parameter 582 specifies the password for FTP delivery sign-on to the remote computer. This parameter is not required unless DeliverFTP is set to −1 (enabled).
Values: 1) Password for FTP sign-on to the remote computer
  2) Blank
Example: DeliverFTPpassword=buzzard The DeliverFTPdir 584 parameter indicates a directory name for FTP delivery to a remote computer. This parameter is optional.
Values: 1) Directory name, valid for remote computer
  2) Blank
Example: DeliverFTPdir=/pub/stocks The DeliverFTPfile parameter 586 specifies the name by which the target file should be transmitted to a remote computer during FTP delivery.
This parameter is optional.
Values: 1) File specification, valid for remote computer
  2) Blank
Example: DeliverFTPfile=test1.html The DeliverEmail parameter 588 enables or disables electronic mail delivery. If set to −1 (enabled), the target file 110 is e-mailed to one or more recipients as specified by the DeliverEmailRecipient parameter.
Values: 1) 0 disables electronic mail delivery
  2) −1 enables electronic mail delivery
Example: DeliverEmail=−1

The DeliverEmailRecipient parameter 590 specifies one or more recipients for electronic mail delivery of the target file 110. If multiple recipient names are specified, they should be separated by a semicolon.
Values: 1) List of one or more e-mail recipients
Example: DeliverEmailRecipient=John Forbes; Steve Mills The SaveExit parameter 592 enables or disables automatic save and shutdown of the data target 106 when the data target is a target application. Embodiment are free to insist that this option be enabled in order to safely perform any data delivery tasks.
Values: 1) 0 disables save and exit (application is left open after link execution)
  2) 1 enables save and exit (application saves results and exits at end of link execution)
Example: SaveExit=−1.

The Append parameter 594 indicates whether newly acquired data 120 should be treated in isolation, or appended to previously acquired data 120 in the cached file that contains the previous data 120. A value of −1 (enabled) will add new data to previous data in the file. A value of 0 always discards any data in a previous file.
Values: 1) 0 do not append to previous data
2) −1 append to previous data
Example: Append=0.

The DataType parameter 571 is assigned an integer value that represents the type of data 120 that is being retrieved from the data source 104. This parameter may represent data of a Report/Table, Text, Image, Audio or Video type.

The DataFormat parameter 573 is assigned an integer value that represents the format of the data 120 that is being retrieved from the data source 104. When the datatype parameter specifies a Report/Table type, this parameter may represent data having a fixed width, comma-delimited, tab-delimited or custom delimited format. When the datatype parameter specifies an image type, the DataFormat parameter 573 may represent BMP, GIF, JPEG, PCX, TIFF, WMF or icon data. When the datatype parameter specifies an audio type, the DataFormat parameter 573 may represent MIDI, Wave or RealAudio formats. When the datatype parameter specifies a video type, the DataFormat parameter 573 may represent AVI, MPEG or QuickTime formats.

The FieldDelimiter parameter 565 defines field delimiters for use with delimited data. The delimiters are listed as zero or more decimal character codes, each enclosed in square brackets. Values: Zero or more decimal character codes, enclosed in square brackets, as in [13]. Example: FieldDelimiter-[32].

The RecordDelimeter parameter 567 defines record delimiters for use with delimited data. The delimiters are listed as zero or more decimal character codes, each enclosed in square brackets. Values: Zero or more decimal character codes, enclosed in square brackets, as in [13]. Example: RecordDelimiter=[13][10].

The PageDelimiter parameter 569 defines page delimiters for use with delimited data. The delimiters are listed as zero or more decimal character codes, each enclosed in square brackets. Values: Zero or more decimal character codes, enclosed in square brackets, as in [13]. Example: PageDelimiter=[12].

The parameters in [HTML] section are used with links that create HTML (hyper text markup language) output, rather than sending fields of data to a target application such as a word processor or spreadsheet.

The HTMLmethod parameter 501 selects an HTML generation method for creating the target file.

| Value | Values: Meaning |
|---|---|
| 0 | Simple: a simple HTML document is created without user-control over form or presentation. The form and presentation are predefined by the machine 102. |
| 1 | Wizard: an HTML document is created based on web wizard settings. The web wizard settings are specified in other HTML section links. |
| 2 | Template: an HTML document is created based on an HTML template document. |
| Example: | HTMLmethod=1 |

The HTMLrules parameter 503 is a web wizard parameter. It enables or disables the appearance of horizontal rules in the generated HTML document.
Values: 1) −1 include horizontal rules in the target file 110.
2) 0 do not include horizontal rules in the target file 110.
Example: HTMLrules=−1

The HTMLbackGraphic parameter 505 is a web wizard parameter. It enables or disables a background graphic in the generated HTML document. If enabled, the HTMLback-GraphicSpec parameter identifies the name of the graphic file to use as background.
Values: 1) 0 no background graphic
2) −1 include a background graphic
Example: HTMLbackGraphic=−1

The HTMLbackGraphicSpec parameter 507 is a web wizard parameter. It specifies the name of the graphic file to be used as a background in the target HTML document. The present embodiment uses GIF and JPEG format graphic files.
Values: 1) File specification, valid for implementation platform
2) Blank
Example: HTMLbackGraphicSpec=goldtile.jpg.

The HTMLtitleGraphic parameter 509 is a web wizard parameter. It enables or disables the use of a title graphic in the target HTML file. If enabled, the HTMLtitleGraphicSpec parameter identifies the name of the title graphic file.
Values: 1) 0 no title graphic
2) −1 title graphic
Example: HTMLtitleGraphic=0

The HTMLtitleGraphicSpec parameter 511 is a web wizard parameter. It specifies the name of the graphic file to be used as a title graphic in the target HTML document. The present embodiment uses GIF and JPEG format graphic files.
Values: 1) File specification, valid for implementation platform
2) Blank
Example: HTMLtitleGraphicSpec=banner.gif The HTMLforeColor parameter 513 is a web wizard parameter. It enables or disables a custom foreground text color for the generated HTML document. If enabled, the HTMLforeColorCode parameter provides the HTML color code.
Values: 1) 0 no foreground color settings for text
2) −1 foreground color is defined
Example: HTMLforeColor=−1.

The HTMLforeColorCode parameter 515 is a web wizard parameter. It supplies a standard 6-digit hex HTML color code to be used as a foreground color for text in the generated HTML document. This parameter only has an effect if HTMLforeColor parameter 513 is enabled.
Values: 1) #nnnnnn hexadecimal HTML color code
Example: HTMLforeColorCode=#0080FF.

The HTMLbackColor parameter 517 is a web wizard parameter. It enables or disables a custom background color for the generated HTML document. If enabled, the HTMLbackColorCode parameter provides the HTML color code.
Values: 1) 0 no background color setting
2) −1 background color is defined
Example: HTMLbackColor=−1.

The HTMLbackColorCode parameter 519 is a web wizard parameter. It supplies a standard 6-digit hex HTML color code to be used as a background color in the generated HTML document. This parameter only has an effect if HTMLbackColor is enabled.
Values: 1) #nnnnnn hexadecimal HTML color code
Example: HTMLbackColorCode=#FFFFFF.

The HTMLlinkColor parameter 521 is a web wizard parameter. It enables or disables a custom link color for the generated HTML document. If enabled, the HTMLlinkColorCode parameter provides the color code for the HTML link.

Values: 1) 0 no link color setting

2) –1 link color is defined

Example: HTMLlinkColor=–1.

The HTMLlinkColorCode parameter 523 is a web wizard parameter. It supplies a standard 6-digit hex HTML color code to be used as an unvisited link color in the generated HTML document. This parameter only has an effect if HTMLlinkColor is enabled.

Values: 1) #nnnnnn hexadecimal HTML color code

Example: HTMLlinkColorCode=#80FFFF.

The HTMLvisitColor parameter 525 is a web wizard parameter. It enables or disables a visited link color for the generated HTML document. If enabled, the HTMLvisitColorCode parameter provides the HTML color code.

Values: 1) 0 no visited link color setting

2) –1 visited link color is defined

Example: HTMLvisitColor=–1.

The HTMLvisitColorCode 527 is a web wizard parameter. It supplies a standard 6-digit hex HTML color code to be used as a visited link color in the generated HTML document. This parameter only has an effect if HTMLvisitColor is enabled.

Values: 1) #nnnnnn hexadecimal HTML color code

Example: HTMLvisitColorCode=#FFFFFF.

The HTMLheaderFont parameter 529 is a web wizard parameter. It enables or disables a custom header text font. If enabled, the HTMLheaderFontxxxxx options supply information about size and style.

Values: 1) 0 no custom header font

2) –1 custom header font

Example: HTMLheaderFont=–1.

The HTMLheaderFontSize parameter 531 is a web wizard parameter. It specifies a font size, in the range 1 through 7, for header text. This parameter is ignored when HTMLheaderFont is not enabled (–1).

Values: 1) integer, 1 <=n <=7

Example: HTMLheaderFontSize=5.

The HTMLheaderFontBold parameter 533 is a web wizard parameter. It enables or disables boldface type for header text.

Values: 1) 0 no bold

2)–1 bold

Example: HTMLheaderFontBold=–1.

The HTMLheaderFontItalic parameter 535 is a web wizard parameter. It enables or disables italicized type for header text.

Values: 1) 0 no italics

2) –1 italics

Example: HTMLheaderFontItalics=0.

The HTMLheaderFontUnder parameter 537 is a web wizard parameter. It enables or disables underscored type for header text.

Values: 1) 0 no underscore

2) –1 underscore

Example: HTMLheaderFontUnder=0.

The HTMLbodyFont parameter 539 is a web wizard parameter. It enables or disables a custom body text font. If enabled, the HTMLbodyFontxxxxx options suppy information about size and style.

Values: 1) 0 no custom body font

2) –1 custom body font

Example: HTMLbodyFont=–1.

The HTMLbodyFontSize parameter 541 is a web wizard parameter. It specifies a font size, in the range 1 through 7, for body text. This parameter is ignored when HTMLbodyFont is not enabled (–1).

Values: 1) integer, 1 <=n <=7

Example: HTMLbodyFontSize=2.

The HTMLbodyFontBold parameter 543 is a web wizard parameter. It enables or disables boldface type for body text.

Values: 1) 0 no bold

2)–1 bold

Example: HTMLbodyFontBold=–1.

The HTMLbodyFontItalic parameter 545 is a web wizard parameter. It enables or disables italicized type for body text.

Values: 1) 0 no italics

2)–1 italics

Example: HTMLbodyFontItalics=0.

The HTMLbodyFontUnder parameter 547 is a web wizard parameter. The HTMLbodyFontUnder parameter enables or disables underscored type for body text.

Values: 1) 0 no underscore

2) –1 underscore

Example: HTMLbodyFontUnder=0.

The HTMLformat parameter 549 is a web wizard parameter. The HTMLformat parameter selects a formatting style for data as it is inserted into a web page.

| | Values: |
|---|---|
| Value | Meaning |
| 0 | Format data as text paragraphs |
| 1 | Format data as monospaced columns |
| 2 | Format data as an ordered list (numbered) |
| 3 | Format data as unordered list (bulleted) |
| 4 | Format data as a Netscape-style table |
| 5–999 | Reserved |
| Example: | HTMLformat=4. |

The HTMLmono parameter 551 is a web wizard parameter. It enables or disables monospaced text. A value of 0 uses monospaced text font. A value of –1 uses standard text font. Example: HTMLmono=0.

The HTML 30 parameter 556 indicates whether or not HTML 3.0 extensions may be used in generating an HTML file (web page). If disabled, HTML 3.0 extensions may not be used and HTML 2.0 features are used.

Values: 1) 0 disable HTML 3.0 extensions

2) –1 enabled HTML 3.0 extensions

Example: HTML30=–1.

The Netscape parameter 559 indicates whether or not Netscape extensions may be used in generating an HTML file (web page). If disabled, Netscape extensions may not be used.

Values: 1) 0 disable Netscape extensions

2) –1 enabled Netscape extensions

Example: Netscape=–1.

The HTMLtemplate parameter 553 is a parameter that is used by the machine 102 when it uses a template to produce a file 110 having an HTML format. The HTMLtemplate parameter identifies the name of an HTML file that is to be used as a model for creation of the web page. The template file is copied, and extensions to HTML provided by the machine 102 are replaced by run-time values. HTML extensions that are honored by the machine 102 are discussed below.

Values: 1) Blank

2) File specification, valid for implementation platform

Example: HTMLtemplate=$root$\web\template.htm.

The GatewayDelivery parameter 555 enables or disables posting to the default gateway computer in a user's network.

The AlphaCONNECT machine 102 has options for recording a user's local gateway settings (system name, FTP user name, password, and directory).
Values: 1) 0 no gateway delivery
    2) −1 delivery target HTML file to gateway computer using FTP
Example: GatewayDelivery=−1.

Links that specify an ODBC data source will have an [ODBC] section. ODBC section parameters are illustrated in FIG. 5C. These ODBC parameters are used to gain access to a specific data source via the Open Data Base Connection protocol.

The DataSource parameter 502C specifies the ODBC driver name to use. This name is the name that the ODBC driver uses to register itself on a user's system, and is usually a long descriptive name such as "Microsoft SOL Server Databases". Values: text string (name of an installed ODBC driver on the users PC). Example: DataSource=Dbase III.

The User parameter 504C is used to log on to the ODBC source. If no sign-on is required, this parameter may be empty. Values: text string (user name or blank). Example: User=administrator.

The Password parameter 506C supplies the password that goes along with the user name in the User parameter 504C. This value may be empty. Values: text string (password or blank). Example: Password=abc123.

The Query parameter 508C specifies the criteria for data selection from the ODBC data source. In the present embodiment, this query is phrased in Structured Query Language (SQL). Values: text string (SQL statement).
Example: Query=SELECT Name, Phone, Fax FROM Contacts WHERE Type='Friend';.

Referring again to FIG. 3, as we have noted, the modular architecture of the software 114 in machine 102 enhances the flexibility of machine 102. Each module in the model 300 is designed to perform a defined type of task (e.g. data retrieval, format conversion, data filtering, data mapping, data delivery and application interface). This modular design facilitates extension of the machine 102 by faciliting replacement of an entire module, for example, with plug-ins. For example, a data retrieval plug-in could be designed to retrieve the data 120 from a remote site that does not use either FTP, HTTP or ODBC (i.e. a site with which module 306 is not configured to communicate). A format conversion plug-in could be designed, for example, to convert to a text format source data 120 that is not in one of the formats internally supported by the module 308 (e.g. text, record or HTML format). A data filtering plug-in could be designed to provide filtering options not provided by module 310. Plug-ins providing options not provided by modules 314 and 316 could also be designed. Although the present embodiment does not support a data mapping plug-in, in alternate embodiments such a plug-in could be designed to provide mapping options not provided by module 312.

A plug-in is simply a stand-alone program that uses agreed-upon conventions to work cooperatively with Alpha-CONNECT. Plug-ins are .exe files that are placed in the \connect directory. Sample plug-in programs, including source code, are available for download from the Alpha-CONNECT developer page, which is accessible from the main AlphaCONNECT web page: www.alphamicro.com/ac.

In the present embodiment, there may be four kinds of plug-ins AlphaCONNECT can interact with:
    Data acquisition plug-ins
    Format conversion plug-ins
    Data filtering plug-ins
    Data delivery plug-ins In alternate embodiments, data mapping plug-ins might be implemented.

In the present embodiment, plug-ins interact with the software 114 in the following manner. In particular, the software 114 begins execution of a data delivery task. The LC module 304 tells the DR module 306 to acquire the data 120 as specified in the link. If a data acquisition plug-in has been specified in the link definition, the data acquisition plug-in is called. The source data 120 is acquired and placed in the file 120'. The target (application) is then launched. The LC module 304 then tells the FC module 308 to convert the data in the file 120' if appropriate (e.g. textual data where conversion has been specified). If a format conversion plug-in has been specified in the link definition, the format conversion plug-in is called. Format conversion plug-ins are called automatically based on file type. The converted data is saved in the file 120', overwriting the previous file 120'. The logic control module 302 then calls the data filtering module 310 if appropriate (e.g. textual data where filtering has been specified). If a data filtering plug-in is specified in the link definition, the data filtering plug-is called. The filtered data is saved in the file 120', overwriting the previous file 120'. The logic control module 302 then calls the data mapping module 312. The data in the file 120' is then mapped and sent to the data target 106. If specified, the optional save/shut-down of target is accomplished. If specified in the link definition, the logic control module 302 calls the data delivery module 314 to accomplish any specified post-processing. If a data delivery plug-in is specified in the link definition, the data delivery plug-in is called. After this process, link execution has completed.

A data acquisition plug-in is a program that obtains source data 120 from a data source 104 for a link being executed by the machine 102. Instead of the machine 102 accessing an FTP site, web page, or local file for the source data 120, for example, a data acquisition plug-in may access an alternative data source 104 using an alternative method, for example. Such a plug-in should respond to the link parameters related to data acquisition and provide the source data 120 in the file 120' when it is completed. There is no limit to what a plug-in can do to obtain data. For example, a plug-in could interact with the user, form criteria for an SQL engine, query a remote database, and ultimately pass the selected information on to the machine 102. The plug-in could acquire multimedia data. The plug-in could acquire any type of data that can be converted to text.

Data acquisition plug-ins are well suited to: integrating AlphaCONNECT with other applications, coupling Alpha-CONNECT with alternative methods of communication, interacting with users before selecting data, triggering operations on remote computers to generate data.

A data acquisition plug-in is referenced by specifying the prefix plugin://in the HostAddress parameter 512, followed by the program name and any command line arguments to be executed. Example: plugin://get-data.exe. The plug-in is passed a source file and destination file specification on its command line, separated by a space. The source file specification is in the format the plug-in is designed to handle from the Datasource parameter 508. The destination file that the plug-in file will create should be a text file of a form the machine 102 can process or a multimedia file saved as the file 120'. Again, this file 120' is saved using a regulated name of the form linkname.datatype in the \connect\temp directory. The machine 102 will wait for the plug-in to finish executing, and will then open this file 120' as the link continues execution.

A format conversion plug-in is a program that converts a specific file format into a text form that the machine 102 can use. A format conversion plug-in could also convert multimedia data in a desired manner. This plug-in is called by the format conversion module 308 after the data in the file 120' is acquired. Before the plug-in is called, the FC module puts the data from the file 120' in a temporary file. When the plug-in is called, it is passed the name of the temporary file as the source file and the regulated name as the destination file. Thus, the plug-in obtains the data from the file 120' through the temporary file, processes the data and writes the resulting data as the file 120' over the old file 120'.

Whereas other plug-ins are specifically referenced in a link definition in order to be called, data conversion plug-ins can also run automatically whenever the machine 102 obtains a file type to which the plug-in can respond. Unlike most of the plug-ins used with the other modules, format conversion plug-ins can have specific names that identify the data types with which they are intended to be used. When machine 102 obtains a file from a remote computer, the file extension of the source data is inspected. The machine 102 treats the part of the file name following a period in the file name as a file type. For example, the file type of a file named letter.txt is treated as ".txt". If the machine 102 detects a program file named imp-filetype.exe, it assumes it is a format conversion plug-in for the file type specified in the program name after the hyphen and it is called if the retrieved file has a matching file type. For example, if you want to write a plug-in that handles .dif files, you would name it imp-dif.exe. It is also possible to specifically indicate a format conversion plug-in for a link by assigning a name of a plug-in to the FormatConversionPlugin parameter 572.

Format conversion plug-ins allow broadening of the type of data that the machine 102 can accept. Format conversion plug-ins let you handle many types of source data that are already 'text' but are not in a form that the machine 102 can immediately accept without a plug-in. Worksheets, databases, documents, and many other data formats can be adapted as sources for the machine 102 with an appropriate format conversion plug-ins. Often, such programs can be very small Visual Basic programs. Naturally, some formats are more difficult to convert than others.

A data filtering plug-in is a program that selectively copies text from the file 120' and overwrites the file 120' with the selectively copied text. In embodiments of the invention, a data filtering plug-in could also process multimedia data in some manner. Data filtering plug-ins can be used when it is desired to extend the standard filtering options of machine 102. With a data filtering plug-in, you can control precisely which parts of a text data source, for example, will remain in the file 120'. If a data filtering plug-in is specified by the link being executed, the data filter module 310 calls the specified plug-in. The plug-in obtains the data from the file 120', processes according to any filter options specified by the link parameters or implemented in the plug-in and writes the filtered data as the file 120' over the old file 120'.

An example of where a data filtering plug-in might be used is in the case of a stream of data where some of the data does not fit the standard data field mapping. It might be difficult to configure the machine 102 to leave out such data if there is no common pattern that could be specified using the 'Ignore Text' parameter or the RequireText parameter, for example. With a data filtering plug-in, your program can inspect the data from the file 120' and keep only the parts you want according to the capabilities of the plug-in.

A data filtering plug-in is referenced by assigning to the DataFilter parameter 575 a value of plugin://ProgramName. Example: plugin://filter2.exe. The plug-in is passed a source file and a destination file specification on its command line, separated by a space. The source file specification is the name of a temporary file into which the data from the file 120' has been copied, and the destination file is the regulated name of the file 120'. The destination file that the plug-in file will create can be a text file or multimedia file of a form that the machine 102 can map.

A data delivery plug-in is a program that post-processes a data result. Data delivery plug-ins are used to transform the file 110, for example, to another form and/or to deliver the file 110 to a final destination in a manner not supported by the machine 102. In the present embodiment, the data delivery module is called after the target file 110 is created and/or saved and the target application is shut down.

A data delivery plug-in is referenced by assigning to the DeliveryPlugin parameter 574 a value of plugin://ProgramName. Example: plugin://mailit.exe. The plug-in is passed a file specification on its command line indicating the file 110 that the machine 102 created. The delivery plug-in can then transform/process/deliver the file as it sees fit.

Referring again to FIG. 3, the modules of the model 300 are now described. The external interface module 302 provides an interface between an external context 301 and the model 300 of machine 102. The external context 301 might be a human, for example. Alternatively, it might be a program controlling the machine 102. The external interface may vary as the computer system 112 varies and as the operating system run on the computer system 112 varies. The machine 102 does not define the external interface in the context of the operating system platform and user/program interface. The machine 102 may define the internal representation of data delivery information.

FIG. 4 outlines the process 400 accomplished by the external interface module 302 and machine 102. As noted in FIG. 4, the external interface module 302 is implementation specific and depends on the nature of the external context. Thus, when the external context is a human, the external interface module 302 might provide a graphical user interface, for example. When the external context is some kind of program, the external interface module 302 might provide a software interface, such as an OLE interface, that enables the machine 102 and the external program to communicate. An example of a graphical user interface and an OLE interface are described below. Element 402 represents the particular implementation of the external interface.

Element 404 of the process 400 accepts input from the external context. This input provides the values that are assigned to the link notation parameters for a particular data delivery task. Thus, for example, a user may provide input using a graphical user interface to specify a data delivery task. A program may provide input using an OLE interface to specify a data delivery task. Element 406 of the external interface module assigns this input from the interface to the appropriate link notation parameter and saves the assigned parameters as a link, for example. As specified by element 408, the external interface calls the logic control module 304 telling it to execute the data delivery task in a specified link. This call may be in response to input from the external context. Alternately, a link may be scheduled to run at specified times for unattended operation.

In the present embodiment, the external interface module 302 provides features that enable the user to create, edit and delete links, for example. It enables links to be scheduled to run at pre-arranged dates and times. These scheduled runs may or may not be scheduled to repeat at specified intervals. Other embodiments need not provide these features. For example, in other embodiments links might be created by some mechanism that is completely independent of the machine 102. The external interface module 302 may be designed to provide other features or options as desired by an implementer, for example.

The logic control module 304 accepts from the external interface 302 the name of the data delivery task (i.e. link) to be executed. The logic control module 304 executes the data delivery task using the specified link and by calling and controlling the data retrieval module 306, the format conversion module 308, the data filtering module 310, the data mapping module 312, the data delivery module 314 and the application interface module 316. The logic control module 304 sequences the execution of the the modules 306, 308, 310, 312, 314 and 316 and coordinates the communication of information between them using five phases. In particular, the logic control module 304 provides a data acquisition phase, a format conversion phase, a data filtering phase, a data mapping phase and a data delivery phase. Alternate embodiments of the invention need not use all of these modules or have all of these phases. In the present embodiment, text data may pass through some or all of these modules/phases. Multimedia data, on the other hand, may only pass through the data acquisition phase, the mapping phase and the delivery phase. In the present embodiment, the format conversion and data filtering phase focus on textual data. Alternate embodiments or plug-ins to the present embodiment could be designed to format convert and/or filter multimedia data in a desired manner, however.

During the data acquisition phase, the data retrieval (DR) module 306 is called by the logic control module 304. The DR module 306 obtains the source data 120 for the data delivery task from the data 108 on the data source 104. The DR module 306 implements at least one communication method that is supported by the data source 104 to retrieve the data 120 from it. In embodiments of the invention, the DR module 306 may support a varied offering of communication methods. In the present embodiment, the DR module 306 supports FTP data acqustion, HTTP data acquisition and ODBC data acquisition.

The DR module 306 also accommodates data acquisition plug-ins. Such a plug in might be a self-contained program which extends the built-in data acquisition capabilities of the machine 102. As we have noted, when the SourceProtocol parameter 562 has a value of 0, the DR module will retrieve data 120 from the data 108 on the data source 106 using the FTP client. When the SourceProtocol parameter 562 has a value of 1, the DR module will retrieve data 120 from the data 108 on the data source 106 using the HTTP client. When the SourceProtocol parameter 562 has a value of 2, the logic control module 304 will instruct the data retrieval module 306 to use a plug-in name specified by the HostAddress parameter 512. This name is provided by the external context through the external interface.

Regardless of which method of data retrieval is used or whether or not a plug-in is used, the retrieval method in the present embodiment should retrieve the appropriate data 120 from the data source 104 as defined by the relevant link notation parameters. For example, the DR module or a data retrieval plug-in should retrieve data from the file specified by the DataSource parameter 508 from the data source at the location specified by the HostAddress parameter using the path specified by the HostDir parameter 516. When the DR module 306 completes the data retrieval task, the module 306 will have been successful or will have failed in obtaining the requested source data 120. The module 306 informs the logic control module 304 as to whether or not it successfully completed the retrieval. If the retrieval is unsuccessful, the logic control module can respond in an appropriate manner, such as by repeating the data retrieval task or by informing the user of the inability to retrieve the requested data 120. In the present embodiment, if the DR module 306 reports an error to the logic control module 304, the LC module 304 halts execution of the data delivery task. If appropriate, the module 306 logs and/or reports the error and its cause, if known. The LC module 304 can report the error to the external context 301 through the XI module 302, if desired.

If the DR module 306 is successful in retrieving the data 120, it will have saved the data 120 in the file 120'. Thus, file 120' is a local image on computer 112 of the data 120 acquired from the data 108 from the data source 104. Because the data in the file 120' may be manipulated by other modules of the machine 300, the DR module 306 may also save a cached copy of this data in a local cache file. The data in the file 120' and this cache file may be multimedia data (e.g. audio, video, image data) or some form of text based data (e.g. text or HTML). Because the data 108 may not have a name on the data source 104 that is legal for the local computer 112, the DR module 306 gives the file 120' a regulated name. In the present embodiment, the regulated name of the file 120' is the link name, with a data file type (e.g. txt, htm, dat) appended as appropriate to the computer 112. In the present embodiment, the file 120' is placed in a "temp" directory within the root directory in which the software 114 is located. Thus, for example, if the software 114 is located in the directory c:\connect, the DR module 306 would save the file 120' at c:\connect\temp\sample.dat when executing a link named 'sample'. If the DR module 306 signals the LC module 304 that it was successful, the LC module 304 will proceed to the format conversion phase.

In the present embodiment, the data retrieval module 306 uses the following link notation parameters. Module 306 uses the Obtain parameter 552 which specifies whether the DR module 306 will obtain the data from a local file, the cached file or from the network location specified by the DataSource parameter 508, the HostAddress parameter and the HostDir parameter 516. The Xfer parameter 546 specifies the update frequency of the data (always, daily, or once) and determines whether the module 306 will update the data in the file 120' from the network location. The module 306 uses LocalFile parameter 554 which specifies the name of a local file from which the machine 102 will acquire the data 120, the SourceProtocol parameter 562 which specifies which communication protocol (e.g. FTP, HTTP or plug-in) the DR module 306 will use in acquiring data, the HostAddress parameter which specifies the address of the data source (protocol-specific), the UserName parameter 548 which provides the Login user name, if applicable, for connection to data source 106, the Password parameter 550 which provides the login password, if applicable, for connection to the data source 106, the HostDir parameter 516 which specifies the directory, if applicable, on the data source 106 in which the data 108 is located and the DataSource parameter 508 which specifies the file name, if applicable, of the data 108 on the data source 104. If the data being retrieved is from an ODBC server, the DR module 306 will use the parameters 502C, 504C, 506C and 508C in the ODBC link section.

FIGS. 6A and 6B outline the process accomplished by the DR module 306. FIG. 6B is a continuation of the outline of FIG. 6A. As shown, lines 602 test the Obtain parameter 552 to determine if the data 120 is supposed to come from the local file on computer 112 specified by the local file parameter. I.e. it is determining if the data 108 in the data source 104 is in a local file on the computer 112. If so, DR module 306 puts the data 108 from the local file into the regulated name file 120'. If the data 120 is not to come from a local file on computer 112, lines 604 determine whether or not the regulated name file 120' exists and whether or not it is to be deleted as specified by the Xfer parameter 546 or the Obtain parameter 552. This deletion depends on the frequency with which the file 120' is supposed to be updated as specified by the Xfer parameter 546 or the Obtain parameter 552. Lines 606 retrieve data 120 from the data source 104 and put it in the file 120' if the file 120' does not exist. The file 120' will not exist if it was never created or if the lines 604 deleted it because they determined that file 120' was to be updated. Lines 608 determine if a plug-in data retrieval method is to be used by the DR module 306. If the HostAddress parameter specifies the name of a plug-in and if that plug-in exists, the plug-in will be used. Line 614 of the DR process calls the routine AcquireData(Link). This routine is illustrated as lines 616 in FIG. 6B. As illustrated, the AcquireData(Link) routine acquires data using the FTP client (lines 617), the HTTP client (lines 618), a plug-in (lines 619) an extension (lines 621), or the ODBC protocol (lines 623). Lines 620 illustrate the AcquireFTP routine called by lines 616. Lines 622 illustrate the AcquireHTTP routine called by lines 616. Embodiments of the present invention can use conventional FTP clients and HTTP which have been adapted to work with the relevant link notation parameters. Lines 610 and 612 set the success variable to false if the data is not successfully retrieved. The success variable is communicated to the logic control module 304 to inform the module 304 as to whether or not the data has been successfully retrieved. Upon successful completion of the data retrieval phase, the file 120' on computer 112 will contain a copy of the data that the link parameters indicated were to be retrieved from the data 108 of the data source 104.

Thus, the DR module 306 evaluates the data acquisition protocol as self-contained (internal) or plug-in (external). If the data acquisition protocol is external, the DR module 306: deletes the local file named linkname with file type data if present in the temp directory; attempts to launch the plug-in program specified in the link definition, reporting an error to the LC if the program is not found; waits for the plug-in to terminate; and checks for the existence of a file named linkname with the file type data in the temp directory. If the data acquisition protocol is internal, the DR module 306: checks the link definition's caching option and takes the appropriate action as listed below:

Always: delete the file named linkname with the file type data if present in the temp directory.

Daily: delete the file named linkname with file type data if present in the temp directory and contains a creation date of today.

Once: no action

If the file linkname with file type data exists in the temp directory, the DR module 306 then skips all subsequent steps. The DR module accepts or rejects the data acquisition protocol of the link as supported/available or unknown/unavailable; attempts communication with the specified source computer, reporting an error to the LC if unable to establish a connection;

performs any login negotiation with the data source computer that the data acquisition protocol and link definition indicate, reporting an error the LC if unable to negotiate a successful login; performs any directory changing indicated by the link definition (optional), reporting an error to the LC if unable to properly perform such functions; attempts to read the desired file or URL from the source computer, reporting an error to the LC if the data source is unavailable; leaves the obtained data in the temporary account with the link name and a data file type.

After the data retrieval phase, the LC module 304 enters the format conversion phase if the data is text data or if a multimedia format conversion plug-in has been specified. During the format conversion phase, if the data 120 is text data the format conversion module 308 "normalizes" the data 120 that was obtained by the DR module 306 and that was stored in file 120'. That is, the data 120 is transformed into a text representation that the modules 310, 312, 314 and 316 of the machine 300 are prepared to accept. The format conversion module is not internally adapted to convert multimedia data. Accordingly, if a plug-in is not specified, this module will be bypassed by the LC module 304. To normalize the text data, the format conversion module 308 transfers the data from the file 120' into a temporary file, normalizes this data and puts the normalized data back into the file 120', replacing the file 120' that contains the raw source data 120. The normalized text file 120' is an ASCII text file where "non-data" information that had been in the data 120 has been eliminated. Non-data information might include control characters, for example. Thus, the contents of the normalized file 120' are ASCII codes for corresponding text. Each text line (record) is composed of fields. If there are multiple fields per record, the FC module uses delimiting or space padding to a fixed width for proper separation of the data fields.

In the machine 102, the FC module 308 is designed to recognize particular types of "non-data" to be filtered out. The FC module 308 is also adapted to accept format conversion plug-ins to expand the types of source data 120 that can be filtered into a normalized form. Such plug-ins may be self-contained programs designed to convert to a normalized text form the data 120 where the data 120 is in a format not supported by machine 102. If the data 120 is already normalized, the FC module 308 does not need to make any changes to it. Thus, the FC module 308 in the present embodiment supports a 'no conversion' (as-is) mode. In some embodiments, it may be desirable that the module 308 support a varied offering of conversions.

The format conversion module 308 works using the SourceConversion parameter 564 and the FormatConversionPlugin parameter 572 of the link notation. The FC module 308 is designed to expect that the file 120' is saved using the regulated name.

A plug-in is called by the FC module 308 to perform the format conversion when the particular link being executed indicates that the particular plug-in is to be used. Thus, in the present embodiment, such a plug-in could be used to extend the function of the machine 102 to process data 108 having any initial format that can be converted to normalized text form. To be used, a plug-in responds to the SourceConversion parameter 564, has the name specified by FormatConversionPlugin parameter 572 and provides the normalized text output to the file 120'. As we have noted, a plug-in also might be used to convert multimedia data in some manner, such as converting an image file from a GIF format to a JPEG format.

When the FC module 308 completes, it will have been successful or will have failed in converting the obtained source data 120. Module 308 informs the LC module 302 as to whether or not it successfully converted the source data 120. If the FC module 308 reports an error, the LC module 302 halts execution of the data delivery task. If appropriate, the format conversion module 308 logs and/or reports to the logic control module 304 the error and its cause, if known.

The LC module 304 can report errors to the external context through the external interface, if desired.

The format conversion module 308 is able to use three methods to determine if transformation of the source data 120 is necessary. The first method is that the value of the SourceConversion parameter 564 specifies a built-in conversion option. In the present embodiment, the value of this parameter 564 is determined from input from the external context 301. This option is executed whether or not the FormatConversion parameter 572 is assigned a value. If the value of the SourceConversion parameter 564 is 0, no conversion is done and the data 120 is left as is. This option is used when the data 120 is already in a normalized format. If the value of the SourceConversion parameter 564 is 1, the format conversion module 308 converts data 120 in an HTML format to normalized text. If the value of the SourceConversion parameter 564 is 2, the format conversion module 308 again converts the data 120 which is in an HTML format to normalized form. When the SourceConversion parameter 564 is 2, however, the format conversion module 308 discards all of the data 120 except the data between the <BODY> . . . </BODY> codes. Accordingly, a SourceConversion parameter value of 0 does not result in processing; values 1 and 2 cause the data source to be modified. The normalized result is placed in the regulated name file 120'. Whether or not any conversion results from the value of the SourceConversion parameter 564, the format conversion module 308 examines the remaining two conversion methods to determine if further conversion is to be done. One of the remaining two methods may be executed.

The second method used by the format conversion module 308 is invoked if the FormatConversionPlugin parameter 572 is assigned a value. In the present embodiment, the value of the parameter 572 is also provided by the external context 301. The second method is used even if a built-in conversion resulted from the SourceConversion parameter 564. When the FormatConversionPlugin parameter 572 is assigned a value, the format conversion module 308 will run the format conversion plugin named by this parameter value. If the FormatConversionPlugin parameter 572 is assigned a value, the value should contain plugin://ProgramFileSpecification where plugin://ProgramFileSpecification is the name of the plug-in. The FC module 308 will call the plug-in if one is defined and the file specified by the value of the FormatConversionPlugin parameter 572 is found to exist. If a plug-in is defined by the FormatConversionPlugin parameter 572, the automatic plug-in processing (method three), described next, does not occur.

The third method used by the format conversion module 308 to convert the format of data 120 in file 120' is invoked if the name of the file 120' contains exactly one period and if the second method was not invoked. Again, the file 120' has been given the regulated name linkname.filetype. If the file name of file 120' contains exactly one period, the machine 102 treats the file 120' as a data file having a known format. The portion of the file name to the right of the period is treated as the file type which indicates the file format. If the format conversion module 308 also detects a program file named IMP-filetype, module 308 presumes that the program file having this name is a format conversion plug-in for converting the specified filetype into normalized form. If a data file and a plug-in file are present having such names and the method two plug-in has not been invoked, the format conversion module 308 automatically executes the plug-in file and uses it to convert the data in file 120'.

When a format conversion plug-in is to be executed using the second or the third method, the FC module 308 renames the file 120' from the regulated name to a temporary name. The module 308 then passes to the plug-in an input file name, which is the temporary name, and an output file name, which is the regulated file name of the file 120' before it was renamed (e.g. linkname.filetype). The result of the plug-in should be that the converted data (e.g. normalized if dealing with text) replaces the non-converted data 120 in the regulated name file 120'. I.e. the original file 120' is replaced with a file 120' that contains converted data. The temporary file is deleted after the conversion by the LC module 304.

FIG. 7 contains an outline of the process performed by the FC module 308. As shown in lines 702, the FC module 308 checks the value of the SourceConversion parameter 564 and does any conversion specified by the value of this parameter. As shown in lines 704, the FC module 308 then checks to determine if the FormatConversionPlugin parameter 572 has been assigned a value. If so, the FC module 308 determines if an associated plug-in exists. If an associated plug-in exists, the FC module 308 executes the specified format conversion plug-in to process the data 120. As shown by line 706, if a format conversion plug-in is specified, but the specified plug-in does not exist, the FC module 308 will inform the LC module 304 that the format conversion was not successful. The LC module 304 may inform the external context of errors through the XI module 302.

If lines 704 do not execute a plug-in, lines 708 indicate that the FC module 308 checks to determine if the third conversion method should be invoked. If the FC module 308 executed a built-in conversion or a plug-in conversion, the FC module reports to the LC module 302 that the conversion was successful. If the format conversion phase is successful, the LC module 302 proceeds to the Data Filtering phase.

In the present embodiment, the LC module 304 skips the data filtering phase if the data 120 was multimedia data and if a multimedia filtering plug-in has not been specified. During the data filtering phase, the normalized text data in file 120' is filtered. This phase is accomplished by the logic control module 304 calling the data filtering module 310. Filtering removes none, some or all of the records (lines) of the normalized data in file 120' based on specified filtering criteria. The normalized text data in file 120' need not always be filtered. Whether or not the data is filtered will depend on the values of the relevant link parameters. The DF module 310 transfers the normalized text data from the file 120' into a temporary file, filters the data and replaces the non-filtered data in the file 120' with the filtered data. Because the filtering process simply removes data records, the filtered data will still be normalized.

In the present embodiment, the DF module 310 supports all of the filtering options of the described link notation. The DF module 310 accommodates data filtering plug-ins. A DF plug-in may also support these same parameters. DF plug-ins may be self-contained programs which are used by module 310 to add customized filtering. The link parameter DataFilter provides for specifying data filtering plug-ins. In embodiments of the invention, a data filter plug-in could be provided for multimedia data if desired.

The DF module 310 uses two methods to determine if the data in the file 120' is to be filtered. The first method looks at particular link parameters to determine if certain options have been specified. In particular, this method looks at the values of the link parameters IgnoreBlanks 536, IgnoreText 538 and RequireText 563. The DF module 310 performs filtering according to the values specified by these parameters.

The second method performs filtering using a data filter plug-in. If a plug-in is to be used, the DataFilter parameter in the present embodiment should be assigned a value that is the name of the plug-in. If the DataFilter parameter is assigned a value, then the DF module 310 will look for a file having the name specified by the value of the DataFilter parameter. In particular, if the DataFilter parameter= plugin://ProgramFileSpecification, the DF module 310 will look for a program having the name plugin://ProgramFileSpecification. If such a program is found to exist, then the DF module 310 executes the named plug-in to filter the data in the file 120' using the plug-in.

When a data filter plug-in is to be executed, the DF module 310 renames the file 120' from the regulated name to a temporary name. The module 310 then passes to the plug-in an input file name, which is the temporary name, and an output file name, which is the regulated file name of the file 120' before it was renamed (e.g. linkname.filetype). The result of the data filter plug-in should be that the filtered, converted version of the data 120 replaces the converted version of the data 120 in the regulated name file 120'. E.g. the file 120' containing normalized data is replaced with the file 120' that contains filtered and normalized data. The temporary file is deleted after the filtering by the LC module 304.

FIG. 8 illustrates an outline of the process performed by the DF module 310. This module 310 is called by the LC module 304 as specified in line 802. In line 804, the module 310 initializes "success" to keep track of whether or not the filtering was completed successfully. Lines 806 create the temporary file that stores the pre-filtered data from file 120'. Lines 808 execute a filter plug-in if appropriate. Lines 810 filter the data from the file 120' as specified by the IgnoreBlanks parameter 536, the IgnoreText parameter 538 and the RequireText parameter 563. Line 814 abbreviates the RequireText filtering process which is similar to the IgnoreText process. As shown, these lines check one record at a time. If the record being tested is a blank line and the IgnoreBlanks parameter 536 indicates that blank lines are to be filtered, the IgnoreLine variable is set to true. If the record being tested contains the text specified by one of the IgnoreTextn clauses and the IgnoreText parameter 538 specifies that records containing the specified text are to be ignored, the IgnoreLine variable is set to true. If the lines do not contain the text specified by RequireText clauses in line 814, the IgnoreLine variable is set to true. In line 812, the data filter module 310 tests to determine if the IgnoreLine variable has been set to true. If it has not, the line is written to the file 120'. If it has, the record is eliminated. I.e. the data filter 310 will not save to the file 120' the corresponding record. The present embodiment allows fifteen IgnoreText clauses (only eight are shown in FIG. 8) and fifteen RequireText clauses. These values are received from the external interface 302 and are typically provided by the external context 301. Thus, when dealing with text data in this embodiment, the file 120' after filtering is the same as the file 120' before filtering, except records have been filtered out as specified by the IgnoreBlanks parameter 536, the IgnoreText parameter 538 and the RequireText parameter 563 or the data has been filtered as specified by a filter plug-in.

The DF module 310 will successfully filter the data in the file 120' or it will fail to successfully filter this data. The DF module 310 informs the LC module 304 as to whether or not it was successful. If the DF module 310 reports an error, the LC module 304 halts execution of the data delivery task. If appropriate, the DF module logs and/or reports the error and its cause to the LC module, if known. The LC module 304 can report the error to the external context through the XI module 302. If the DF module 310 has successfully completed the filter process, the LC module 304 proceeds to the data mapping phase.

During the Data Mapping phase, if the data is textual the data mapping module 312 maps the filtered, normalized data from the file 120' and delivers the mapped data to the data target 106. The data mapping module can also be used to map multimedia data to a desired location in a data target 106. Again, the data target 106 may be a target application program or a target file, for example. In either case, the mapped data is typically delivered to a target file 110. If the data target 106 is a target application, the target application delivers the data to the file 110. If the data target 106 is the file 110, the DM module delivers the data directly to the file 110. This file 110 may be a preexisting file or may be a new file created to save the data.

The data mapping module 312 parses the filtered, normalized textual data in the file 120' into fields using the page, line, column, width, cell and fieldname field-definition parameters of the Mapping parameter. The data mapping module 312 may also use the alignment and font field-definition parameters to provide formatting information. In particular, the DM module 312 uses the Mapping parameter to assign the field name and number specified by the cell field-definition parameter to the data from the file 120' specified by the page, line, column and width field-definition parameters. The fieldname field-definition parameter is used to associate a data item from an ODBC database with a data mapping field if the data source 104 is an ODBC database.

In the present embodiment, the DM module 312 interacts with the following link notation parameters: the mapping parameter 514 (including the field-definition parameters of the mapping parameter), the Pages parameter 518, the Rows parameter 520, the StartPage parameter 524, the StartRow parameter 528, the StartLine parameter 530 and the LineBatching parameter 544. The DM module 312 uses the file 120' as input. For each record in the file 120', the DM module 312 reads the record, divides the record into data fields based on the link's Mapping parameter values and passes to the data target 106 the record as mapped into data fields.

FIG. 9 illustrates the procedure followed by the DM module 312. As shown at lines 902, the DM module 312 prepares for the transfer, initiallizing page and line pointers. At lines 904, if the data target 106 is an application, the DM module 312 launches the appropriate target application using the AI module 316. For example, if the target application is Excel, the DM launches Excel using the AI module. If the target application is Word, the DM launches Word using the AI module. If unable to launch a target application, the DM module reports an error. If the data target 106 is a file 110, the DM opens the target file 110.

Using textual data as an example, in lines 906, DM module 312 reads data records (lines) one record at a time from the filtered, normalized data in file 120'. The DM module 312 then tests the data that has been read to determine if the end of the data has been encountered. If not, the DM module passes control to the ParseRecord procedure shown in lines 908. In lines 908, the data from the file 120' is fed to the data target using the AI module 316 as specified by the data mapping link parameter and other relevant link parameters. Thus, if space padding has been enabled, the fields are space padded. If the data is multimedia, this process may pass the multimedia data to the data target 106 so that it is stored in a particular place in the target file 110.

While the data mapping module 312 in the machine 102 is not adapted to accept plug-ins that accomplish other types of mapping, alternate embodiments may be designed to do so. In addition, alternate embodiments can acccomplish mapping in other ways.

When the DM module 312 completes this process, it will have successfully mapped data from the file 120' to the data target 106 or it will not have successfully mapped the data. The DM module 312 informs the LC module 304 as to whether or not the mapping was successful. If the DM reports an error, the LC halts execution of the data delivery task. If appropriate, the module 312 logs and/or reports the error and its cause, if known, to the LC module 304. Again, the LC module can report errors to the external context through the M module 302. If the DM module 312 was successful a target file 110 should exist, and the LC module 304 proceeds to the Data Delivery phase if the data in the target file 110 is being passed to a remote data target or some other post processing option has been specified, for example.

The AI module 316 is the bridge between the data mapping module 312 and a data target 106 that is a target application. As we have indicated, the present embodiment is adapted to work with target applications that include Microsoft Word™, Corel WordPerfect™ and Lotus Word Pro™, Microsoft Excel™, Corel Quattro Pro™ and Lotus 1-2-3™, Microsoft Access™, Borland Paradox™ and Lotus Approach™, Wordpad™, Notepad™, Windows Write™, Paintbrush™, Media Player™, Netscape Navigator™, Internet Explorer™ and Mosaic™, for example. In other embodiments, the AI module 316 can be designed to support other data targets. The AI module transmits the mapped data from the data mapping module 312 to a target application using a communication method allowed by the target application, the computer 112 and the operating system of computer 112. The AI module 316 may support plug-ins that enable the AI module 316 to handle other data targets 106.

FIG. 10 outlines the process followed by the AI module 316. As shown, the AI module 316 locates and launches the desired target application.

This function is given the logical name of the application (e.g. Microsoft Word) and a target file (e.g. letter.doc), and returns a successful status if the specified target application and document were loaded and launched. The target application may be chosen by the external context. Which target application is used is stored in the TargetApp parameter 561. The AI module determines which communication method will be used based upon what communication methods are supported by the target application. In embodiments of the invention, if multiple communication methods are supported, the external interface can enable the external context to select the desired communication method to use. The AI module 316 then passes the mapped data fields produced by the data mapping module 312 to the data target 106 according to the specified communication method. This function accepts a data field value (such as "Subtotal" or "15.56") and a field name (such as A1) and passes the data to the current target application. The target application places the mapped data into the specified location in the target file 110. Again, file 110 can be a new or preexisting file. The AI module can then instruct the data target to save the resulting file 110. This function instructs the current target application to save work (e.g. in Word, the save document command is issued). The file 110 may be saved as the file specified by the Document parameter 506 and the DestDir parameter 510, for example. If specified by the SaveExit parameter 592, the AI module 316 also shuts down the data target 106.

The AI module 316 passes the converted, filtered, mapped data to the data target 106 either directly or indirectly, depending on the internals of the data target 106 or the options specified by the link parameters.

Despite AlphaCONNECT's orthogonal architecture, the AI modules for the different target applications intentionally have variances in behavior. There are four reasons for the variances. In particular, each application may use different terminology (worksheets vs. documents, for example), each application may structure data differently (cells vs. merge fields, for example), each application may support a different spectrum of communication methods (e.g. DIF file, DDE or OLE) and each application may have miscellaneous other quirks, bugs or oddities for which the AI module needs to account. The following sections identify specifics characteristics of communication with target applications supported by the present embodiment.

Data target 106 is Microsoft Excel™

The target application Microsoft Excel, for example, uses the term worksheet to mean destination file and row to refer to a record. Cell is used to refer to a field.

In the present embodiment, if the destination worksheet file specified in the link does not exist, one is created by making a copy of the file def ault.xls. Excel is opened as an OLE automation object. OLE stands for Object Linking and Embedding. It is a standard communication protocol that is part of Microsoft Windows. Excel is instructed to open the destination worksheet file. The acquired text, image, audio, or video file is then inserted into Excel. Excel is then closed. Excel imports text and some multimedia objects directly into the worksheet. Unrecognized data types are inserted into the target worksheet as objects with icons. The data types recognized may vary from one user's system to another.

In the alternate embodiments, data can be imported into Excel either directly or indirectly using two alternate import methods: DDE and DIF. In particular, versions of Microsoft Excel™ may provide both a DDE interface and/or a DIF interface. If DDE import has been selected, then AI module 316 passes the mapped data to Excel one record at a time using DDE. If DIF import has been specified, the mapped data is written to a DIF file and the AI module 316 then issues a command to cause Excel™ to import the mapped data from the DIF file. The slower DDE method permits updating of existing worksheets as well as the creation of new ones. The speedier DIF method can only create a new worksheet however. When using the DDE import method, Excel will accept data appreciably faster if its auto calculation feature is turned off. To turn off this feature, go to Tools>Options, Calculation tab, Calculation frame, and click the Manual checkbox. The interaction of machine 102 with Excel can fail if any options are enabled that present initial screens or dialogs. The user should make sure that in Tools>Options, General tab, that Prompt for summary info is not checked.

To import data at a specific place in a worksheet, a layer can be specified by the Sheet parameter 534, for example. The default layer used, if none is specified, is Sheet1. As specified by the ImportMethod parameter 532, data can be imported using field oriented import or record oriented import. Using field oriented import, each data field is imported as a specific cell according to the mapping specified by the Mapping parameter 514. The link's Mapping parameter 514 specifies cell name and numbers (A1, B13, etc.) to which data is to be passed. Using record oriented import, the data is imported a record at a time. In particular, all of the data fields in a record of the data in file 120' are concatenated, and the result is sent to the cell name and number specified by the first cell field-definition associated with that record.

The default directory for worksheets is \connect\excel. The extension given worksheets created using machine 102 is .xls. The template machine 102 uses to create new worksheets is default.xls. This template can be tailored in embodiments of the invention to have the desired default Excel parameters. Links specifying Excel as a target applicaton have an extension of .lk and are stored in the \connect directory. Add-in files for Excel customization have an extensions of .xla.

MDI Windows. AlphaCONNECT machine 102 can do a better job of locating instances of Excel if worksheet windows are maximized within Excel, so that the Excel caption reads "Microsoft Excel—worksheet" rather than just "Microsoft Excel". If the user insists on running with MDI windows not maximized, then the machine 102 can be instructed to Use any instance.

The present embodiment supports Excel 5.0 and 7.0.

Data target 106 is MICROSOFT WORD™.

The term document is used to mean destination file. Line is used to refer to a record. Merge field is used to refer to a field. In the present embodiment, if the destination document file specified in the link does not exist, one is created by making a copy of the file default. doc. Word is opened as an OLE automation object. Word is instructed to open the destination document file. The acquired text, image, audio, or video file is then inserted into Word. Word is then closed. Word imports text and some multimedia objects directly into the document. Unrecognized data types are inserted into the target document as objects with icons. The data types recognized will vary from one user's system to another.

In alternate embodiments, Microsoft Word™ can be passed data using DDE and TXT. In particular, Word can import data using a DDE interface or from a text file. If DDE import has been specified, the mapped data is passed to Word a record at a time using DDE. If TXT import has been specified, the data is written to a TXT file and the AI module would then issue a command to cause Word to import the mapped data from the TXT file. Both the slower DDE method and the faster TXT method permit updating of existing documents as well as the creation of new ones. Interaction with Word can fail if options are enabled that present initial Word screens or dialogs. Word 6.0: Make sure that in Help>Tip of the Day, that Show Tips at Start-up is not checked. References. To import data at a specific location in a document, the user may specify a bookmark. The default bookmark used, if none is specified, is \EndOfDoc.

Field-oriented import. Each data field can be imported as a mail merge record. The link's field definitions specify merge field names (Name, Amount, etc.). Record-oriented import. Each data field from a line of the data source can be concatenated, and the result is passed as a text line to the field specified by the first cell field-definition parameter of that record.

Directory and file information. The default directory for documents is \connect\word. The extension for documents is doc. The template used to create new documents is default-.doc. Links have an extension of .lk and are stored in the \connect directory. Add-in files for Word customization have an extensions of .dot.

MDI Windows. AlphaCONNECT can do a better job of locating instances of Word if document windows are maximized within Word, so that the Word caption reads "Microsoft Word—document" rather than just "Microsoft Word". If the user insists on running with MDI windows not maximized, then the machine 102 can be instructed to Use any instance.

Compatibility. Word 6.0 and 7.0 are supported by the present embodiment.

Data target 106 is MICROSOFT ACCESS.

The term database is used to mean destination file. Record is used to refer to a record. Field is used to refer to a field. In the present embodiment, if the destination database file specified in the link does not exist, one is created by making a copy of the file default.mdb. Access is opened as an OLE automation object. Access is instructed to open the destination database table. The acquired text, image, audio, or video file is then inserted into Access. Access is then closed. Access imports text and some multimedia objects directly into the database. Unrecognized data types are inserted into the target database table as objects with icons. The data types recognized can vary from one user's system to another.

In alternate embodiments, the Access AI module can import data using DLM. If using DLM, data is passed indirectly to Microsoft Access™. The mapped data is written to a delimited text file and the AI module would then issue a command to cause Microsoft Access™ to import the mapped data from the delimited text file. The DLM method permits updating of existing databases as well as the creation of new ones.

References. To import data at a specific table of a database, the user must specify a table name. The default table name used, if none is specified, is Table 1.

Field-oriented import. Each data field is imported as a specific database field.

The link's field definitions specify database field names (Name, Address1, etc.) to pass data to.

Record-oriented import. Each data field from a line of the data source is concatenated, and the result is sent to the database field specified by the first cell field-definition parameter of that record.

Directory and file information. The default directory for databases is \connect\access. The extension for databases is .mdb. The template used to create new databases is default-.mdb. Links have an extension of .lk and are stored in the \connect directory. Add-in files for Access customization have an extensions of .mda.

Options. Interaction with Access will fail if certain options are selected that prevent DDE interaction. Access 2.0: make sure in View>Options, that Ignore DDE requests is set to No (the default setting).

MDI Windows. Access does not set the title bar caption with the same uniformity that Excel and Word do. As a result, AlphaCONNECT assumes any running instance of Access is the correct one. The Use any instance option is always in effect.

Compatibility. Access 2.0 and 7.0 are supported.

Data target 106 is WORDPERFECT™

The term document is used to mean destination file. Line is used to refer to a record. Merge field is used to refer to a field. In the present embodiment, if the destination document file specified in the link does not exist, one is created by making a copy of the file default wpd. WordPerfect is opened as an OLE automation object. WordPerfect is instructed to open the destination document file. The acquired text, image, audio, or video file is then inserted into WordPerfect. WordPerfect is then closed. WordPerfect imports text and some multimedia objects directly into the document. Unrecognized data types are inserted into the target document as objects with icons. The data types recognized may vary from one user's system to another.

In alternate embodiments, the WordPerfect AI module could support a TXT and DDE import methods. A TXT file could be used to pass data indirectly to WordPerfect™. DDE transfers could be used to pass data directly to WordPerfect™. The TXT method permits updating of existing databases as well as the creation of new ones.

References. To import data at a specific location in a document, the user may specify a bookmark. The default bookmark used, if none is specified, is the end of the document.

Field-oriented import. Each data field can be imported as a mail merge record. The link's field definitions specify merge field names (Name, Amount, etc.).

Record-oriented import. Each data field from a line of the data source can be concatenated, and the result passed as a text line to the field specified by the first cell field-definition parameter of that record.

Directory and file information. The default directory for documents is \connect\wp. The extension for documents is .wpd. The template used to create new worksheets is default-.wpd. Links have an extension of .lk and are stored in the \connect directory.

MDI Windows. AlphaCONNECT can do a better job of locating instances of WordPerfect if document windows are maximized within WordPerfect, so that the WordPerfect caption reads "WordPerfect—document" rather than just "WordPerfect". If the user insists on running with MDI windows not maximized, then the machine 102 can be instructed to Use any instance.

Compatibility. WordPerfect 6.0 and 6.1 are supported. When version 7.0 is released, it will be supported as well.

Data target 106 is QUATTRO PRO™

The term notebook is used to mean destination file. Row is used to refer to a record. Cell is used to refer to a field. In the present embodiment, if the destination worksheet file specified in the link does not exist, one is created by making a copy of the file default.wb2. Quattro Pro is opened as an OLE automation object. Quattro Pro is instructed to open the destination worksheet file. The acquired text, image, audio, or video file is then inserted into Quattro Pro. Quattro Pro is then closed. Quattro Pro imports text and some multimedia objects directly into the worksheet. Unrecognized data types are inserted into the target worksheet as objects with icons. The data types recognized may vary from one user's system to another.

In alternate embodiments, the Quattro Pro AI module could support DDE and DIF import methods. DDE could be used to pass data directly Quattro Pro. The data could be passed a record at a time using DDE. The DDE method permits updating of existing notebooks as well as the creation of new ones.

References. To import data at a specific location in a notebook, the user may specify a tab. The default tab used, if none is specified, is A.

Field-oriented import. Each data field can be imported as a specific cell. The link's field definitions specify cell IDs (A1, B13, etc.) to pass data to.

Record-oriented import. Each data field from a line of the data source can be concatenated, and the result is sent to the cell ID specified by the first cell field-definition parameter of that record.

Directory and file information. The default directory for notebooks is \connect\qp. The extension for notebooks is .wb2. The template used to create new notebooks is default.wb2. Links have an extension of .lk and are stored in the \connect directory.

MDI Windows. AlphaCONNECT can do a better job of locating instances of Quattro Pro if notebook windows are maximized within Quattro Pro, so that the Quattro Pro caption reads "Quattro Pro—document"rather than just "Quattro Pro". If the user insists on running with MDI windows not maximized, then the machine 102 can be instructed to Use any instance.

Compatibility. Quattro Pro 6.0 is supported.

Data target 106 is BORLAND PARADOX

The term database is used to mean destination file. Record is used to refer to a record. Field is used to refer to a field. In the present embodiment, importing to Paradox always creates a new database (.db) file. Paradox is opened as an OLE automation object. Paradox is instructed to open the destination database table. The acquired text, image, audio, or video file is then inserted into Paradox. Paradox is then closed. Paradox imports text and some multimedia objects directly into the database. Unrecognized data types are inserted into the target database table as objects with icons. The data types recognized will vary from one user's system to another.

In alternate embodiments, the Paradox AI module could support a DLM import method. DLM could be used to pass data indirectly to Borland Paradox™. The data could be written to a delimited text file and then imported. The DLM method permits updating of existing databases as well as the creation of new ones.

References. There is no table specification in the Paradox component, because every table is a separate database file. The sheet/bookmark/table field is suppressed from display in the Link Editor.

Field-oriented import. Each data field can be imported as a specific database field. The link's field definitions specify database field names (Name, Address1, etc.) to pass data to.

Record-oriented import. Each data field from a line of the data source can be concatenated, and the result is sent to the database field specified by the first cell field-definition of that record.

Directory and file information. The default directory for databases is \connect\paradox. The extension for databases is .db. The template used to create new databases is default.db. Links have an extension of .lk and are stored in the \connect directory.

MDI Windows. Paradox does not set the title bar caption with the same uniformity that Excel and Word do. As a result, AlphaCONNECT assumes any running instance of Paradox is the correct one. The Use any instance option is always in effect.

Compatibility. Paradox 4.5 and 5.0 are supported.

Data target 106 is an HTML file (Netscape Navigator or Internet Explorer)

The term web page or HTML document is used to mean destination file. Line is used to refer to a record. Field is used to refer to a field.

Import methods. The web component uses one of three methods to generate a web page, governed by choices made in the HTML Design screen. The Simple method generates a simple, automatic web page. The Wizard method generates a web page based on creative design specified with a wizard. The Template method copies an HTML template, replacing AlphaCONNECT HTML extensions with runtime data. If the link being executed is set up to generate an HTML document, the AI 316 does not interact with the target Windows application. Instead, it creates a linkname.htm file in the /connect directory, and the user's Internet browser is invoked at the end of the link run to view the results graphically. The user's internet browser might be invoked by issuing to the operating system an command that executes the browser and opens the file linkname.htm, for example.

References. Specific control over where the data appears is only available to users when the Template method is in use. The user places a data insertion directive at the desired location in the template file.

Field-oriented import. Each data field can be imported as a specific field. The link's HTML design parameters determine how the data is formatted.

Record-oriented import. Each data field from a line of the data source can be concatenated, and the result treated as a single field. The link's HTML design parameters determine how the data is formatted.

Directory and file information. The default directory for worksheets is \connect\web. The extension for web pages is .htm. Links have an extension of .lk and are stored in the \connect directory.

Interference. If using Netscape or the Microsoft Internet Explorer, the Web Browser type must be set to match by the external interface. These products have specific quirks of behavior that AlphaCONNECT needs to know about in order to interact with them properly.

MDI Windows. Some versions of Netscape cause errors if running in multiple instances. AlphaCONNECT attempts to shut down prior instances of Netscape before invoking a fresh instance for this reason.

Compatibility. The Windows 95 Internet Explorer, Netscape 1.x, and Netscape 2.0 are supported.

Data Target is Lotus Word Pro

If the destination document file specified in the link does not exist, one is created by making a copy of the file default.LWP. Word Pro is opened as an OLE automation object. Word Pro is instructed to open the destination document file. The acquired text, image, audio, or video file is then inserted into Word Pro. Word Pro is then closed. Word Pro imports text and some multimedia objects directly into the document. Unrecognized data types are inserted into the target document as objects with icons. The data types recognized may vary from one uses system to another.

Data Target is Lotus 1-2-3

If the destination worksheet file specified in the link does not exist, one is created by making a copy of the file default .wk4. 1-2-3 is opened as an OLE automation object. 1-2-3 is instructed to open the destination worksheet file. The acquired text, image, audio, or video file is then inserted into 1-2-3. 1-2-3 is then closed. 1-2-3 imports text and some multimedia objects directly into the worksheet. Unrecognized data types are inserted into the target worksheet as objects with icons. The data types recognized may vary from one user's system to another.

Data Target is Notepad/Wordpad

The acquired text data is copied to the destination file name specified in the link. Windows Notepad, Wordpad, or the user's default editor is invoked to open the text file. The machine 102 does not send multimedia data (images, audio, video) to text editors.

Data Target is Windows Write

The acquired text data is copied to the destination file name specified in the link. Windows Write is invoked to open the text file. Machine 102 does not send multimedia data (images, audio, video) to Write.

Data Target is Windows Paintbrush

The acquired BMP image data is copied to the destination file name specified in the link. Paintbrush is invoked to open the text file. Other data types (text, html, audio, video, other types of images) are not sent by machine 102 to Paintbrush.

Depending on how the data is passed, the user may or may not be able to see the data appear in the data target as the link is running. For example, if DDE is used, a user can see the data appear in the data target as the link is running. If data is passed indirectly, on the other hand, data may not appear until the very end of the link's run, when the application is instructed to import the data. In either case, the AlphaCONNECT machine 102 updates the display to inform the user that something is happening.

In the present embodiment, the logic control module 304 enters the data delivery phase when the link being executed has specified that the mapped data is to be delivered to a remote data target 106. The DD module 314 is used in the data delivery phase. Although this module is called the data delivery module, it encompasses any type of desired post-processing (after the data has been imported into the target file 110).

The link parameters relevant to the DD module 314 include SaveExit 592, DeliverFTP, DeliverFTPsystem, DeliverFTPdir, DeliverFTPfile, DeliverFTPpassword, DeliverFTPuser, GatewayDelivery, DeliverEmail, DeliverEmailRecipient and DeliveryPlugin.

During the Data Delivery phase, the mapped data in the file 110 can be delivered to a remote data target, for example. Post processing may transform the final result of the data delivery process and/or may transmit the result to another computer. Data delivery is optional, and the LC module 304 will bypass this phase if no data delivery is indicated by the relevant link parameters.

The DD module 314 supports a 'post to remote computer' option. Embodiments of the invention can support varied offerings of post-processing options. Post-processing of an HTML document, for example, might include FTP transfer to a gateway computer to make the results public on the Internet. The DD module 314 also accommodates data delivery plug-ins. Each plug-in may be a self-contained programs that can be used by the DD module 314 to extend the post-processing capabilities. Link Notation provides for the use of data delivery plug-ins.

FIG. 11 outlines the process performed by the DD module 314. FTP delivery shown. in lines 1106 transmits the resulting file to another computer using the ftp protocol. The link definition indicates the system name, user id, password, directory, and file name to use when accessing the recipient computer. The methods, options, and rules for FTP delivery are the same as used for FTP acquisition of data (described earlier in this chapter under Data Acquisition).

The Post On Gateway delivery option specified in lines 1104 is intended to put html and other types of data on a private web server. This is a specialized form of the FTP delivery (see prior item) and is a convenience when the destination computer is your organization's web server.

The e-mail delivery specified in lines 1102 creates a mail message, attaches the data acquisition results as an attachment, and mails the message to all of the recipient(s) specified in the link definition. E-mail delivery is accomplished by using MAPI. MAPI stands for Messaging Application Programming Interface. It is a communications protocol that is part of Microsoft Windows.

Fax delivery specified (not shown) creates a mail message, loads it with text data obtained from the link, and mails the message as FAX:number where number is specified in the link definition. Fax delivery is accomplished by using MAPI. Microsoft Exchange is required for fax delivery.

Thus, the DD module 314 can post the target file 110 to a network's gateway computer, if gateway delivery is enabled. It can send the file 110 to another computer via FTP, if FTP delivery is enabled. It can send the file 110 to one or more e-mail recipients, if e-mail delivery is enabled. It can call a data delivery plug-in if one is specified.

When the DD module 314 completes, it will have been successful or will have failed in its post-processing work. The DD module 314 conveys its completion status to the LC module 304. If the DD module 314 reports an error, the LC module 304 halts execution of the data delivery task. If appropriate, the module 314 logs and/or reports the error and its cause, if known, to the LC module 204 which may report it to the external context 301. Embodiments of the present invention are platform-independent with regard to the delivery of data to a remote computer during its data delivery phase. The machine 102 may transmit the file 110 to any destination platform, provided the implementation platform and the destination platform share a common method of communication.

The following desribes examples of external interfaces that might be used by embodiments of the present invention and additional operational aspects of the machine 102 that are conveniently described with reference to an external interface. A graphical user interface is described first, followed by an OLE interface.

Figure 12:
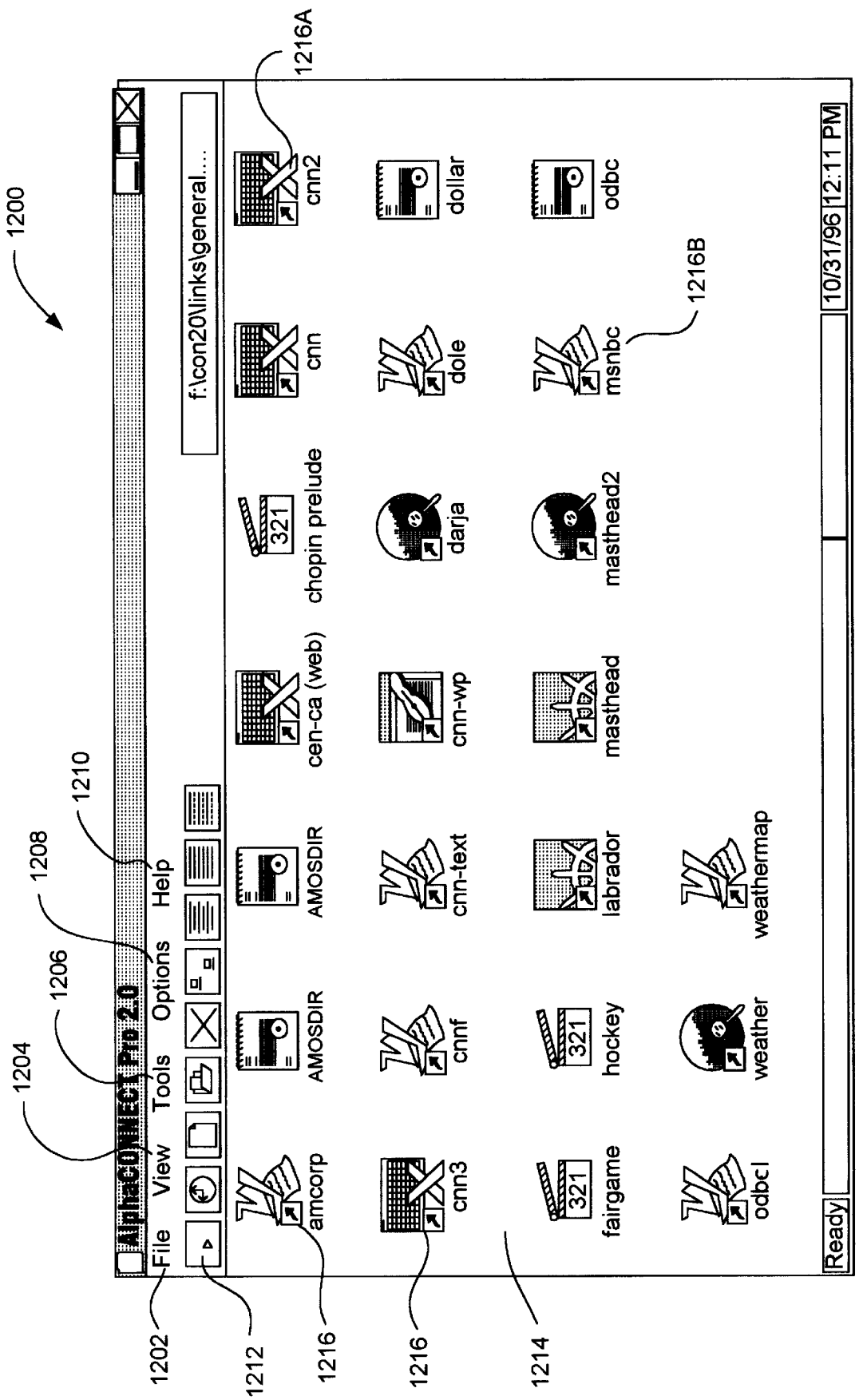
FIG. 12 illustrates the main screen of a graphical user interface used by the machine 102.

If the AlphaCONNECT machine 102 is not already running on the computer 112, machine 102 can be invoked by selecting the AlphaCONNECT Pro 2.0 option from the Start menu. Upon invoking the machine 102, the main screen 1200 shown in FIG. 12 will be displayed. When machine 102 is launced, links are displayed on the screen as icons or a listing. You can double click on a link to start it running. You can right click, use the menu, or use the toolbar to create, edit or delete links. Links are stored in the \Links subdirectory. Link files have a file type .lk. You can organize links under different folder names subordinate to the \Links subdirectory. When you install the machine 102, it creates two folder names for you to start with: general and samples.

As shown, this screen includes File menu 1202, View menu 1204, Tools menu 1206, Options menu 1208 and Help menu 1210. This screen can be used to create new links or to edit existing links. The icons 1216 on the desktop 1214 are examples of existing links. Icon 1216A, for example, is a link for Microsoft Excel. The icon 1216B is a link for Microsoft Word.

To create a new link, perform any one of the following:

Select File>New from the menu

Click the New toolbar button

Enter the keyboard shortcut Ctrl+N

Right-click anywhere and choose New from the pop-up menu that appears

Figure 13:
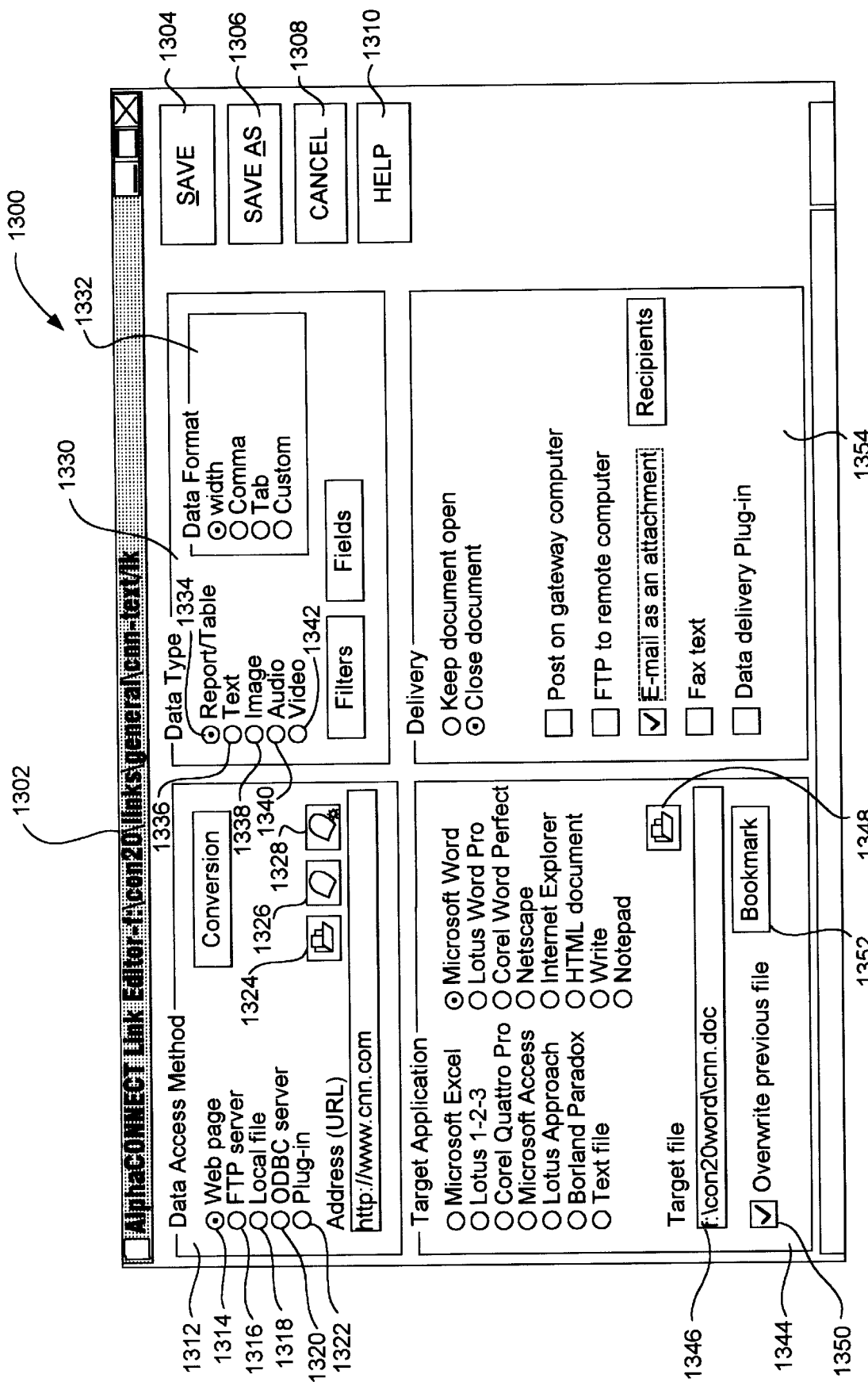
FIG. 13 illustrates a link editor screen of a graphical user interface used by the machine 102.

These actions will cause the link editor screen 1300 shown in FIG. 13 to be displayed. The link editor screen is described below.

To edit an existing link, first select it by single-clicking it. Then, perform any one of the following:

Select File>Edit from the menu

Click the Edit toolbar button

Enter the keyboard shortcut Ctrl+E

Right-click on the link's icon and select Edit from the pop-up menu that appears.

These actions will cause the link editor to open where the link can be viewed or modified.

To delete a link, first select it by single-clicking it. Then, perform any one of the following:

Select File>Delete from the menu

Click the Delete toolbar button

Enter the keyboard shortcut Ctrl+D

Right-click on the link's icon and select Delete from the pop-up menu that appears.

These actions cause a confirmation to be displayed asking if you are sure you really want to delete the link in question. A response of Yes proceeds to erase the link, deleting the associated .lk file from the disk. A response of No cancels the operation.

To start a link running, first select it by single-clicking it. Then, perform any one of the following:

Select File>Run from the menu

Click the Run toolbar button

Enter the keyboard shortcut Ctrl+R

Right-click on the link's icon and select Run from the pop-up menu that appears.

These actions will cause the link to execute. Link execution is described below.

For a quick glimpse at a link's file specification, data source, destination file, and target application, first select it by single-clicking on it. Then, perform one of the following:

Select File>Properties from the menu

Right-click on the link's icon and select Properties from the pop-up menu that appears.

These actions cause a message box to appear displaying the following information:

The full file specification of the link file

The address of the link's data source

The name of the destination file 110 that will be created or updated on the computer system 112

The target application that will receive the data on the computer system 112

You can check the history of a link, i.e. the results of how it fared the last time it was executed. To view the history of a link, first select it by single-clicking on it. Then, perform one of the following:

Select View>History from the menu

Enter the keyboard shortcut Ctrl+H

Right-click on the link's icon and select History from the pop-up menu that appears.

Figures 20, 21A:
Figures 21D, 22:
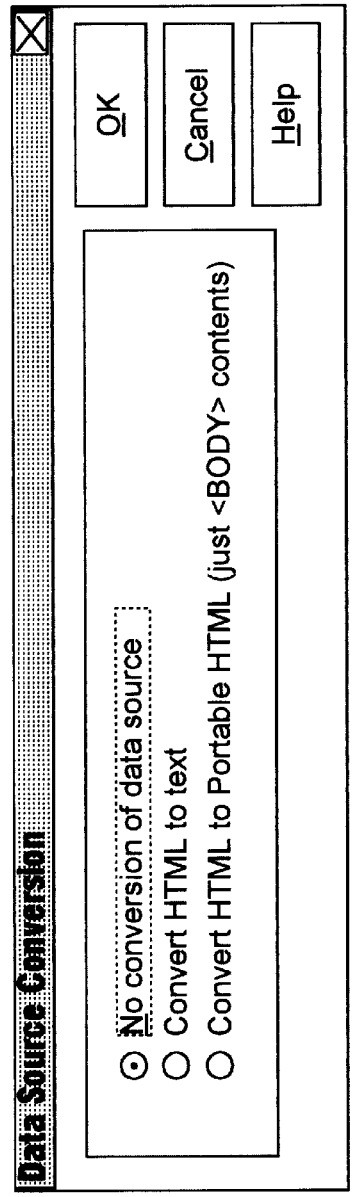

These actions will cause the history of the link to be displayed to the user. FIG. 20 is an example of a link history screen.

If the selected link has been run in the past, a copy of its source data 120 may still be in the data cache file of the machine 102. You can view textual source data 120 using the View>Data Source menu option (or the keyboard shortcut Ctrl+V). Upon completing these actions, Notepad or your default text editor is launched with the source data 120 open. This shows the original form of the data after it was acquired (i.e. before it was processed by the format conversion and data filter modules, for example. FIGS. 21A–D provide an example of what this source data 120 might look like.

To import a link from a different directory, or to import an AlphaCONNECT 1.1 link, use the File Import menu option (or the keyboard shortcut Ctrl+I). A standard Windows open dialog permits you to select an AlphaCONNECT 2.0 link (.lk) file, or an AlphaCONNECT 1.1 link (.acc, .wrd, .exc, .pdx, .wpf, .qpf, web) file. The file you select is updated to version 2.0 form and is stored in the current working directory.

The software 114 includes a Link Editor that is a stand-alone program, acedit.exe, that is called as needed by a main program (ac.exe) of the machine 102. FIG. 13 shows a Link Editor screen 1300 that is used by the machine 102. Choosing New or Edit from AlphaCONNECT's main program launches the Link Editor.

The user defines the common parts of the link definition on the link editor screen 1300. The caption 1302 of the screen shows the name of the link, or [untitled] is a new link being created.

Most of the Link Editor screen 1300 consists of frames (rectangular areas of controls) for the selection of data source, destination, filtering, conversion, and delivery options. Controls on this screen appear or vanish depending on which options are being used by the user. This feature prevents the large number of features and options from overwhelming the user—only what is relevant is visible.

At the upper right of the Link Editor screen are buttons labeled Save, Save As, Cancel, and Help.

> The Save As button 1306 allows the user to save the link as a new link file under a new name. The Link Editor exits.
>
> The Save button 1304 saves the current link under its existing name. If a new link is being created, there is no link name as of yet and clicking Save is same as clicking Save As. The Link Editor exits.
>
> The Cancel button 1308 abandons any changes. The Link Editor exits.
>
> The Help button 1310 displays on-line help.

In frame 1312 of the link editor screen 1300 are controls that are used to indicate the type of data access that will be used by the link. Option buttons offer these choices:

> Web page—button 1314 (HTTP)
>
> FTP server—button 1316
>
> Local file of computer 112—button 1318
>
> ODBC server—button 1320
>
> Plug-in—button 1322

The frame 1312's appearance changes based on the data access method option button currently selected:

> When the Web page button 1314 is selected, a button marked Conversion is visible and a text box named Address
>
> When the FTP server button 1316 is selected, buttons marked Conversion and FTP are visible and a text box named Address
>
> When the Local file button 1318 is selected, a button marked Conversion is visible and a text box named File specification
>
> When the ODBC server button 1320 is selected, buttons marked Conversion and ODBC are visible
>
> When the Plug-in button 1322 is selected, a button marked Conversion is visible and a text box named Plug-in command line.

The conversion button, if visible, can be clicked to obtain a dialog for specifying conversion options. These options will provide the values of relevant format conversion link parameters used by the format conversion module 308. In particular, a screen such as that shown in FIG. 22 may be displayed. This screen could be modified to enable the user to specify the file specification of a format conversion plug-in.

The FTP button, if visible, can be clicked to obtain a dialog for specifying FTP parameters. This screen may be similar to the screen shown in FIG. 23, enabling the user to provide the computer name, user name, password and startup directory on the host computer. This screen could be modified to enable the user to indicate whether the internal or external FTP client is to be used, the time out period for logon and whether or not the machine 102 will trace FTP when links are running, for example.

Figure 23:
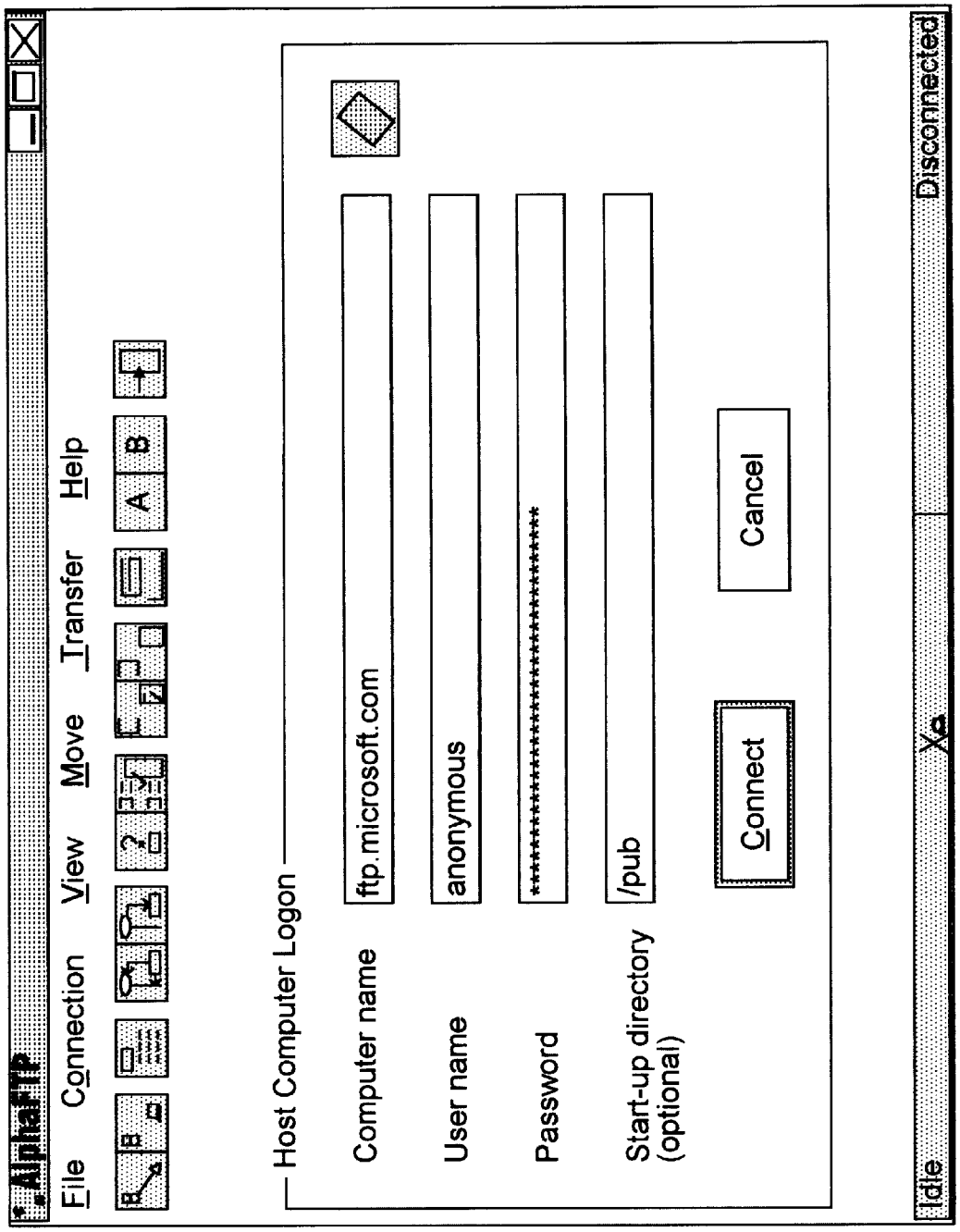
FIG. 23 illustrates an example of a screen that might be used to specify and display FTP parameters.

The following provide descriptions of FIG. 23:

Computer name (text box)

> This text box contains the host computer Internet name (ftp.alphamicro.com) or Internet address (example: 192.245.218.126) that identifies the remote host computer.

Address Book (picture button)

> This button summons the Address Book. If an entry is selected from the Address Book screen, the Computer Name, User Name, and Password fields are updated to reflect the entry.

User Name (text box)

> This text box contains the user name for FTP sign-on to the host computer.

Password (text box)

> This text box contains the password to be submitted along with the User Name when signing on to the host computer. A blank password is permitted.

Status Bar

> The status bar strip at the bottom of the screen contains a left panel (detailed current state or action), a right panel (overall state or action), and a number of icons that appear to indicate status. In the logon screen, the only icon visible is the 'disconnected' icon.

Connect (picture button), Connect (button), Connection>Connect (menu item)

> This button signs-on to the host computer name or address specified in the Computer Name text box, and attempts to log on the computer using the User Name and Password information specified.

Exit (picture button), Cancel (button)—shortcut key: ESCAPE

> This button exits the FTP screen. If FTP was called from within machine 102, control returns to the form from which FTP was summoned.

Help (menu item)—shortcut key: F1

> This menu item provides information in three forms: Help>Contents, Help>Search, and Help>About. The help file invoked is alphaftp.hlp from the \connect root directory.

The ODBC button, if visible, can be clicked to obtain a dialog that provides inputs the will prompt the user to specify ODBC link parameters.

The Address text box, if visible, is where the name of the data source 104 (e.g. web page or ftp system name) is specified.

The File specification text box, if visible, is where the local file specification which is to be used as a data source 104 is entered.

The Plug-in command line text box, if visible, is where the command line for a data acquisition plug-in is specified.

Figure 24:
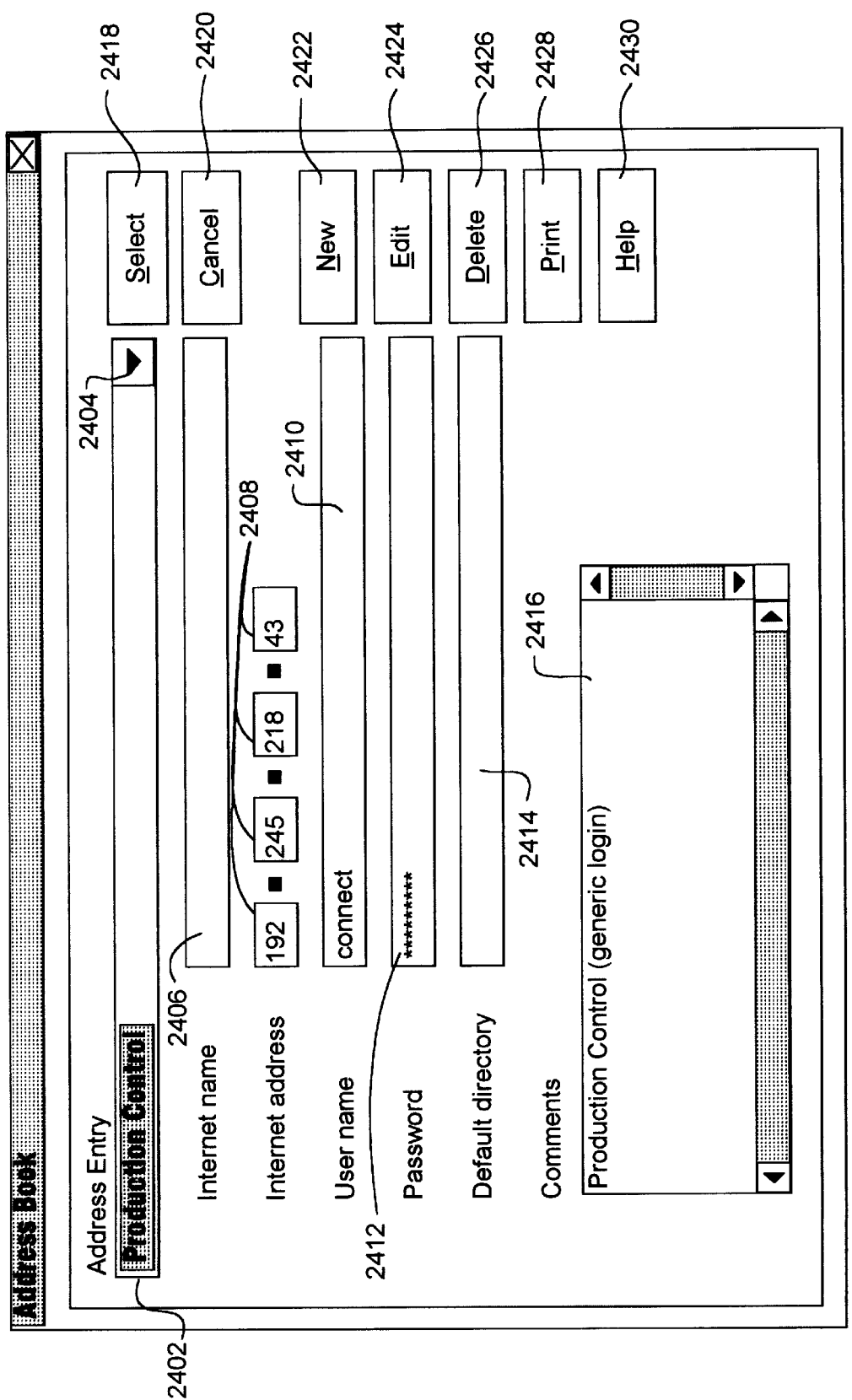
FIG. 24 illustrates an example of an address book screen.

A Browse button 1324, an Address Book button 1326, and an Add to Address Book button 1328 are available for aiding the entry of the information required when one of the buttons 1314, 1316, 1318, 1320 and 1322 are selected. For example, the address book might be used to specify the name of an FTP site. FIG. 24 is an example of an address book screen.

The Address Book is a tool that may be available from many different places in AlphaCONNECT interface. The purpose of the Address Book is to be a central repository of information about host computers. This is an important convenience aid for those who want to define multiple links for the same computer.

Address Entry combo box 2402

> In the initial state of the Address Book, the user may scroll through the list of existing address entries using the arrow keys or mouse and the arrow 2404. Letter keys cue the combo box to the next matching entry with the same first letter. HOME and END move to the start of end of the list. When creating or editing an entry, the user may type in this combo box the name to assign to the entry.

Internet name text box 2406

> This text box 2406 contains the Internet name of the computer the entry is for. This information is optional—an Internet Name or an Internet Address are required to identify a computer, but not both. Enter the registered DNS (Internet domain naming service) name (for example, ftp.microsoft.com) here. This text box is display-only except when creating or editing an entry. The Address Book permits blank Internet Name entries.

Internet address text boxes 2408

These text boxes contain the Internet address of the computer the entry is for. Internet addresses are four numbers, each in the range 0–255 (example: 192.245218.138). This information is optional—an Internet Name or an Internet Address are required to identify a computer, but not both. These text boxes are display-only except when a link is being created or edited. The Address Book permits blank Internet Address entries.

User name text box 2410

This text box 2410 contains the user name to sign-on to the host computer with. The host computer maintains a series of user name-password accounts for FTP access, and may also permit the login 'anonymous' with a user's e-mail address as a password. This text box is display-only except when a link is being created or edited. The address book permits blank user name entries. The Address Book permits blank User Name entries.

Password text box 2412

This text box 2412 contains the password to sign-on to the host computer with. The host computer maintains a series of user name-password accounts for FTP access. This text box is display-only except when a link is being created or edited. The Address Book permits blank Password entries.

Default directory text box 2414

This text box 2414 contains the default (start-up) directory to sign-on to the host computer with. The user name-password assignment on the host computer may already position the connection at the desired directory, so it is sometimes appropriate that this field be empty. This text box is display-only except when a link is being created or edited. The Address Book permits blank Default Directory entries.

Comments text box 2416

This multi-line text box 2416 is for comments about the host computer. This text box is display-only except when a link is being created or edited. The Address Book permits blank Comments entries.

Select button 2418

This button 2418 may pass the currently displayed entry information to the screen from which the Address Book was summoned.

Cancel button 2420-shortcut key: ESCAPE

This button unloads the Address Book screen. Control is returned to the screen from which Address Book was summoned.

New button 2422

This button 2422 starts a new Address Book entry. The text box fields clear and become editable. The previously displayed buttons at the top right of the screen are disabled, and new Save and Cancel buttons appear at the lower right. The user may proceed to enter information and click Save, or abort the entry creation by clicking Cancel.

Edit button 2424

This button edits the currently displayed Address Book entry. The text box fields become editable. The previously displayed buttons at the top right of the screen are disabled, and new Save and Cancel buttons appear at the lower right. The user may proceed to amend information and click Save, or abort the entry edit by clicking Cancel.

Delete button 2426

This button is used to delete the currently displayed Address Book entry. The user is asked to confirm the deletion, and if a positive response is entered the entry is removed from the Address Book.

Print button 2428

This button prints out the currently displayed Address Book entry on the default system printer. All information is output except for the password, which echoes as asterisks.

Help button 2430—shortcut key: F1

This button invokes AlphaCONNECT's on-line help for the Address Book.

The data type frame 1330 at the upper right of the main screen provides controls that are used to indicate the data type of the information to be acquired. Option buttons offer these choices:

Report/Table—button 1334

Text—button 1336

Image—button 1338

Audio—button 1340

Video—button 1342

These option buttons 1334, 1336, 1338, 1340 and 1342 provide the value of the data type link parameter. Again, the appearance of frame 1330 changes based on the data type option button currently selected:

When the Report/table button 1334 is selected, buttons marked Filters and Fields and a data format group 1332 of option buttons are visible.

When the Text button 1336 is selected, a button marked Filters is visible.

When the Image button 1338 is selected, a button marked Filters and an image format group of option buttons is visible.

When the Audio button 1340 is selected, buttons marked Filters and an audio format group of option buttons are visible.

When the Video button 1342 is selected, a button marked Filters and a video format group of option buttons are visible.

The Filters button, if visible, can be clicked to obtain a dialog for specifying text data filtering options. This button might provide a screen such as the one shown in FIG. 25. This screen can be modified to show the RequireText options and allow entry of the require text clauses. In addition, the number of IgnoreText and/or RequireText clauses can be increased or decreased. The options of ignoring blank lines and ignoring blank fields can be selected.

Figure 26:
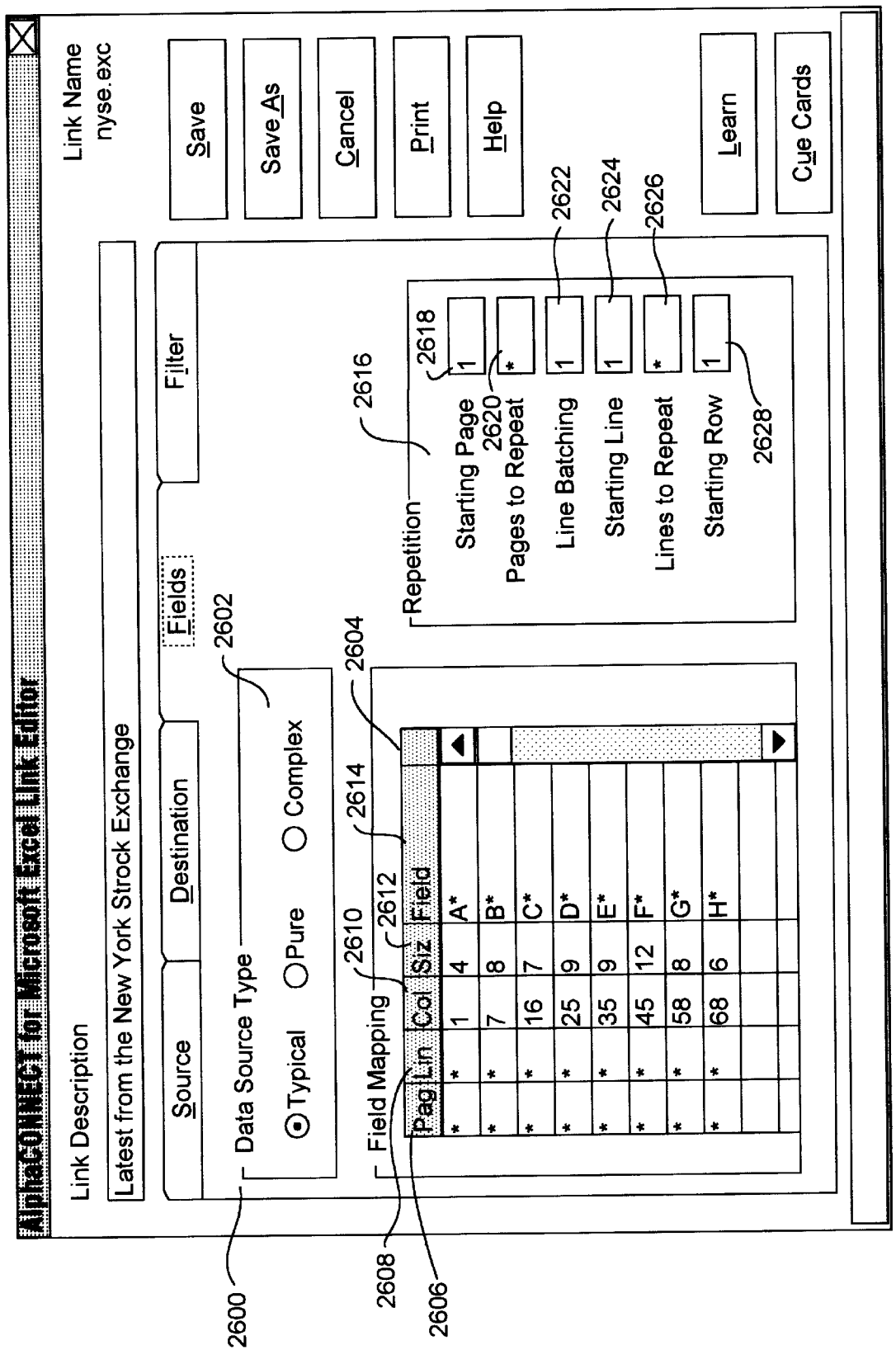
FIG. 26 is an example of a screen that might be used to specify and display mapping settings.

The Fields button, if visible, can be clicked to specify field oriented mapping of the data. This invokes the AlphaCONNECT Report Learner. A screen such as the screen 2600 shown in FIG. 26 may be displayed.

The following describes the functions provided by the screen 2600:

Data Source Type option group 2602

The option selected indicates the type of data source: Typical (repeating data on multiple lines/pages), Pure (text), or Complex (discrete non-repeating data fields).

Field Mapping grid 2604

1–35 fields may be specified in this grid. This information can be generated automatically through use of the Learn function (described below), which facilitates graphical selection of fields.

The grid is not visible if the Data Source Type is set to Pure.

Pag field 2606

Contains a page number (in the range 1 through 9999), or * for processing repeating pages.

Lin field 2608

Contains a line number (in the range 1 through 1,000,000) or * for processing repeating lines.

Col field 2610

Contains a column number (in the range 1 through 2048) that the field begins at in a line.

Siz field 2612

Contains a width in characters (in the range 1 through 2048) of the field in the line.

Field field 2614

Specifies the cell/merge field/database field of the target worksheet/document/database (corresponds to the cell field-definition parameter). Must always be of the form {fieldname}{number} or {fieldname}* (for repeating fields).

Repetition frame 2616

These fields indicate repeated lines and/or pages. This frame is not visible if the Data Source type is set to Pure or Complex.

Starting Page text box 2618

The number in this text box (in the range 1 to 9,999) determines the starting page of the data source that is to be processed.

Pages to Repeat text box 2620

The number in this text box (in the range 1 to 9,999) determines the number of pages to process. * may be entered to process all pages in the file (up to 9,999).

Line Batching text box 2622

The number in this text box, if greater than 1, causes AlphaCONNECT to group the number of lines specified into a single concatenated line for processing.

Starting Line text box 2624

The number in this text box (in the range 1 to 1,000,000) determines the starting line of the page(s) to be processed.

Lines to Repeat text box 2626

The number in this text box (in the range 1 to 9,999) determines the number of lines to process on each page. * may be entered to process all lines on the page.

Starting Row text box 2628

For links with repeating lines/pages, indicates the starting row of cells. Usual value is 1.

Figure 27:
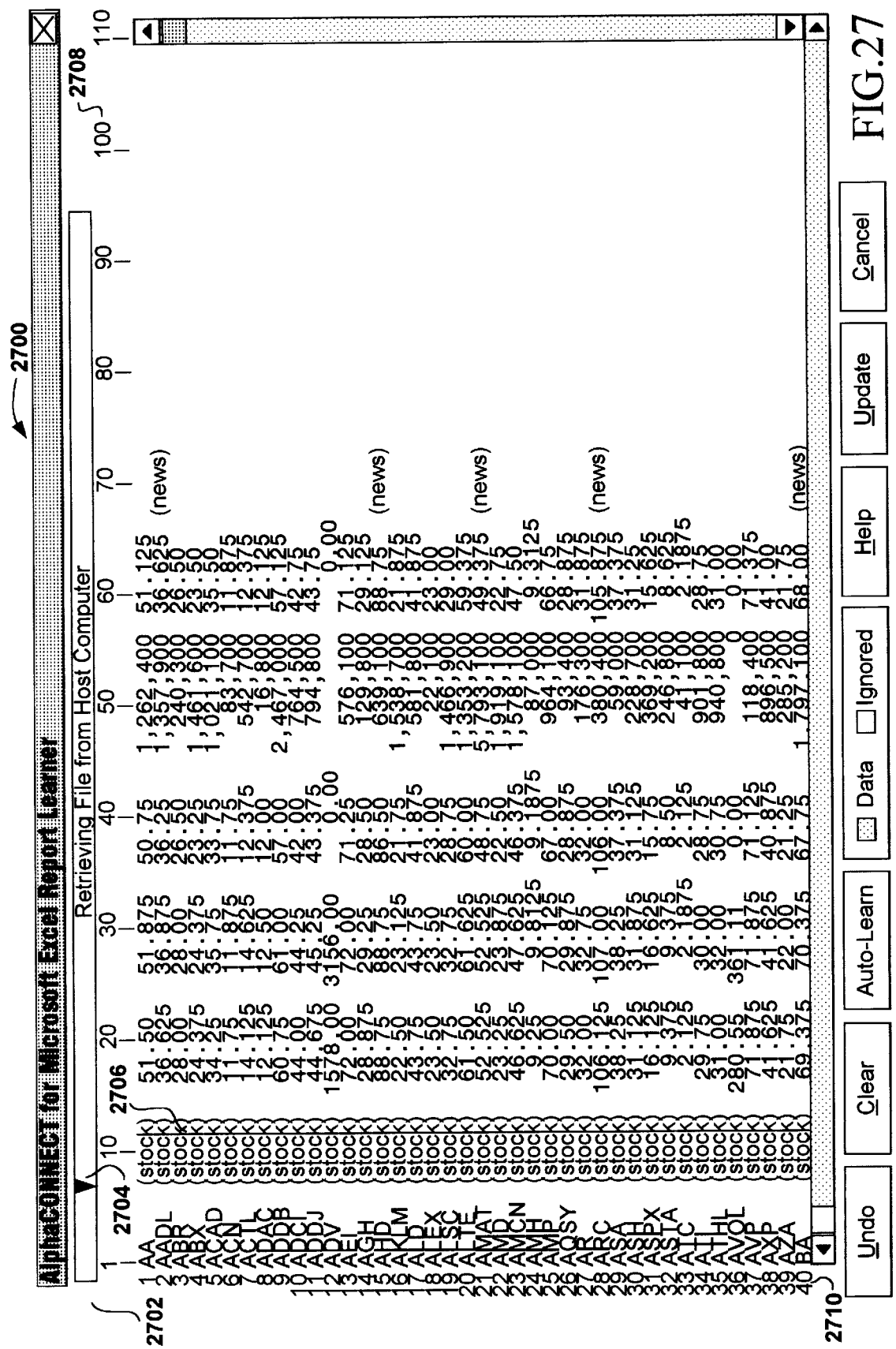
FIG. 27 is an example of a Report learner screen that might be used by an embodiment of the present invention.

FIG. 27 illustrates the Report learner screen 2700. The purpose of the Report Learner screen 2700 is to provide the user with a visual representation of the source data 120. Using mouse drag operations (screen 2700) and/or alphanumeric data entry screen (2600), the user is able to specify which columns of this data are desired to be mapped to the data target 106 and how they are to be mapped. In alternate embodiments, the screens 2600 and 2700 may be integrated so the user is provided on a single screen the information and control features that the two screens contain.

In the screen 2700, there is always at least 1 field defined. I.e. there is always a "current field." The field number is displayed at the top left of the screen in a box 2702 and also may be indicated graphically by an arrow 2704, for example. In the screen 2700, the source data 120 is displayed in area 2706 as black text on a white background. Column numbers 2708 of the data 120 are displayed across the top of the screen 2700, and row numbers 2710 (or record numbers) are displayed along the left side of the screen 2700. Fields are highlighted in yellow (shown in FIG. 27 as grey highlighting).

The user may mouse-drag in the area 2706 to change the starting column and width of the current field.

Figure 31A:
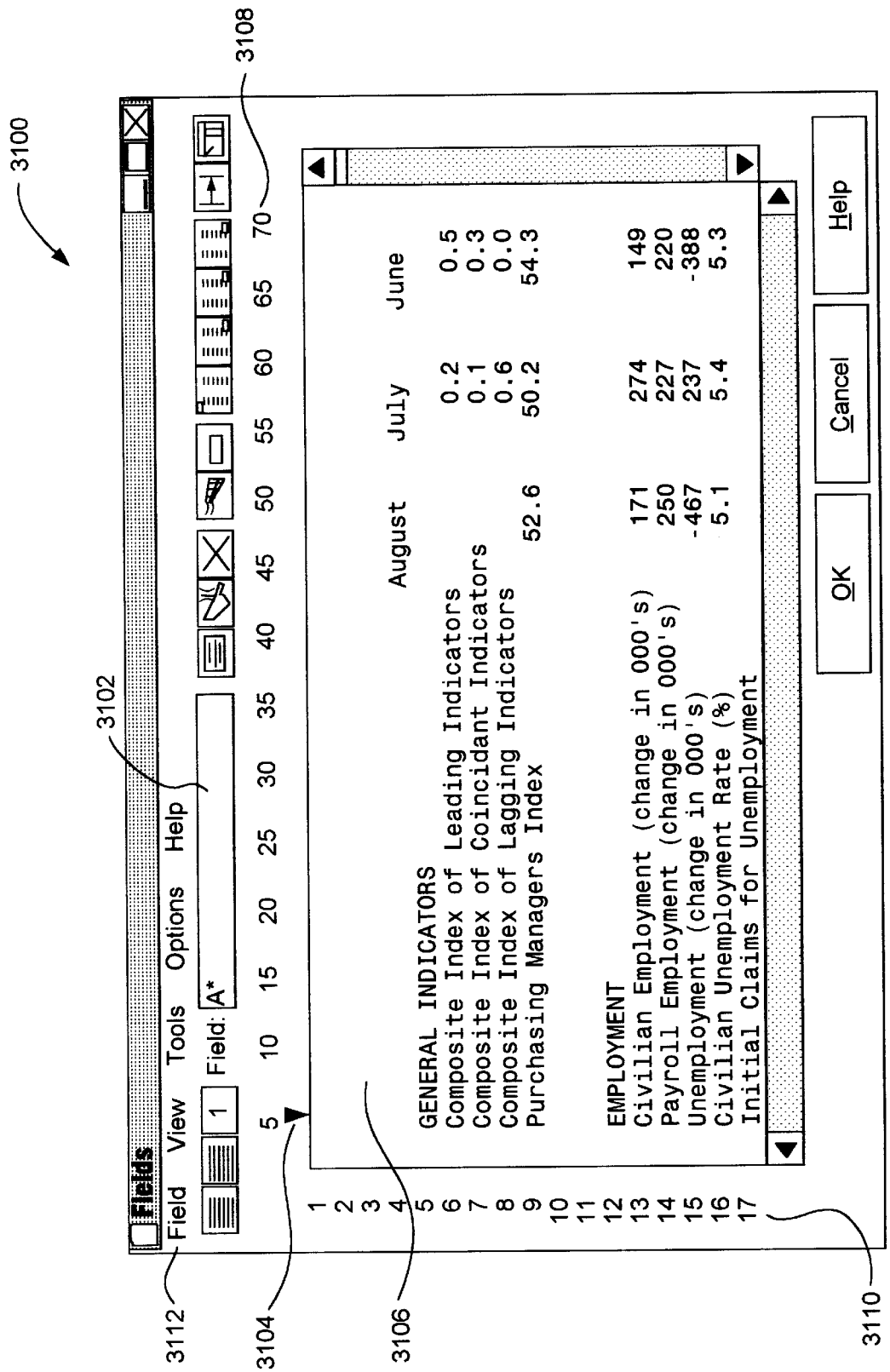
FIG. 31A shows a report learner screen.

FIG. 31A shows screen 3100 which is an alternate embodiment of a Report Learner screen. Screen 3100 is similar to screen 2700. In particular, in the screen 3100, there is always at least 1 field defined. I.e. there is always a "current field." The field number is displayed at the top left of the screen in a box 3102 and also may be indicated graphically by an arrow 3104, for example. In the screen 3100, the source data 120 is displayed in area 3106 as black text on a white background. Column numbers 3108 of the data 120 are displayed across the top of the screen 3100, and row numbers 3110 (or record numbers) are displayed along the left side of the screen 3100. Fields are highlighted in yellow (shown in FIG. 31 as grey highlighting).

The user may mouse-drag in the area 3106 to change the starting column and width of the current field.

Screen 3100 provides menu items 3112 for the functions listed below. Commonly used menu functions may also implemented as toolbar buttons. The screen might provide menus titled Field, View, Tools, Options and Help, for example.

A Field>Add menu item may be used to enable a user to add a new field. The field number display 3102 will increment by one when a new field is added. Mouse drag operations or a Field>Properties dialog may be used to modify the newly added field.

A Field>Delete menu item may be provided to enable the user to delete the current field.

A Field<Previous menu item may be provided to enable the user to decrease the current field by one if it is greater than one. The field number display 2702 decrements by one.

A Field>Next menu item may be provided to enable the user to increase the current field by one if the current field is not the last field. The field number display 2702 increments by one.

A View>Clear menu item may be provided to enable the user to deleted all fields. If this item is selected, all yellow highlights disappear from the display area 2706.

A View>Refresh menu item may be provided to enable the user to refresh the screen 2700. If this item is selected, the display is refreshed (recomputed and redisplayed).

A View>Acquire Data Source menu item may be provided to enable the user to instruct the AlphaConnect machine to reacquire the source data 120 (e.g. web page, FTP file, local file, ODBC query results, or results of a data acquisition plug-in) are re-acquired. The source data 120 display is refreshed to reflect the updated data that is obtained.

A Tools>Auto-Learn menu item may be provided to enable the user to instruct the AlphaConnect machine to suggest field assignments based upon an analysis of the data. Any previous field assignments are deleted. The data is then analyzed. Fields are computed from the analysis, and are highlighted in yellow.

An Options>Range menu item may be provided to enable the user to specify the range (starting page, starting line, number of pages, number of lines, starting row, and line batching. The following describes this functions provided by this screen.

Figure 31B:
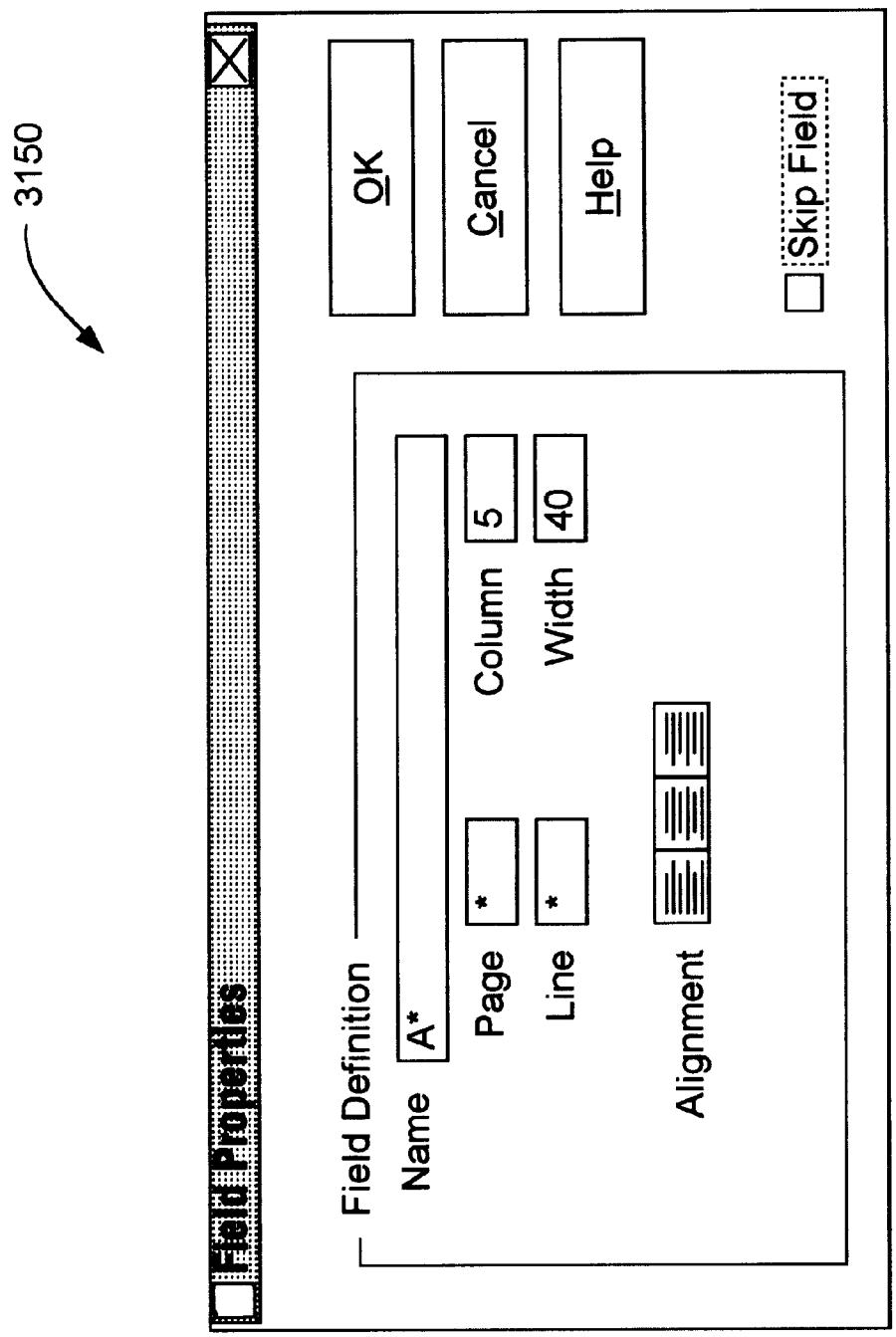
FIG. 31B shows a field properties dialog screen used with the report learner.

FIG. 31B shows a Field>Properties dialog 3150. This dialog 3150 can be displayed for the current field. From this dialog, the user may enter a name for the current field/cell (such as A*), a page number (an integer, or * for all pages), a line >number (an integer, or * for all lines), a column, a width, and an >alignment (left, centered, or right).

The screens 2700 and 3100 provide graphical methods of defining data field areas, when the source data 120 has repeating lines/pages of data in the same format. The Learn screen 2700 (or 3100) and the Field mapping area of the screen 2600 are in synchronization. The initial display of the Learn screen shows fields graphically that match the current field mapping information shown in the screen 2600. Making changes to the Learn screen and then clicking Update causes the field mapping information on the screen 2600 to be updated to match.

Referring back to FIG. 27, screen 2700 has the following features.

Page 1 Pane (page display)
    Most of the learn screen 2700 is a depiction of Page 1 of the source data 120. Data field columns are highlighted. Mouse drags change marked columns to unmarked, and unmarked columns to marked. During a mouse drag, gray rectangles display for feedback.

Undo (button)
    This button removes the effects of the last mouse drag operation. Undo does not nest: only the very last mouse operation is remembered. The Undo button is only enabled if there is an action to undo.

Clear (button)
    This button clears away all field mapping information. This is useful for discarding previous field definitions and starting over.

Auto Learn (button)
    This button invokes the Auto Learn function, which analyzes the page and deduces data field columns.

Help (button)—shortcut key: F1
    This button invokes on-line help.

Update (button)
    This button saves any changes. Control is returned to the Link Editor.
    Information in the screen 2600 is updated to reflect any changes made while in the Learn screen.

Cancel (button)—shortcut key: ESCAPE
    This button abandons any changes. Control is returned to the Link Editor. Information in the Fields tab is unchanged.

Figure 28:
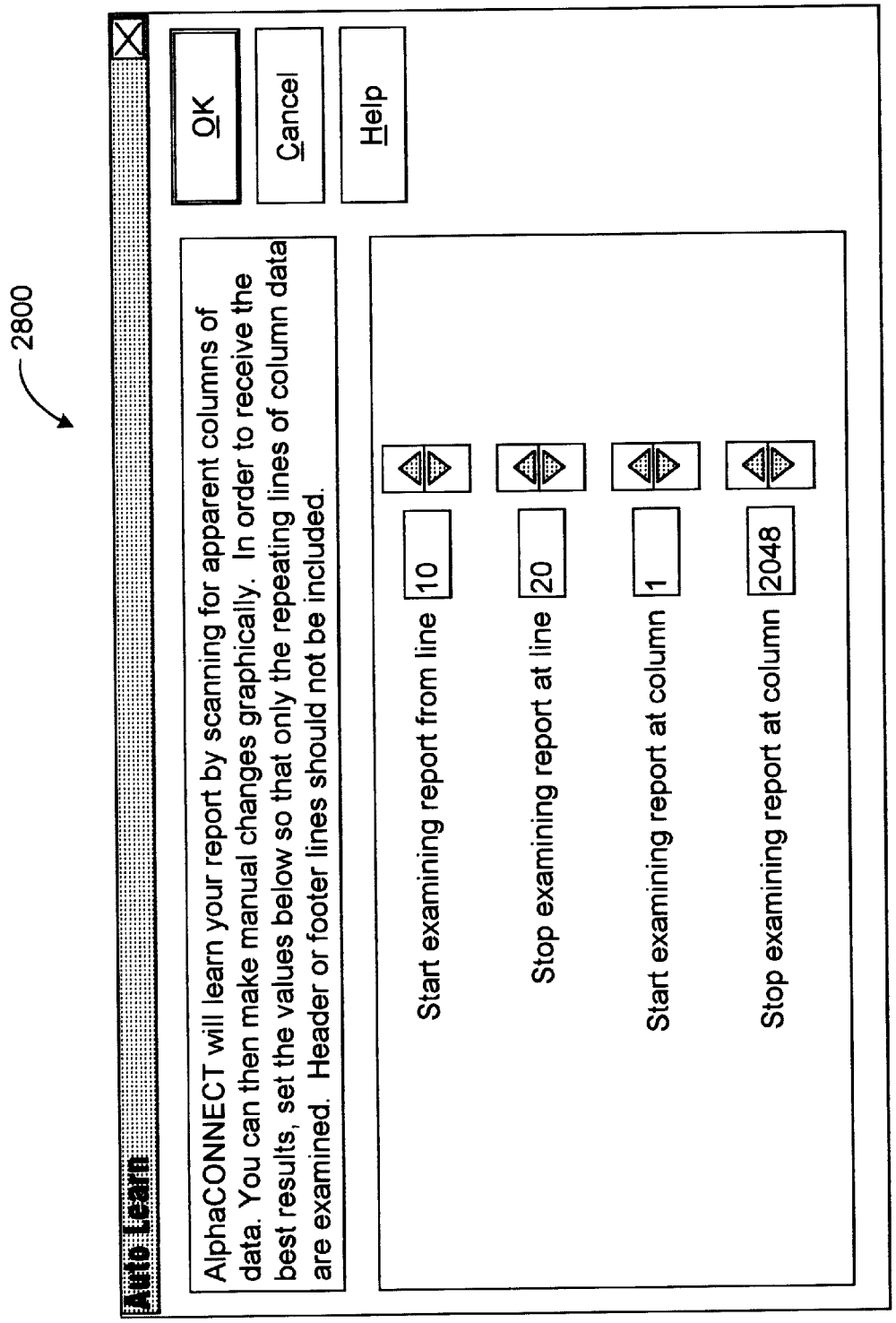
FIG. 28 is an example of a auto learn screen that might be used to specify and display variables related to an auto learn function.

FIG. 28 is a screen 2800 that might be displayed if the Auto Learn feature is used. The Auto Learn feature analyzes page 1 of the source data 120 and makes it own determinations about data mappings. Auto Learn runs when the Auto Learn button is clicked from the Learn screen.

The following describes features of the screen 2800.

Start examining reportfrom line (text box)
    The number in this text box specifies the first line of the page that AlphaCONNECT should examine. For the best results, the user should enter a line number that will cause potentially misleading title information to be avoided.

Stop examining report at line (text box)
    The number in this text box specifies the last line of the page that AlphaCONNECT should examine. For the best results, the user should enter a line number that will cause potentially misleading footer information to be avoided.

Start examining report at column (text box)
    The number in this text box specifies the starting column of each line that AlphaCONNECT should examine.

Stop examining report at column (text box)
    The number in this text box specifies the ending column of each line that AlphaCONNECT should examine.

OK (button)
    This button clears away any previous data field columns, analyzes the report page, unloads the Auto Learn screen, and returns control to the Learn screen with updated field columns drawn.

Cancel (button)—shortcut key: ESCAPE
    This button leaves the data field columns unchanged, unloads the Auto Learn screen, and returns control to the Learn screen.

Referring back to frame 1330 of screen 1300 in FIG. 13, the Delimited button, if visible, can be clicked to specify field and record delimiters.

The data format, image format, audio format and video format option groups provide the input that provides the value of the data format link parameter.

The data format option group offers these choices of data format:
    Fixed-width
    Comma-delimited
    Tab-delimited
    Custom delimited
    (note that if Custom delimited is selected, a Delimiters button becomes visible that enables custom delimiting options to be specified.)

The image format option group offers the following choices of image types:
    BMP
    GIF
    JPEG
    PCX
    TIFF
    WMF
    Icon The audio format option group offers the following choices of audio types:
    MIDI
    Wave
    RealAudio The video format option group offers the following choices of video types:
    AVI
    MPEG
    QuickTime At the lower left of the main screen, frame 1344 provides controls that are used to indicate the data target 106 that will receive the data 122.

Option buttons in frame 1344 offer these choices:
    Microsoft Excel
    Lotus 1-2-3
    Corel Quattro Pro
    Microsoft Access
    Lotus Approach
    Borland Paradox
    Text file
    Microsoft Word
    Lotus Word Pro
    Corel WordPerfect
    Netscape Internet Explorer
HTML document
Write
Notepad
Paintbrush
Text file
Image file
Audio file
Video file The target file text box 1346 provides a field for entering the file specification of the target file 110. In the present embodiment, the file type of this file should match the target application selected: for example, you may only specify a doc file if the target application is Microsoft Word. A browse button 1348 assists file specification entry.

An overwrite previous file checkbox 1350 may be checked to force the creation of a new target file 110 each time the link is run. If this checkbox is not checked, then an existing target file 110 is updated, not superseded, when the link runs.

A button 1352 is available. When the target application is a spreadsheet, button 1352 is a Sheet button 1352. Clicking this button allows a sheet name, tab, or layer to be specified. Data will be posted to this sheet when the link runs.

When the target application is a database manager, the button 1352 is a Table button. Clicking this button allows a database table name to be specified. Data will be added to this table when the link runs.

When the target application is a word processor, the button 1352 is a Bookmark button. Clicking this button allows a document bookmark location to be specified. Data will be inserted into the document at this location when the link runs.

Figure 16:
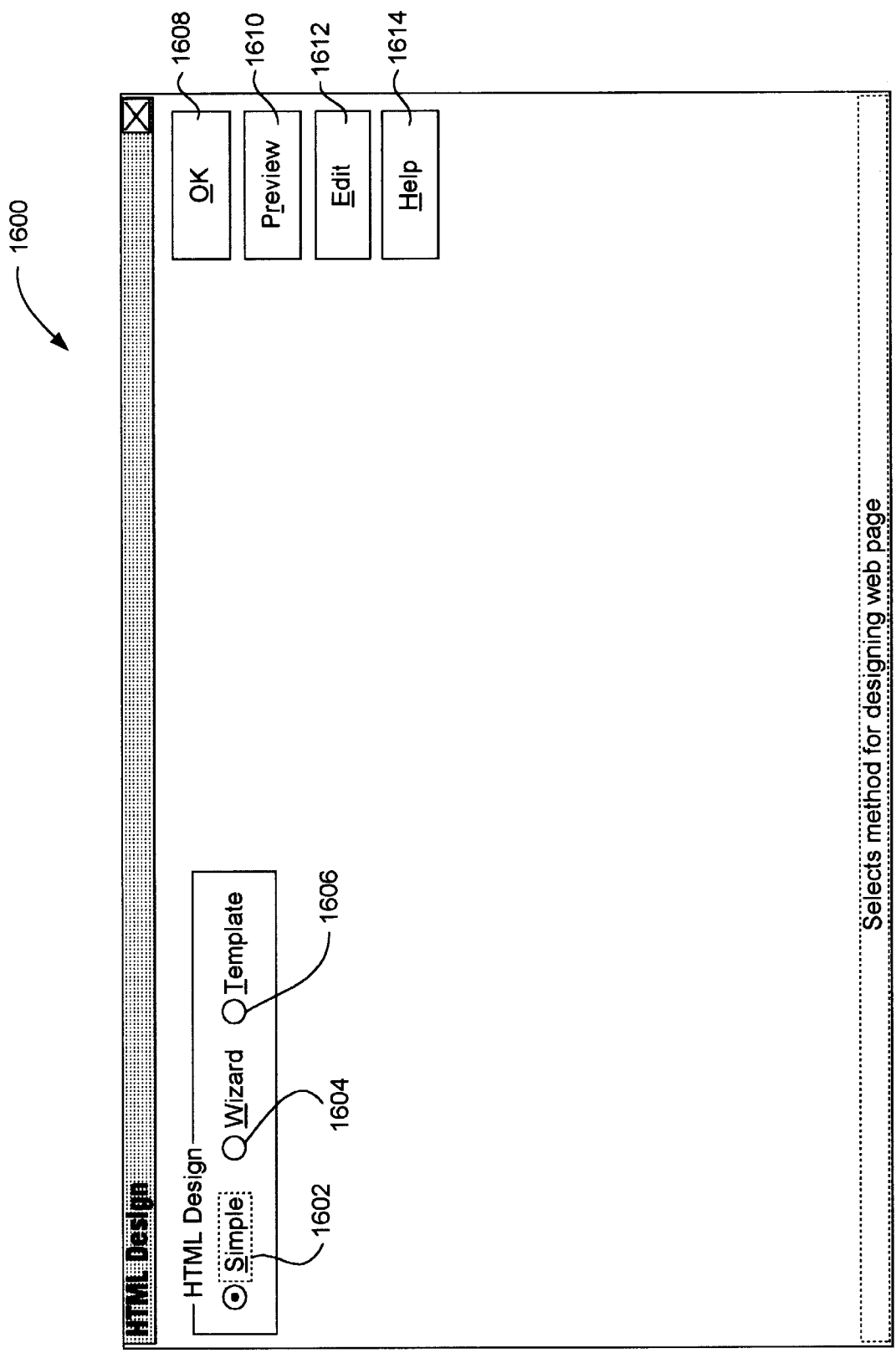
FIG. 16 shows the screen 1600 used to create HTML files.
Figure 17:
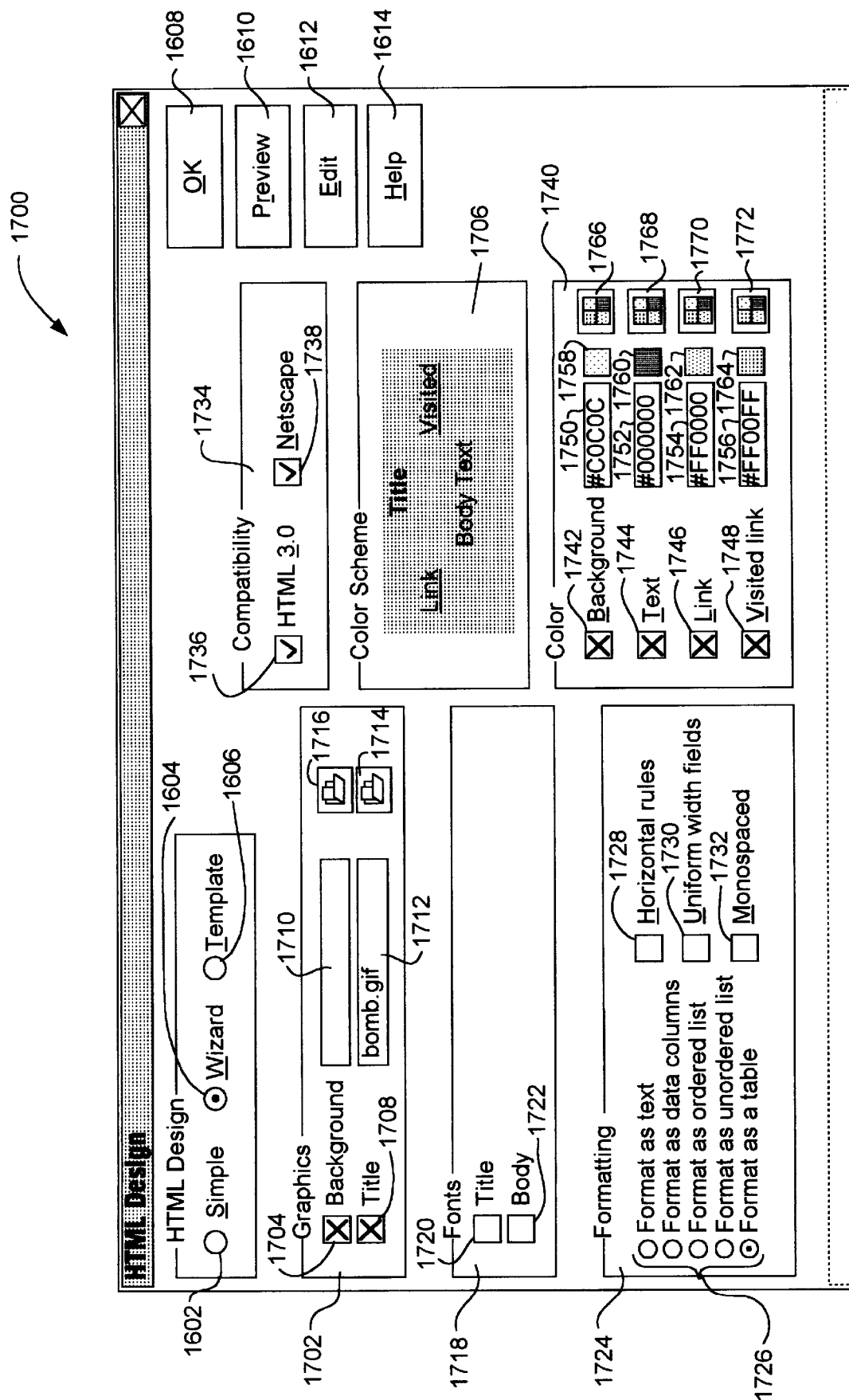
FIG. 17 shows the screen 1700 used to create HTML files.
Figure 18:
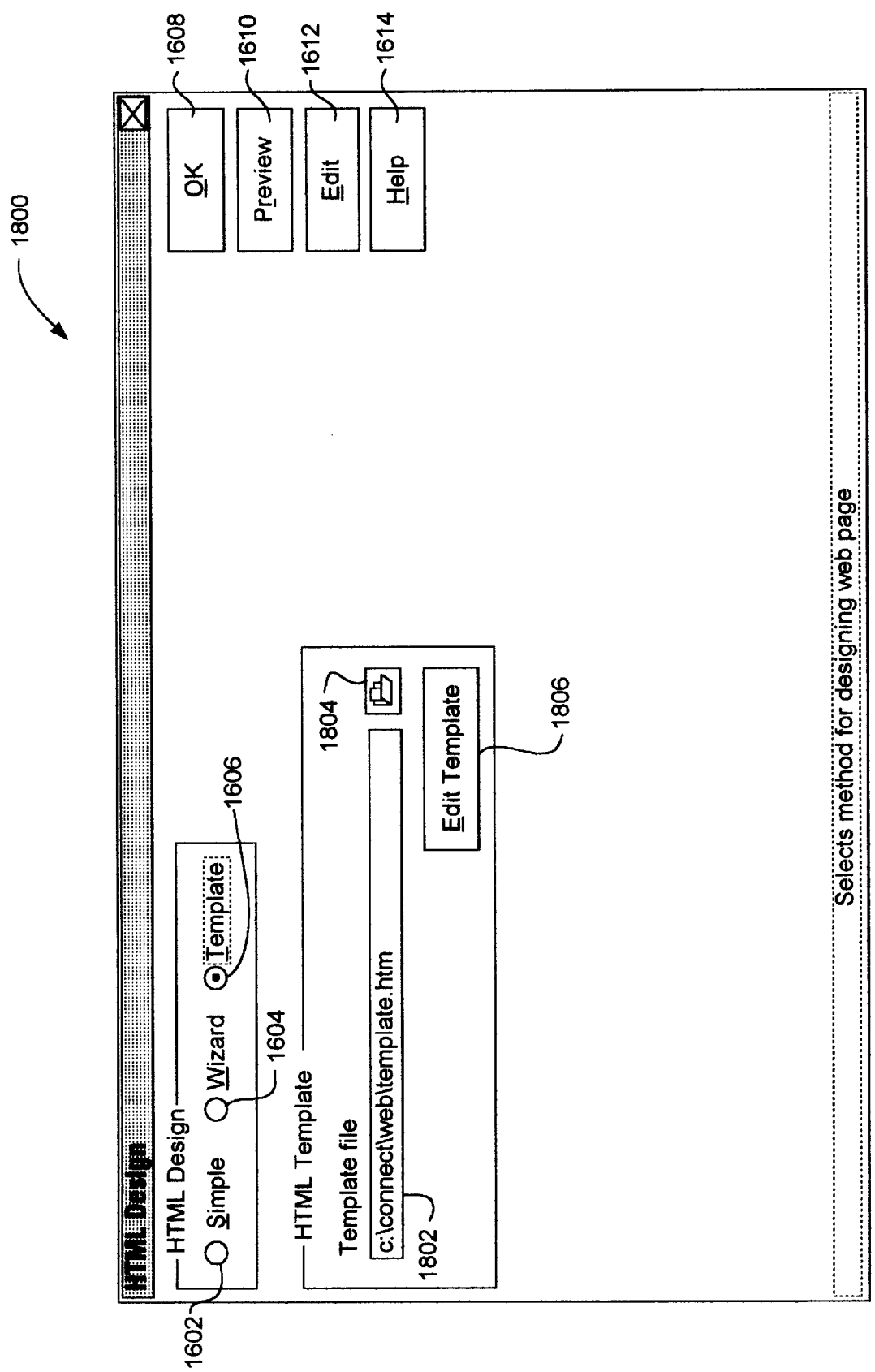
FIG. 18 shows the screen 1800 used to create HTML files.

When the target application is HTML (web page) related, the button 1352 is an HTML button. Clicking this button allows the target web page to be designed. FIGS. 16–18 illustrate a graphical user interface 1600, 1700 and 1800 that might be used to enable the HTML layout to be designed. In particular, the user might be provided with three different options for web page design:

Simple
When the Simple option is selected using button 1602, the screen 1600 shown in FIG. 16 is displayed. The web page generated is designed by the machine 102. The user needs to make no decisions whatsoever. This results in a simple but unexciting web page. This option is useful when there is a need for quick results without the need for a sophisticated appearance.

Wizard
When the wizard option is selected using button 1604, the screen 1700 shown in FIG. 17 is displayed. Screen 17 displays option buttons, check boxes, and fields for web page design. As discussed below, the user may experiment with color, graphic, and formatting options. This method allows creative web page design without the need to know the HTML language.

Template
When the template option is selected using the button 1606, the screen 1800 shown in FIG. 18 is displayed. The template option is for sophisticated HTML users such as webmasters. A template file field 1802 and browse button 1804 appear. When template HTML web pages are used, the machine 102 copies the template file specified in the field 1802 as a model when generating a web page. Special verbs are replaced with runtime data in the web page that is created.

The buttons 1608, 1610, 1612 and 1614 are displayed on the HTML Design screen at all times:

Selecting the OK button 1608 returns to the Link Editor screen. The final results of HTML Design and any other changes to the link are committed by selecting Save or Save As from the Link Editor.

Selecting the preview button 1610 generates a web page based on the current settings but with mock data, then invokes the web browser with the created file. This is a good way to see exactly what type of web page will be generated, except for the actual data, without having to resort to running the link for real.

Like the preview button 1610, the edit button 1612 generates a web page based on the current settings but with mock data. Instead of launching the web browser, however, Notepad is opened so that the HTML document can be examined, modified, or saved under another name.

The Help button 1614 provides the user with Help related to HTML design.

In the Simple design screen 1600, there are no design controls or fields because all details of the web page are determined by machine 102.

In the Wizard design screen 1700, the user is presented with a variety of fields and controls for web page design. The intent is to allow creative design of web pages without the need to deal with the HTML language.

The Graphics frame 1702 provides controls that permit graphic files to be included in the web page. The background check box 1704, if checked, indicates that a background graphic is to be used. The background graphic is tiled behind anything else on the page. Specifying a background usually makes any specification of a background color in the Color frame 1744 meaningless.

A text box 1710 for the file specification and a browse button 1714 are visible when the box 1704 is checked. In the present embodiment, background graphics should be .gif or .jpg format files. To see what the background looks like, click the Preview button.

The title check box 1708, if checked, indicates that a title graphic is to be used. The title graphic appears to the left of the link title on the web page. A text box 1712 for the file specification and a browse button 1714 are visible when this box is checked. Background graphics must be gif or jpg format files. To see what the title graphic looks like, click the Preview button.

The Fonts frame 1718 allows the style and size of fonts to be controlled. The Title check box 1720, if checked, provides user control over the appearance of the title of the web page. Normally, a user's web browser makes decisions about presentation. This option is used to override those defaults with specific settings. A text box for font size (valid values: 1 through 7) and check boxes for bold and italic formatting are visible when this box is checked. HTML does not provide the capability to set the font style, nor to set the title to a different color than the main body text.

The Body check box 1722, if checked, provides user control over the appearance of the body text of the web page. Normally, a user's web browser makes decisions about presentation. This option is used to override those defaults with specific settings. A text box for font size (valid values: 1 through 7) and check boxes for bold and italic formatting are visible when this box is checked. HTML does not provide the capability to set the font style, nor to set the title to a different color than the main body text.

The formatting frame 1724 provides controls that determine how the link data is formatted. The "Format as" option group 1726 determines how the link data is arranged in the generated web page. When the Format as Text button is selected, the text is formatted into paragraphs. A blank line in the data source becomes a paragraph separator. When the Format as Data Columns button is selected, the data fields are arranged in columns. This option works best in conjunction when the Monospaced and Uniform field widths check boxes in this frame 1724 are checked. When the Format as Ordered List button is checked, each line of data is numbered (1., 2., etc.). Exact formatting of the list is determined by the user's web browser and option settings. When the Format as Unordered List button is checked, each line of data is bulleted. Exact formatting of the list is determined by the user's web browser and option settings. When the Format as a Table button is checked, data is arranged in a grid table. With this style of formatting, the Monospaced and Uniformfield widths have no effect. This option is only visible if the HTML 3.0 check box 1736 is checked.

The Horizontal Rules check box 1728, if checked, causes horizontal rules (lines) to appear in the web page before and after the data from the link.

The Uniform Field Widths check box 1720, if checked, causes each data field to be space padded to uniform length as defined by the mapping parameter.

The Monospaced check box 1732, if checked, causes data to be displayed by the web browser in its "pre-formatted" typeface, which is usually monospaced and well-suited for aligning columns of data.

The Compatibility frame 1734 provides options that indicate whether or not HTML 3.0 and/or Netscape extensions may be used in generating the web page.

The HTML 3.0 check box 1736, if checked, causes machine 102 to support the HTML 3.0 language extensions. If not checked, the machine 102 only supports HTML 2.0 language extensions and does not make any HTML 3.0-specific design options visible on the screen.

The Netscape check box 1738, if checked, causes the machine 102 to support Netscape's extensions to HTML. If not checked, the machine 102 does not use them and does not make any Netscape-specific design options visible on the screen.

The Color frame 1740 provides controls that set colors. The Background check box 1742, if checked, enables the user to specify a background color. A text box 1750 for an RGB code (using the HTML #nnnnnn format), a display-only color box 1752, and a browse color button 1766 become visible. The user can set the background color by manually changing the text box #nnnnnn value, or (more likely) by clicking on the browse color button. Changes to the background color are reflected in the color box and in the Color scheme display 1706 (unless a background graphic has been specified), and are also taken into account when the Preview button is clicked.

The Text check box 1744, if checked, enables the user to specify a text color. A text box 1752 for an RGB code (using the HTML #nnnnnn format), a display-only color box 1760, and a browse color button 1768 become visible. The user can set the text color by manually changing the text box #nnnnnn value, or (more likely) by clicking on the browse color button. Changes to the text color are reflected in the color box and in the Color scheme display 1706, and are also taken into account when the Preview button is clicked.

The Link check box 1746, if checked, enables the user to specify a color for new (not previously visited) links. A text box 1754 for an RGB code (using the HTML #nnnnnn format), a display-only color box 1762, and a browse color button 1770 become visible. The user can set the link color by manually changing the text box #nnnnnn value, or (more likely) by clicking on the browse color button. Changes to the link color are reflected in the color box and in the Color scheme display 1706, and are also taken into account when the Preview button is clicked.

The Visited Link check box 1748, if checked, enables the user to specify a color for visited (previously selected) links. A text box 1756 for an RGB code (using the HTML #nnnnnn format), a display-only color box 1764, and a browse color button 1772 become visible. The user can set the visited link color by manually changing the text box #nnnnnn value, or (more likely) by clicking on the browse color button. Changes to the visited link color are reflected in the color box and in the Color scheme display 1706, and are also taken into account when the Preview button is clicked.

The Color scheme display 1706 displays the current color scheme. As settings on the HTML design wizard screen 1700 are modified, this display changes to match. Only colors are shown; backgrounds and other settings are not reflected here.

With the Template design screen 1800 shown in FIG. 18, the user supplies the name of an HTML file to be used as a template for web page creation. The Template file text box 1802 enables the user to specify the path and file specification of the template HTML file. A browse button 1804 may be used to locate the directory and file of the template file.

The Edit Template button 1806 invokes Notepad on the template file, for creation, examination, or editing. The machine 102 provides extensions to HTML that may be used in templates.

The general concept of HTML templates for use with AlphaCONNECT is that there is a prefix, a data insertion, and a suffix portion to the web page definition. In particular, . . . prefix area of HTML template . . .
<CONNECT data__insertion__command>
. . . suffix area of HTML template . . .

The data insertion command should be one of three HTML extensions used to trigger insertion of the link data as the machine 102 creates a web page by copying the template file. The <CONNECT DATA>command inserts link data at this point in the web page where it is located. The <CONNECT TABLEDATA>command inserts link data at the point in the web page where it is located as a table. The <CONNECT LISTDATA>command inserts link data at the point in the web page where it is located as a list.

The machine 102 only recognizes the first occurrence of a data insertion command, and will ignore any additional occurrences in the HTML template. All other extensions to HTML made by the machine 102 may be used freely and repeatedly throughout the HTML template.

The <CONNECT DATA>statement inserts the link data as text lines. If the Pad data with spaces option has been enabled, the data fields will be space-padded to uniform width. The <CONNECT TABLEDATA>statement inserts the link data with <TD>and </TD>tags. The HTML template should include its own <TABLE>and </TABLE>tags. The <CONNECT LISTDATA>statement inserts the link data with <LI>tags before each line. The HTML template should includes its own <OL>and </OL>(ordered list) or <UL>and </UL>(unordered list) tags.

The machine 102 supports an <INCLUDE file__ specification>directive for inclusion of HTML fragments in your template. When such an include directive is encountered, the specified file is copied into the HTML file that is being generated. An HTML template may contain any number of include directives. An included file may not include other files, however.

The following example illustrates how combining include directives with other machine 102 extensions can result in small but sophisticated template files, with reusable components:

```
<INCLUDE common.htm>
<INCLUDE logo.htm>
<H1><CONNECT TITLE></H1>
<TABLE BORDER=2>
<CONNECT TABLEDATA>
</TABLE>
<INCLUDE trailer.htm>
<INCLUDE favlinks.htm>
```

Then machine 102 provides other additions to HTML. In particular, the following statements are replaced with runtime information, and may be used anywhere in the HTML template:

| | |
|---|---|
| <CONNECT TITLE> | Replaced with the description of the link. |
| <CONNECT DATE> | Replaced with the current system date. |
| <CONNECT TIME> | Replaced with the current system time. |
| <CONNECT LINKFILE> | Replaced with the name of the link file. |
| <CONNECT PRODUCT> | Replaced with the name of the machine 102 component (e.g. AlphaCONNECT for Excel). |
| <CONNECT HOSTNAME> | Replaced with the Internet name or address of the host computer. |
| <CONNECT USERNAME> | Replaced with the user name used to log on to the host computer. |
| <CONNECT HOSTDIR> | Replaced with the directory of the source data on the host computer. |
| <CONNECT HOSTFILE> | Replaced with the file name of the source data on the host computer. |
| <CONNECT TARGETFILE> | Replaced with the target file 110 (HTML file name) created by the link. |

Referring back to FIG. 13, at the lower right of the link editor screen 1300, frame 1354 provides controls that are used to indicate data delivery options. In frame 1354, option buttons offer these choices:

Keep document open

Close document

The frame 1354's appearance changes based on which of the keep open/closed option buttons is currently selected:

Keep document open: no delivery options are available (destination file will be in use)

Close document: all delivery options are available Checkboxes offer the following delivery options:

Post on gateway computer

FTP to remote computer

E-mail as an attachment

Fax text

Data Delivery Plug-in

The frame's appearance changes based which of these checkboxes are selected:

If the Post on gateway computer box is checked, a Gateway button is visible.

If the FTP to remote computer box is checked, Destination button is visible.

If the E-mail as an attachment box is checked, a Recipients button is visible.

If the Fax text box is checked, a Recipients button is visible.

If the Data Delivery Plug-in is checked, a Program button is visible

Figure 29:
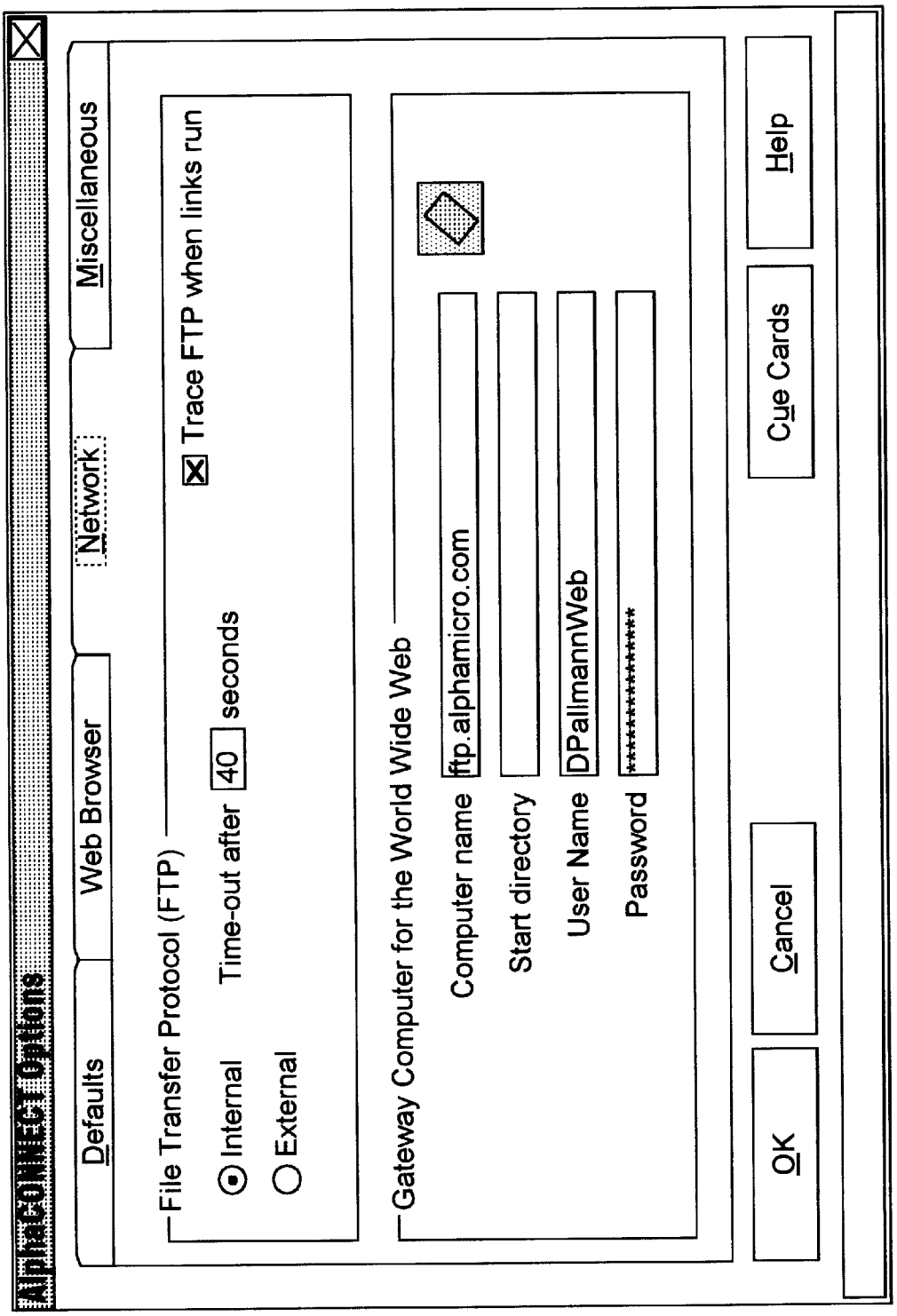
FIG. 29 is an example of a screen that might be used to specify and display parameters related to gateway delivery.

The Gateway button, if visible, may be clicked to view or change the FTP name, sign-on, password, and directory of your organization's gateway computer. This information is not specific to the link, but all of the AlphaCONNECT machine 102. You can also set the Gateway information from the Options menu of the AlphaCONNECT main screen 1200. FIG. 29 is an example of a screen that might be used to change the gateway options.

Figure 30:
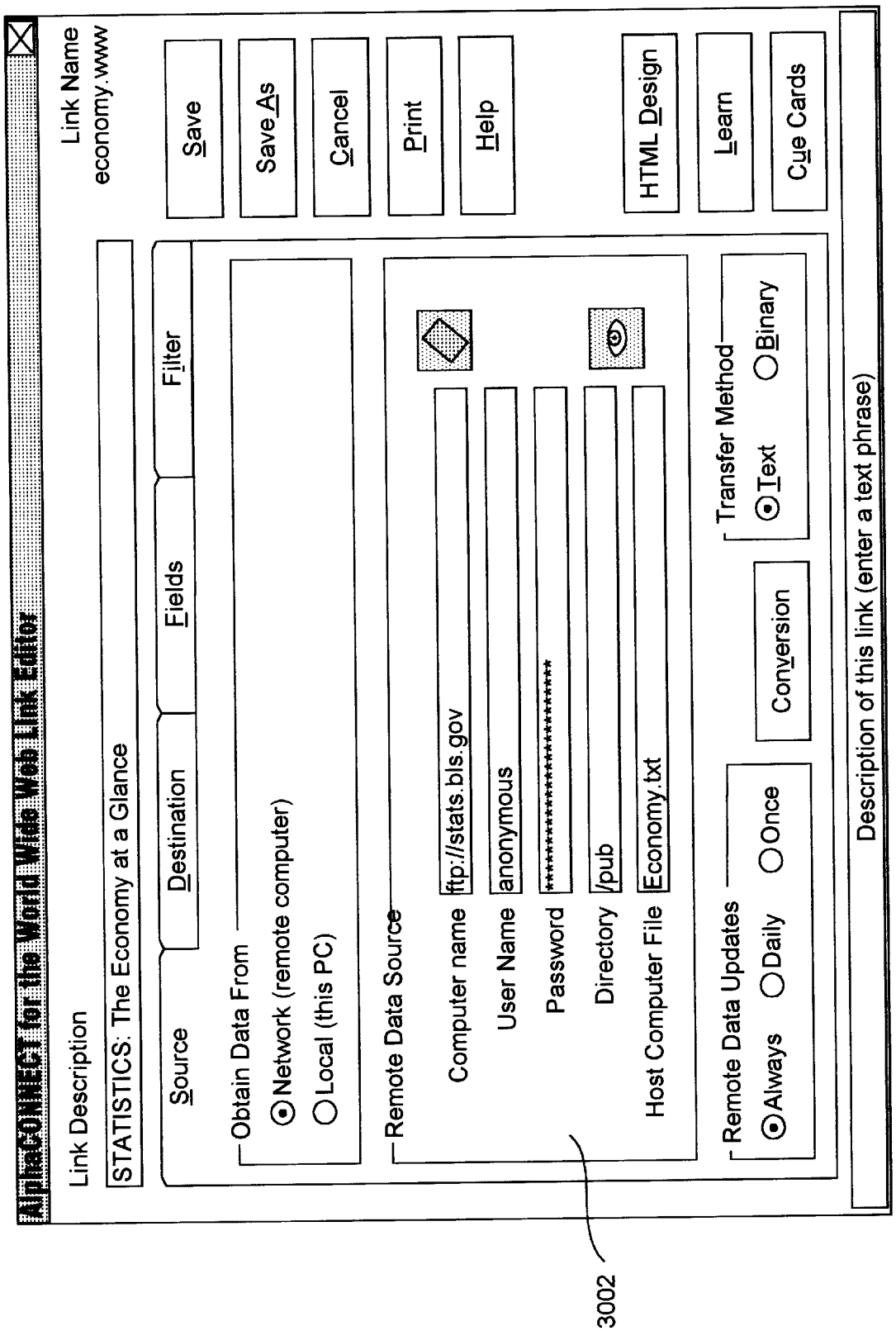
FIG. 30 is an example of a screen that might be used to specify and display parameters related to remote FTP delivery.

The Destination button, if visible, may be clicked to define the FTP name, sign-on, password, directory, and remote filename of the computer to send to. Area 3002 of FIG. 30 is an example of a screen that might be used to prompt a user for this information.

The Recipients button, if visible, may be clicked to specify e-mail addresses and/or fax numbers.

The Program button, if visible, may be clicked to enter the command line for a data delivery plug-in program.

The software 114 also includes a link executive which is a stand alone program responsible for running links. When the external context specifies that a link is to be executed by the machine 102 or when a link has been set to automatically execute, an instance of the link executive acexec.exe is spawned to process the link that is to be executed. The executive runs separately from the AlphaCONNECT main program, ac.exe, so that the user may continue working while the link is running. The Executive can run in multiple instances, so that it is possible to have many links executing all at the same time. FIG. 14 shows a screen 1400 that can be displayed when the Link Executive running a link.

The link will be executed according to the link parameters specified in the link. The information to be obtained will come from one of the following:

A web page

AnFTP server

A local file

An ODBC database server

A custom program

If the data is cached locally, and the link settings indicate that a cached copy of the data should be used if available, then data acquisition is bypassed and the cached copy of the data is reused.

AlphaCONNECT obtains data from a web page by using one of three methods. The user chooses a method of web page access via AlphaCONNECT's Options>Networking menu item on the screen 1200. The three methods are:

Internal 32-bit ActiveX—the web page is accessed using a 32-bit winsock connection. Microsoft's ActiveX Internet Control Pack is the tool used to access the web page.

Internal 16-bit—the web page is accessed using a 16-bit connection. Crescent Software's Internet ToolPak is the tool used to access the web page if this method is chosen.

External—the user supplies a program command line to be used to access the web page.

AlphaCONNECT obtains data from an FTP server by using one of three methods. The user chooses a method of FTP access via AlphaCONNECT's Options>Networking menu item on the screen 1200. The three methods are:

Internal 32-bitActiveX—the FTP server is accessed a 32-bit winsock connection. Microsoft's ActiveX Internet Control Pack is the tool used to access the FTP server if this option is chosen. This tool does not support proxies.

Internal 16-bit-the FTP server is accessed using a 16-bit winsock connection. Crescent Software's Internet TookPak is the tool used to access the FTP server if this option is chosen. This tool supports proxies.

External-the user supplies a program command line to be used to access the FTP server.

Once data is acquired, it may be converted to another form. If the data acquired is an HTML document, it is converted to text form unless the user has specifically indicated otherwise in the link definition. If the user has specified a data conversion plug-in for the link, the plug-in program is called to convert the data. The plug-in makes a copy of the data, converting its format in the process. If a plug-in has been registered for a file type matching the acquired data, the plug-in program is called to convert the data. The plug-in makes a copy of the data, converting its format in the process.

Depending on the link definition, filtering may be required. Filtering removes unwanted portions of the data. If the data is textual, filtering options may have been selected in the link. Such options include the ability to:

Ignore blank lines

Ignore lines containing certain phrases

Ignore lines containing certain phrases at certain column locations

Ignore lines not containing certain phrases

Ignore lines not containing certain phrases at certain column locations

Ignore all data until a trigger phrase is encountered

Ignore all data after a trigger phase is encountered

If the user has specified a filtering plug-in for the link, the plug-in program is called to filter the data. The plug-in program makes a copy of the data, but with unwanted data removed.

Once data has been acquired, converted, and filtered, it is sent to its target application. As described above, the methods for doing this depend on the target application.

An alternate embodiment of the invention is described in U.S. Provisional Application 60/016,744. This provisional application and all appendices thereto are hereby incorporated herein by this reference. Additional aspects of the present embodiment may be understood by reference to this Provisional application. This provisional application is also attached to the present application as appendices A–E. Appendices A–E are hereby incorporated herein by this reference.

FIG. 15A graphically illustrates an embodiment of the invention being used by an external context that is another program 1504. In this situation, the external context 1504 is an OLE client. The external interface of the embodiment 1504 is an OLE server that communicates with the OLE client 1502.

To call AlphaCONNECT under the control of your progams, follow these steps:

1. Create an AlphaCONNECT Object. The object might use an appropriate name such as oleweb.application oleexcel.application oleqp.application oleword.application olewp.application oleacc.application olepdox.application 2. Set the command line parameter for AlphaCONNECT Set the property ObjectName.CommandLine to the command line argument(s) AlphaCONNECT is to receive:

An empty command line argument invokes AlphaCONNECT ready for interactive use.

A link file name on the command line causes AlphaCONNECT to execute the link and then shut down.

An optional parameter, -r, may be first on the command line to indicate runtime-only mode.

3. Launch AlphaCONNECT

Invoke the method ObjectName. execute to execute AlphaCONNECT.

FIG. 15B is an example of Microsoft Visual Basic code that calls the embodiment 1504 and tells it to run the link named 'stock.' FIG. 15C is an example of Microsoft Visual Basic code that defines and saves a new link. The machine 1504 is called to create a new link called 'newlink.'

While the invention has been described in terms of embodiments of the invention, the invention is not limited to or by the disclosed embodiments. The person of ordinary skill will readily appreciate that the invention can be applied beyond the particular embodiments described as an example in this specification. The invention comprises all embodiments supported by the disclosure.

What is claimed is:

1. A data acquisition and delivery system that acquires source data having a first format from a selected data source, comprising:

a target computer;

a data target coupled in communication with the target computer;

a plurality of logical modules available for execution by the target computer in response to a plurality of predefined parameters which one of identify, and characterize an element of, particular logical modules in the plurality of logical modules to establish a data delivery task, to acquire the source data, to obtain delivered data from the source data and to provide to the data target the delivered data in a second format;

a notation data structure accessible by the target computer that includes the plurality of predefined parameters.

2. The data acquisition and delivery system of claim 1, further comprising:

an external interface provided using the target computer to enable input of at least one parameter in the notation to identify and characterize a set of logical modules within the plurality of logical modules to establish the data delivery task.

3. The data acquisition and delivery system of claim 2, wherein at least one parameter selects the selected data source from a plurality of data sources.

4. The data acquisition and delivery system of claim 2, at least one parameter specifies a process used to obtain the delivered data from the source data.

5. The data acquisition and delivery system of claim 2, wherein the data target comprises a target application program and a target file accessible to the target application program; and at least one parameter selects a location in the target file as the data target.

6. The system of claim 1, wherein one of the parameters comprises one of a network address and a network location.

7. The system of claim 1, wherein one of the parameters comprises one of a network address and a network location of an FTP server.

8. The system of claim 1, wherein one of the parameters comprises one of a network address and a network location of an HTTP server.

9. The system of claim 1, wherein one of the parameters comprises one of an Internet address and an Internet location.

10. The system of claim 1, wherein one of the parameters comprises one of a network address and a network location of an ODBC server.

11. The system of claim 1, wherein the selected data source is located on the target computer.

12. The system of claim 1, wherein the selected data source is at a location remote from the target computer.

13. The system of claim 2, wherein the at least one parameter comprises a plurality of sub-parameters and wherein the plurality of sub-parameters specify the data target in the target file.

14. The system of claim 2, wherein the at least one parameter is a data mapping parameter.

15. The system of claim 4, wherein at least one parameter identifies a logical module which includes a process by which the source data is transformed to obtain the delivered data.

16. The system of claim 4, wherein the first format comprises an HTML format and the second format comprises a normalized text format.

17. The system of claim 4, wherein the first format comprises a text format and the second format comprises a normalized text format.

18. The system of claim 4, wherein the first format comprises a record format and the second format comprises a normalized text format.

19. The system of claim 4, wherein the first format comprises a multimedia format.

20. The system of claim 2, including resources adapted to automatically execute the data delivery task at a time specified by the external context.

21. The system of claim 2, including resources adapted to automatically execute the data delivery task at a recurring time specified by the external context.

22. The system of claim 5, wherein the data delivery task can be executed independent of execution of the target application program.

23. The system of claim 22, wherein the external interface is adapted to enable the external context to execute the target application program.

24. The system of claim 5, wherein the data delivery task can be executed from within an interface provided by the target application program.

25. The system of claim 1, wherein the data delivery task comprises a set of logical modules and wherein at least one software module is adapted to recognize a plug-in that provides substitute functionality for the at least one software module.

26. The system of claim 25, wherein the set of software modules comprise at least one of a data retrieval module, a format conversion module, a data filtering module, a data mapping module and a data delivery module.

27. The system of claim 1, wherein one software module in the plurality of software modules comprises an FTP client integrated with the particular data delivery task.

28. The system of claim 1, wherein one software module in the plurality of software modules is adapted to recognize a data acquisition plug-in and wherein the data acquisition module is adapted to acquire the source data from the selected data source as specified by the value of at least one parameter using the data acquisition plug-in.

29. The system of claim 28, wherein the data acquisition plug-in is an external FTP client.

30. The system of claim 1, wherein one software module in the plurality of software modules is adapted to recognize a format conversion plug-in and wherein the format conversion module is adapted to format convert the one of the source data and data obtained from the source data as specified by at least one parameter in the notation using the format conversion plug-in.

31. The system of claim 1, wherein one software module in the plurality of software modules is adapted to recognize a data filter plug-in and wherein the data filter module is adapted to data filter the one of the source data and data obtained from the source data using the data filter plug-in.

32. The system of claim 1, wherein one software module in the plurality of software modules is adapted to recognize a data delivery plug-in and wherein the data delivery module is adapted to deliver the data target to the remote data target as specified by the value of the at least one parameter in the notation using the data delivery plug-in.

33. The system of claim 1, wherein the first format is the same as the second format.

34. A data acquisition and delivery system that acquires source data in a first format from a selected data source, comprising:

a target computer including a user interface;

a data target coupled in communication with the target computer;

a plurality of logical modules available for execution on the target computer in response to a plurality of predefined parameters which identify and characterize elements of logical modules in the plurality of logical modules to establish a data delivery task, wherein one of the plurality of modules comprises a process to acquire the source data from the selected data source using a network protocol driver, another of the plurality of logical modules comprises a process to obtain delivered data from the source data, and another of the plurality of logical modules comprises a process to provide the delivered data to the data target in a second format; and a notation data structure, coupled with the user interface, that stores the plurality of predefined parameters in response to input from the user interface.

35. The data acquisition and delivery system of claim 34, wherein the user interface comprises a graphical user interface.

36. The data acquisition and delivery system of claim 34, wherein the process to obtain delivered data includes a process which filters the source data in response to one of the plurality of parameters.

37. The data acquisition and delivery system of claim 34, wherein the process to provide the delivered data to the data target in a second format includes a process to transform the delivered data from the first format to the second format.

* * * * *